(12) United States Patent
de Jong

(10) Patent No.: US 7,191,288 B2
(45) Date of Patent: Mar. 13, 2007

(54) METHOD AND APPARATUS FOR PROVIDING AN APPLICATION ON A SMART CARD

(75) Inventor: Eduard K. de Jong, Bristol (NL)

(73) Assignee: Sun Microsystems, Inc., Santa Clara, CA (US)

( * ) Notice: Subject to any disclaimer, the term of this patent is extended or adjusted under 35 U.S.C. 154(b) by 242 days.

(21) Appl. No.: 10/786,763

(22) Filed: Feb. 24, 2004

(65) Prior Publication Data

US 2005/0188360 A1 Aug. 25, 2005

(51) Int. Cl.
*G06F 12/00* (2006.01)
*G06F 12/14* (2006.01)

(52) U.S. Cl. ........................... 711/115; 717/163
(58) Field of Classification Search .............. None
See application file for complete search history.

(56) References Cited

U.S. PATENT DOCUMENTS

| | | | |
|---|---|---|---|
| 5,481,715 A | 1/1996 | Hamilton et al. | 395/700 |
| 5,530,232 A | 6/1996 | Taylor | 235/380 |
| 5,590,038 A | 12/1996 | Pitroda | 395/241 |
| 5,721,781 A | 2/1998 | Deo et al. | 705/67 |
| 5,742,756 A | 4/1998 | Dillaway et al. | 713/200 |
| 5,802,519 A | 9/1998 | De Jong et al. | 707/100 |
| 5,844,218 A | 12/1998 | Kawan et al. | 235/380 |
| 5,857,079 A | 1/1999 | Claus et al. | 704/33 |
| 5,894,550 A | 4/1999 | Thiriet et al. | 714/54 |
| 5,912,453 A | 6/1999 | Gungl et al. | 235/492 |
| 6,005,942 A | 12/1999 | Chan et al. | 713/187 |
| 6,024,286 A | 2/2000 | Bradley et al. | 235/492 |
| 6,032,136 A | 2/2000 | Brake, Jr. et al. | 705/41 |
| 6,038,551 A | 3/2000 | Barlow et al. | 705/41 |
| 6,052,690 A | 4/2000 | Waldin, Jr. et al. | 717/170 |

(Continued)

FOREIGN PATENT DOCUMENTS

EP 0748135 12/1996

(Continued)

OTHER PUBLICATIONS

Bernadat, et al., "Java Sandboxes meet Service Guarantees: Secure Partitioning of CPU and Memory", Dec. 14, 1998, The Open Group Research Institute, Cambridge, MA, pp. 1-24.

(Continued)

*Primary Examiner*—Reginald Bragdon
*Assistant Examiner*—Horace L. Flournoy
(74) *Attorney, Agent, or Firm*—Gunnison, McKay & Hodgson, L.L.P.; Forrest Gunnison

(57) ABSTRACT

A smart card contains potentially multiple applications, each containing an application identifier (AID). Each application also incorporates an AID interpreter for providing access to the AID. This is achieved by making a request to the AID interpreter to provide the AID for the application. In response, the AID interpreter retrieves a first component of the AID. This first component is logically internal to the AID interpreter. The AID interpreter also retrieves a second component of the AID. This second component is logically external to the AID interpreter and is indicative of a state relevant to the application, such as a current balance in the card. The first and second components of the AID are then combined in order to generate the AID for providing in response to the request.

52 Claims, 29 Drawing Sheets

U.S. PATENT DOCUMENTS

| | | | |
|---|---|---|---|
| 6,094,656 | A | 7/2000 | De Jong .................... 707/100 |
| 6,101,477 | A | 8/2000 | Hohle et al. .................... 705/1 |
| 6,199,762 | B1 | 3/2001 | Hohle ........................ 235/492 |
| 6,233,683 | B1 | 5/2001 | Chan et al. ................. 713/172 |
| 6,308,317 | B1 * | 10/2001 | Wilkinson et al. .......... 717/139 |
| 6,390,374 | B1 * | 5/2002 | Carper et al. ............... 235/492 |
| 6,418,554 | B1 | 7/2002 | Delo et al. .................. 717/174 |
| 6,477,702 | B1 * | 11/2002 | Yellin et al. ................ 717/126 |
| 6,481,632 | B2 * | 11/2002 | Wentker et al. ............. 235/492 |
| 6,631,849 | B2 | 10/2003 | Blossom ..................... 235/492 |
| 6,915,957 | B2 | 7/2005 | Kisliakov ................... 235/492 |
| 6,976,635 | B2 * | 12/2005 | Ashizawa et al. .......... 235/492 |
| 2001/0000814 | A1 | 5/2001 | Montgomery et al. ........ 710/10 |
| 2002/0040936 | A1 | 4/2002 | Wentker et al. ............. 235/492 |
| 2002/0083322 | A1 | 6/2002 | Lagosanto et al. .......... 713/172 |
| 2002/0134843 | A1 | 9/2002 | Ashizawa et al. .......... 235/492 |
| 2003/0078866 | A1 | 4/2003 | Richards et al. .............. 705/35 |
| 2003/0212896 | A1 | 11/2003 | Kisliakov ................... 713/193 |
| 2004/0024735 | A1 | 2/2004 | Yap et al. ....................... 707/1 |
| 2004/0255081 | A1 * | 12/2004 | Arnouse ...................... 711/115 |
| 2005/0038741 | A1 | 2/2005 | Bonalle et al. ............... 705/40 |
| 2005/0091544 | A1 * | 4/2005 | Lambert ..................... 713/202 |
| 2005/0097550 | A1 * | 5/2005 | Schwabe et al. ............ 717/178 |
| 2005/0138354 | A1 | 6/2005 | Saltz .......................... 713/153 |
| 2005/0149926 | A1 | 7/2005 | Saltz ............................. 718/1 |
| 2005/0178833 | A1 | 8/2005 | Kisliakov ................... 235/441 |
| 2005/0184163 | A1 | 8/2005 | de Jong ...................... 235/492 |
| 2005/0184164 | A1 | 8/2005 | de Jong ...................... 235/492 |
| 2005/0188360 | A1 | 8/2005 | de Jong ...................... 717/136 |

FOREIGN PATENT DOCUMENTS

| | | |
|---|---|---|
| EP | 0865217 | 9/1998 |
| WO | WO 94/30023 | 12/1994 |
| WO | WO 98/19237 | 5/1998 |
| WO | WO 98/37526 | 8/1998 |
| WO | WO 99/16030 | 4/1999 |
| WO | WO 00/45262 | 8/2000 |

OTHER PUBLICATIONS

Chan, "Infrastructure of Multi-Application Smart Card", http://home.hkstar.com/~alanchan/papers/multiApplicationSmartCard/, Jul. 25, 2002.

Chen, Zhiqun, "Java Card™ Technology for Smart Cards", *Sun Microsystems*, pp. 11-16, Jun. 2000.

Dreifus, H. Smart Cards; A guide to Building and Managing Smart Card Applications; Copyright 1998; Publisher Robert Ipsen; "Smart Card Development Skills, Methods, and Tools"; pp. 159-225.

Gong, et al. "Going Beyond the Sandbox: An Overview of the New Security Architecture in the Java TM Development Kit 1.2", USENIX Symposium on Internet Technologies and Systems—Dec. 8-11, 1997, pp. 103-112.

Hawblitzel, et al., "Implementing Multiple Protection Domains in Java", Technical Report 97-1660, Department of Computer Science, Cornell University.

Heiss, J. et al. "Java Card™ Technology Grows Up Smart", printed on Apr. 22, 2000 at http://java.sum.com/features/1999/01/javacard.html, 5 pages.

Thomas, David J., "Smart and Smarter: The Emergence of Java Card™ Technology", printed on Apr. 22, 2000 from http://java/sun.com/features/1998/04/javacard.html, 8 pages.

Sun Microsystems, Inc., "How to write a Java Card applet: A developer's guide", printed on Apr. 22, 2000 from http://www.javaworld.com.javaworld/jw-07-1999/f_jw-07-javacard_p.htlm, 15 pages.

Sun Microsystems, Inc. "Smart Cards: A primer", printed on Apr. 22, 2000 from http://www.javaworld.com/javaworld/jw-12-1997/f_jw-12-javadev_p.html, 13 pages.

Sun Microsystems, Inc., "Sun's Java Card™ Technology Extends its Industry Leadership", printed Apr. 22, 2000 from http://java.sun.com/pr/1999/11/pr991116-01.htm l, 5 pages.

Sun Microsystems, Inc., "Understanding Java Card 2.0", printed on Apr. 22, 2000 from http://www.javaworld.com/javaworld/jw-03-1998/f_jw-03-javadev_p.htlm, 12 pages.

Sun Microsystems, Inc., "Java Card™ Applet Developer's Guide", Aug. 19, 1998, Revision 1.12.

Sun Microsystems, Inc., Java Card™ 2.0 Application Programming Interfaces, Oct. 13, 1997, Revision 1.0 Final.

Sun Microsystems, Inc., "Java Card™ 2.0 Programming Concepts", Oct. 15, 1997, Revision 1.0 Final.

Sun Microsystems, Inc., "Java Card™ 2.1 Application Programming Interface", Jun. 7, 1999, Final Revision 1.1.

"Sun Microsystems Announces JAVACARD API", Business Wire, Oct. 1996.

Sun Microsystems, Inc., Java Card 2.2 Application Programming Interface, Revision 1.1 for the 2.2 01 Release; Sep. 2002.

Sun Microsystems, Inc., "Java Card™ 2.2 Runtime Environment (JCRE) Specification", Palo Alto, CA, pp. 1-110, [Online] Jun. 2002. (XP002325473).

Sun Microsystems, Inc., "Java Card™ 2.2 Application Programming Interface", Palo Alto, CA, pp. 1-90, [Online] Sep. 2002. (XP002325474).

Sun Microsystems, Inc., "User's Guide, Wireless Toolkit, Version 2.1, Java™ 2 Platform, Micro Edition", Santa Clara, CA, pp. 7-17, 73-75, [Online] Dec. 2003. (XP002325476).

OSS-J Architecture Board, "OSS Through Java™ J2EE Design Guidelines", *OSS Through Java™*, pp. 1-116, [Online] Oct. 31, 2001. (XP002325475).

* cited by examiner

METHOD AND APPARATUS FOR PROVIDING AN APPLICATION ON A SMART CARD

CROSS REFERENCE TO RELATED APPLICATIONS

This application is related to the following:

U.S. patent application Ser. No. 10/786,506, filed Feb. 24, 2004 in the name of inventor Eduard K. de Jong, entitled "Method and Apparatus for Installing an Application Onto a Smart Card", commonly assigned herewith;

U.S. patent application Ser. No. 10/786,895, filed Feb 24, 2004 in the name of inventor Eduard K. de Jong, entitled "Method and Apparatus for Selecting a Desired Application on a Smart Card", commonly assigned herewith; and U.S. patent application Ser. No. 10/786,312, filed Feb. 24, 2004 in the name of inventor Eduard K. de Jong, entitled "Method and Apparatus for Processing an Application Identifier from a Smart Card", commonly assigned herewith.

FIELD OF THE INVENTION

The present invention relates to the field of computer science. More particularly, the present invention relates to providing an application on a smart card.

BACKGROUND OF THE INVENTION

Most people now have a collection of small plastic cards, representing various credit cards, store cards, identity cards, membership cards, and so on. Information about the card and its owner, such as account details and so on, is normally printed or embossed on the card, and may also be stored in some form of magnetic strip. Note that such cards are simply passive storage devices, and the information that they contain is fixed at card creation time.

In recent years, smart cards have also proliferated. These are similar in scale to traditional credit cards, but incorporate within their plastic cases a microelectronic memory and also (optionally) an embedded processor. It will be appreciated that the computational resources available within a smart card are extremely limited compared to those of a desktop workstation, or even a laptop or handheld device. One especially popular form of smart card is known as a Java Card. This is based on the Java platform developed by Sun Microsystems ("Java" and "Java Card" are trademarks of Sun Microsystems Inc). In such devices, a Java virtual machine (VM) is provided within the smart card to allow the execution of Java applets or applications. Particular advantages of being able to use the Java environment for smart card applications are the inherent security features of the Java environment, plus the ready availability of software development packages for the Java programming language. It is estimated that by the end of 2002 over 200 million Java cards had been shipped. More information about the Java Card smart card platform is available from the page: /products/javacard/ at the web site: http://java.sun.com and from the site: http://www.javacardforum.org/.

An Application Programming Interface (API) is defined for the Java Card platform. Applications written in the Java programming language invoke this API to access the Java Card run-time environment (JRE) and any native services. The Java Card API allows application portability, in that the same application can run on any smart card that supports the API. The Java Card API is compatible with international standards, in particular the ISO/IEC 7816 family of standards.

Note that programs that run on smart cards may be referred to as either an application or as an applet. It will be appreciated that there is a clear distinction between a Java applet and a Java application in a desktop environment, in particular the absence of a main class from the former. However, this distinction does not apply in the smart card environment. Thus applets for use on a Java card platform are not the same as applets that run on a web browser. The term applet will generally be used herein to refer specifically to code, and the term application to refer to the higher level functionality provided by the applet code and associated data (unless the context requires otherwise).

The Java Card platform supports multiple applications on a single card. These may be separated by firewalls, in order to ensure that they do not interfere with one another. This is particularly of concern if the various applications are operated by different organizations, whose business relationships with the cardholder may be independent of one another.

FIG. 1 is a high-level schematic diagram illustrating the main architectural components in a typical smart card application. In particular, smart card 102 belonging to cardholder 101 interacts with a terminal 110 by exchanging an application protocol data unit (ADPU) 108. The format for the ADPU is defined by the International Standard ISO/IEC 7816-3.

Terminal 110 may be a handheld device, an adjunct to a desktop workstation, a dedicated card reader (analogous to an ATM) or any other suitable system. Furthermore, the communications between the smart card 102 and the terminal 110 may be by wired connection, such as some form of bus (e.g. USB), or by wireless link (e.g. radio or some other electromagnetic signal), depending on the particular devices concerned. In addition, the terminal 110 may be under the direct control of an operator 111 (such as for a handheld terminal), or alternatively terminal 110 may be automated (such as for an ATM).

Terminal 110 interacts with a back office 130 over any suitable form of network 120, such as the Internet, a local area network (LAN), a wide area network (WAN), and so on. Back office 130 may comprise multiple systems (not explicitly shown in FIG. 1), such as a web server or portal attached to network 120, perhaps with an application server and/or a database system behind. Note that the terminal 110 may be off-line until activated by a smart card 102, a card holder 101 or a terminal operator 111 to access a back office 130 over network 120.

In operation, the cardholder 101 typically places the card 102 into or adjacent to the terminal 110, thereby allowing the two to interact, e.g. to perform a debit operation from the card, in order to purchase some goods. This interaction will generally be referred to herein as a session, and typically involves the exchange of multiple messages between the smart card 102 and the terminal 110. A session can be regarded as comprising multiple transactions, where each transaction represents the completion of some portion of the overall session (e.g. a security authorization).

Associated with each applet on smart card 102 is an Application Identifier (AID). The AID is a byte string up to 16 bytes long, whose format is defined by International Standard ISO/IEC 7816-5. Thus according to this standard; the first 5 bytes of the AID represent the registered application provider identifier (RID) and have a value allocated by ISO or one of its member bodies. The RID generally indicates the merchant or other entity involved with operating the applet, hereinafter referred to as the RID operator. The RID operator is generally responsible for the back office program 130, and is depicted as application/RID operator 131 in FIG. 1. The last 11 bytes of the RID constitute the proprietary application identifier extension (PIX). The PIX is determined by the RID operator 131, and can be used to store a reference number or other information associated with the applet.

FIG. 1A illustrates the storage of the AID on a typical smart card 102. The AID bytes are stored in a byte array, which represents internal storage for a Java AID object 161. Applications can therefore access the AID by making appropriate calls to AID object 161, which in effect provides a wrapper for the underlying byte array.

International standard ISO/IEC 7816-4 defines a procedure to allow a terminal to locate a desired application on a smart card, and this is illustrated at a high level in the flowchart of FIG. 1B. The procedure starts when the smart card 102 is first inserted into the terminal 110. The terminal detects the insertion of the smart card (reference numeral 162), and in response to such detection activates the smart card (reference numerals 164, 172). This activation typically includes providing power to the smart card.

The terminal now sends a request using an application protocol data unit (ADPU) 108 to the smart card (reference numeral 166). The ADPU identifies the application to be used in this session in terms of its AID. The request from the terminal is received by the smart card (reference numeral 174), typically within an applet selector program that is running on the smart card 102 as part of a card executive layer. The applet selector is then responsible for locating and launching the application that matches the AID request from the terminal, i.e. the application that has the same AID as specified in the request (reference numerals 176 and 177). The smart card also returns the AID for the matching application back to the terminal 110 (reference numerals 179 and 180). (N.B. Reference numerals 179 and 180 are optional within the context of ISO/IEC 7816-4, although commonly implemented).

FIG. 1C describes a variation on the above approach (also in accordance with ISO/IEC 7816-4), in which the terminal 110 supplies the card with a truncated AID (known as a partial AID), for example the first ten bytes of an AID. In these circumstances, there may be multiple matches against the partial AID. For example, if two applets have AIDs that have the first ten bytes in common, and then differ only in the final six bytes of the AID, they will both match the same partial AID of length 10 bytes (or less). One reason for using a partial AID might be if the terminal 110 wants to identify all applets on the card having a particular RID.

The processing of FIG. 1C commences as just described for FIG. 1B, except that at reference numeral 166 the request from the terminal 110 to the smart card 102 comprises only a partial AID. Consequently, the smart card may identify multiple matching applications at reference numeral 176. The AIDs for these matching applications are then returned to the terminal 110 (reference numerals 179, 180), in order to allow the terminal (or user) to select a specific desired application from those matching the partial AID. Thus the terminal now sends a request to the smart card to launch an applet (reference numeral 182). This request specifies the particular applet to be launched on the smart card in terms of its complete AID (generally selected from the set of those received from the smart card at reference numeral 180). The smart card duly responds to this request by launching the applet selected by the terminal (reference numeral 190).

In fact, the skilled person will realize that although FIG. 1C represents an appropriate logical model for the use of partial AIDs, the actual implementation looks more like FIG. 1B (primarily for historical reasons). Thus current systems generally accommodate the matching and return of multiple matching AIDs by identifying only a single matching AID at a time. In particular, the applet having the AID that is first matched to the partial AID received from the terminal is launched, and the complete AID for this applet is returned to the terminal 110. The smart card then only supplies a next matching AID upon a subsequent specific request from the terminal. Nevertheless, it will be appreciated that multiple matching AIDs could be handled in other ways, such as by returning the complete set of multiple matching AIDs all at once in a single response to the terminal (as depicted in FIG. 1C).

FIG. 2 is a schematic diagram representing the life cycle of a smart card, which in this particular implementation is a Java Card. This life cycle commences with the manufacture of the card, and the initial loading of the base operating system and the Java Card environment (reference numeral 210). Also at this stage, one or more applications may be preloaded (reference numeral 215). Generally, the base operating system and Java Card environment, and also potentially any preloaded applications, may be stored in ROM on the smart card 102 as part of the manufacturing process.

The card is now ready for issue to a cardholder (reference numeral 220), which typically involves an appropriate personalization process, as well as initialization of the Java environment, and starting the Java virtual machine on the card. The cardholder is thereafter able to use the card (reference numeral 230), such as in the manner illustrated schematically in FIG. 1. Note that if the card was originally issued without any preloaded applications, then the cardholder may have to load an application prior to making substantive use of the card. In practice however, this situation is rather uncommon, since usually there is at least one preloaded application in order to motivate issuance of the card in the first place.

During the operational lifetime of the card, further application programs may potentially be installed onto the card (reference numeral 235), for example if the cardholder signs up to new accounts or services. Conversely, applications may be removed from the card, perhaps because an account is closed.

The last operation shown in FIG. 2 is where the card is terminated (reference numeral 240). This may occur, for example, because the card has a built-in expiry date or is surrendered by the user (perhaps if the user is moving to a new card issuer, or the card is physically damaged).

Although the Java Card environment does support multiple applications from different RID operators, nevertheless, in practice, the installed applications on a large majority of issued cards come from and are run by a single RID operator. In other words, applications from one RID operator are typically found on one card, and applications from another RID operator on a different card. Consequently, relatively little attention has been paid to the business and technical problems associated with the provision and utilization of multi-vendor smart cards.

SUMMARY OF THE INVENTION

A smart card contains potentially multiple applications, each containing an application identifier (AID). Each application also incorporates an AID interpreter for providing access to the AID. This is achieved by making a request to the AID interpreter to provide the AID for the application. In response, the AID interpreter retrieves a first component of the AID. This first component is logically internal to the AID interpreter. The AID interpreter also retrieves a second component of the AID. This second component is logically external to the AID interpreter and is indicative of a state relevant to the application, such as a current balance in the card. The first and second components of the AID are then combined in order to generate the AID for providing in response to the request.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
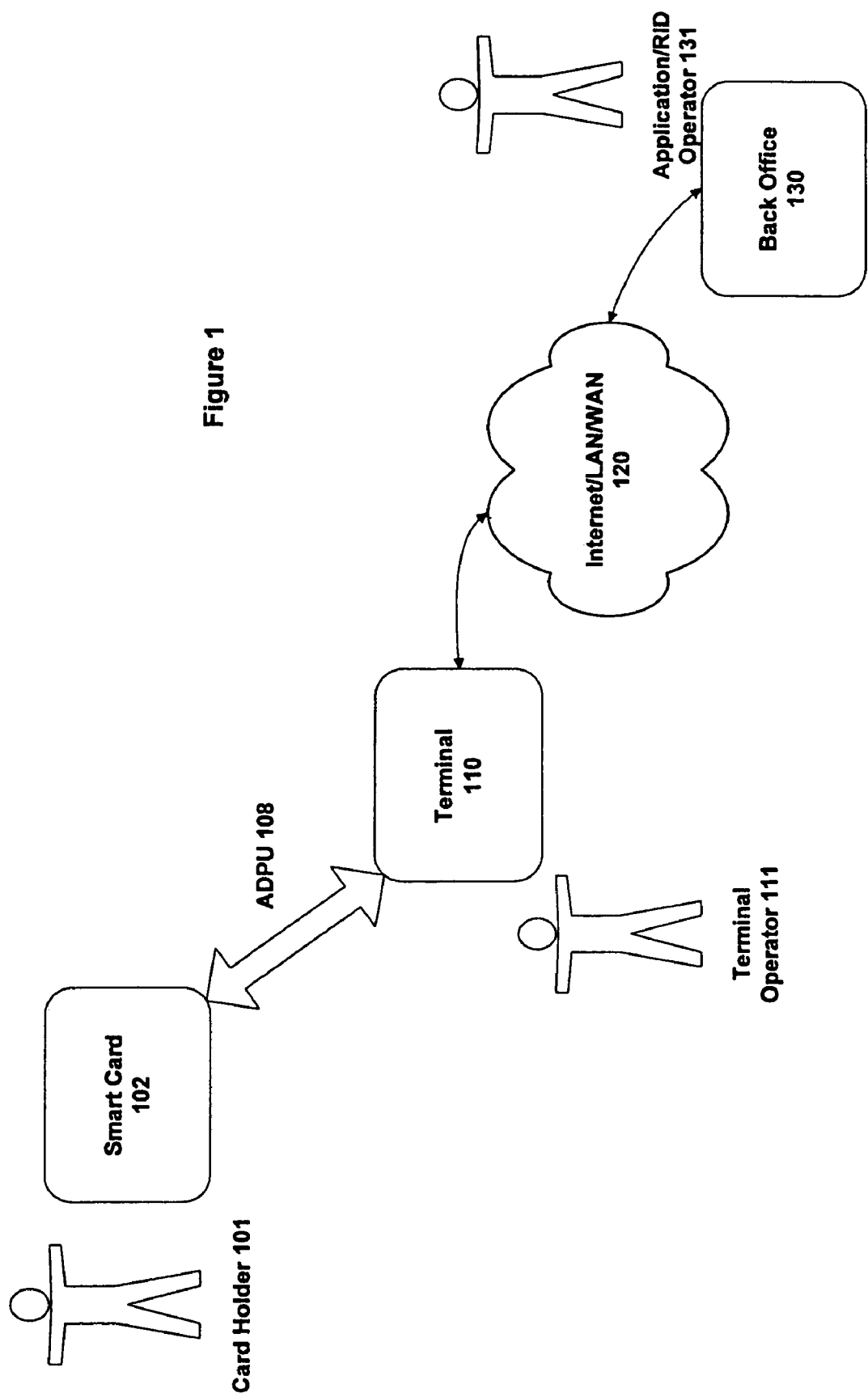
FIG. 1 is a schematic diagram illustrating the main components involved in a typical smart card application.
Figure 1A:
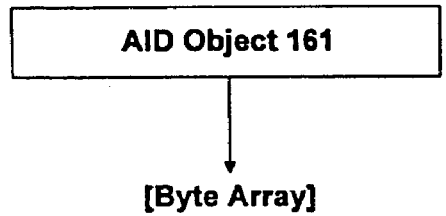
FIG. 1A is a schematic diagram representing the implementation of an AID object in a typical existing smart card.

Embodiments of the present invention are described herein in the context of providing an application on a smart card. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

Figure 3:
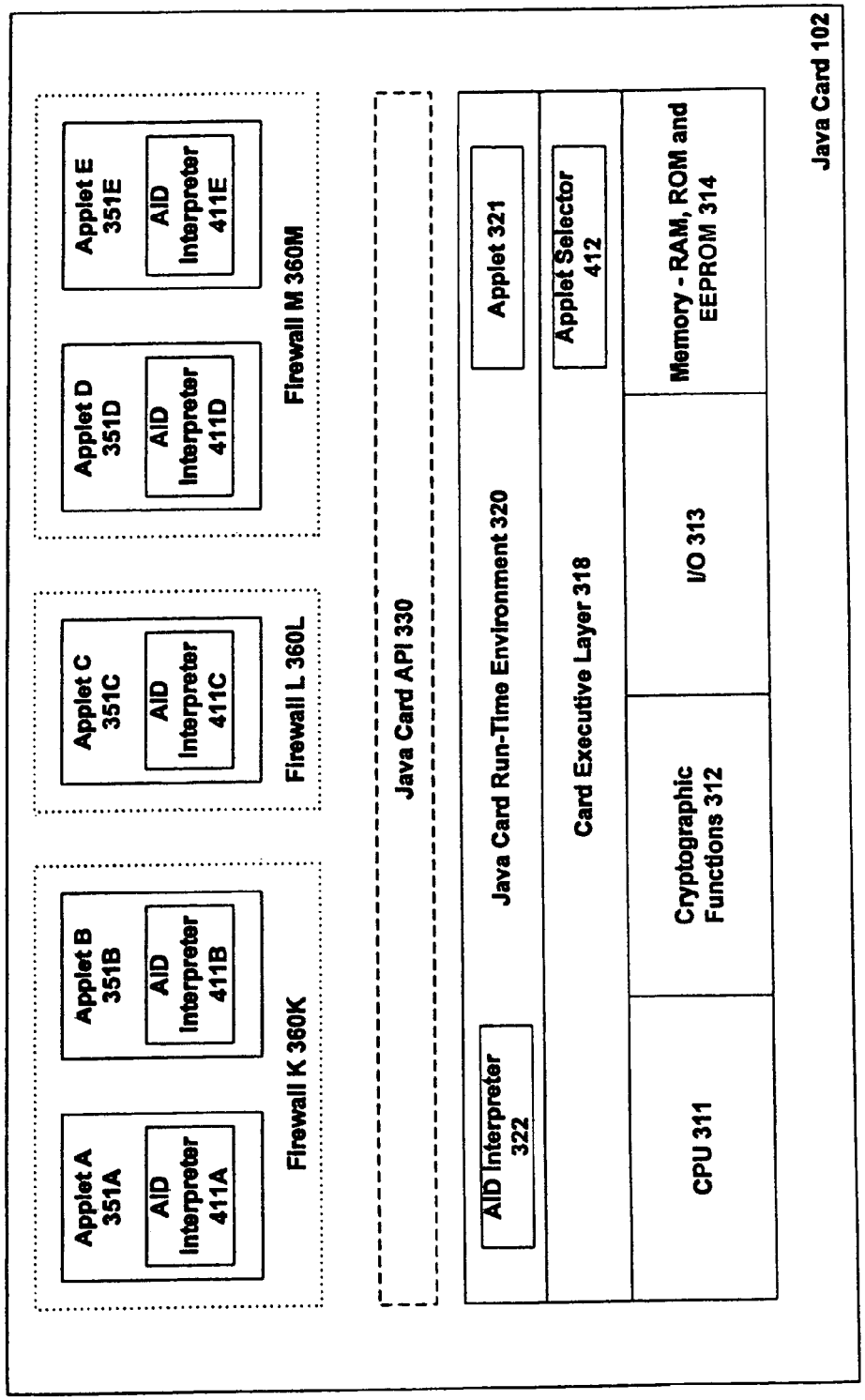
FIG. 3 is a schematic block diagram representing at a high level the structure of a typical smart card.

FIG. 3 illustrates in schematic form the high level structure of a smart card 102 in accordance with one embodiment of the present invention. In the particular embodiments shown, the smart card is implemented using a Java Card system. Such a system is described for example in: "Java Card Technology for Smart Cards: Architecture and Programmer's Guide" by Zhiqun Chen, Addison-Wesley, 2000, ISBN 0201703297, while the formal Java Card specification is available for download from: http://java.sun.com/products/javacard/specs.html. Both of these texts are hereby incorporated by reference. Nevertheless, it will be appreciated that smart card 102 is not limited to the Java Card platform, and that alternative embodiments of the invention can be implemented on any suitable smart card platform.

Note that while smart card 102 is conveniently implemented in a plastic device similar in size and shape to a conventional credit card, in alternative embodiments it takes a variety of other portable formats, such as a ring, or a pendant, and so on. In other embodiments, smart card 102 comprises a token or similar device, such as for use in authentication. In addition, smart card 102 can be integrated into another electronic device. For example, in some embodiments smart card 102 comprises a Subscriber Identity Module (SIM) card for use in a GSM mobile telephone, or a Wireless Interface Module (WIM) for use in a device that supports the Wireless Application Protocol (WAP), or a Universal Subscriber Identity Module (USIM) card or a User Identity Module (UIM) for use in a 3rd Generation Partnership Project mobile telephone.

Smart card 102 can be regarded as having a layered structure, with hardware at the bottom. The hardware for a card comprises a CPU 311, a cryptographic facility 312, an input/output unit 313 and memory (random access memory (RAM), read only memory (ROM), electrically erasable programmable read only memory (EEPROM)) 314. Running on the hardware platform is a card executive layer 318, usually an operating system (OS) particular to the specific hardware platform involved. The card executive layer comprises an applet selector 412, whose operation will be described in more detail below.

On top of the card executive layer is the Java Card runtime environment (JCRE), which comprises the Java Card virtual machine (VM) 320. Note that the Java Card VM itself is generally specific to the particular card executive layer 318, but then presents the standard Java Card API 330 to application software 351 running on the smart card 102.

The Java Card device 102 depicted in FIG. 3 has (by way of example) five loaded applets 351A, 351B, 351C, 351D and 351E. Each applet 351 comprises a card AID interpreter 411, which will be described in more detail below. The applets 351A, 351B, 351C, 351D and 351E generally extend (i.e. subclass) a base applet class 321 provided by the JCRE 320. Similarly, the AID interpreters 411A, 411B, 411C, 411D and 411E extend a base AID interpreter class 322, which is also provided by the JCRE 320. Note that one or more of applets 351A, 351B, 351C, 351D and 351E may be from different vendors. It will be appreciated having multiple applications from different vendors installed on a single card avoids the need for a user to have to carry around multiple cards, one for each vendor or application provider.

The applets 351 are arranged into three groups, separated from another by firewalls 360. Thus applets 351A and 351B are in firewall 360K, applet 351C is in firewall 360L, and applets 351D and 351E are in firewall 360M. Applets 351 can share data within a firewall 360, but not generally from one firewall to another. One motivation for having two or more applets within a single firewall is where one applet manages the code and classes of the other application(s) that are within the same firewall. It is expected that all the applets within a particular firewall are controlled by the same RID operator (i.e. they have the same RID).

It will be appreciated that applets 351 are static, in that all the code they use is already stored in smart card 102. In other words, applications do not download any code from terminal 110 or elsewhere except during initial applet installation, at which time all the applet code is loaded for storage onto smart card 102 as part of the applet installation process.

In existing systems, it is difficult for external programs, such as may be running on a terminal 110, to ascertain and confirm the firewall structure of an inserted smart card. In other words, it is difficult for the terminal to deduce the allocation of applets 351 to firewalls 360, such as depicted in FIG. 3. Nevertheless, such information may be useful for the terminal in knowing how to handle the card in question, for example, because an applet can only access data within its own firewall. Furthermore, when an applet is first installed onto the card, it is clearly important to determine the correct firewall for the applet, so that the applet is installed into the proper location.

Figure 4:
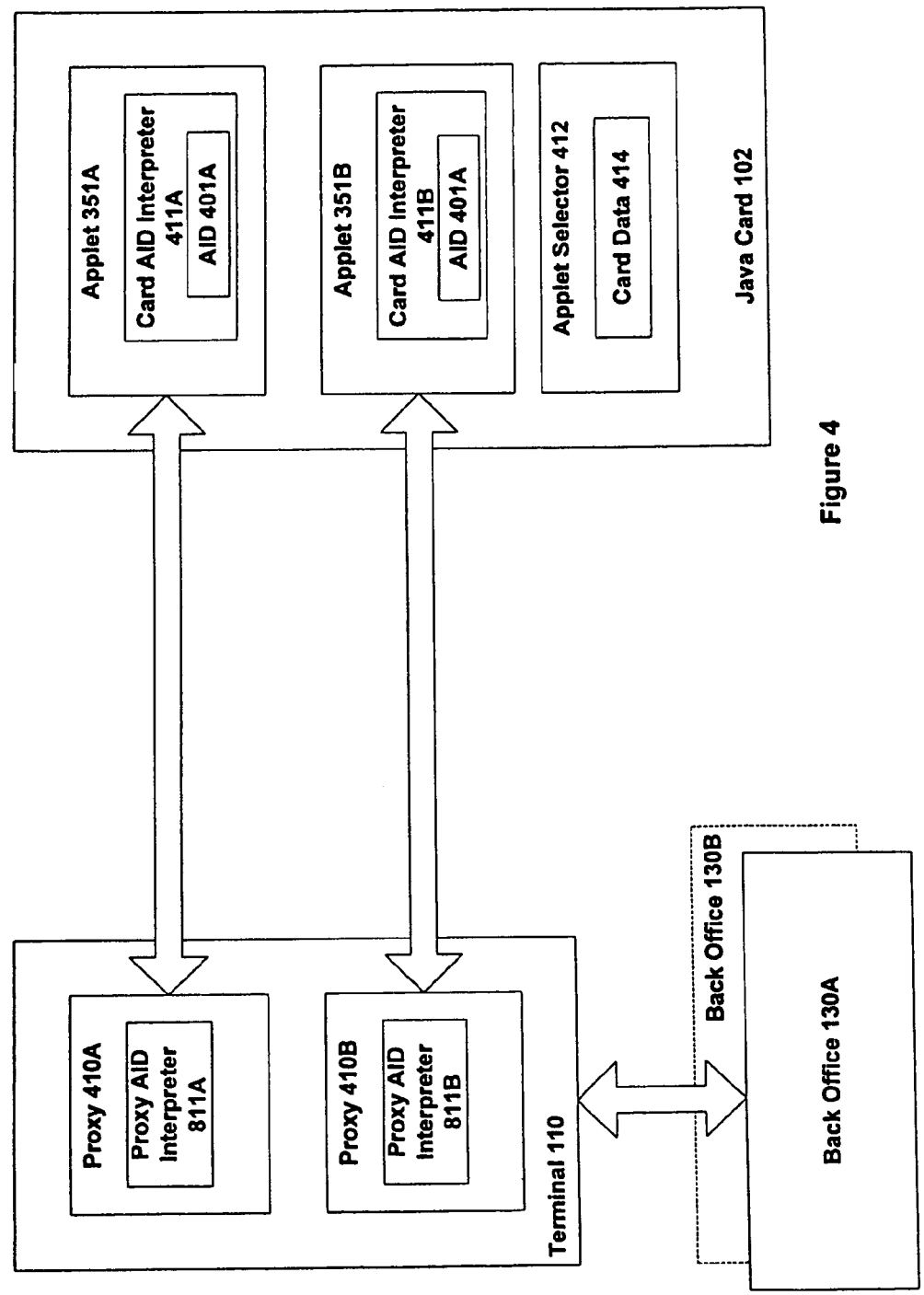
FIG. 4 is a schematic diagram illustrating the interaction between a smart card and a terminal in accordance with one embodiment of the invention.

FIG. 4 depicts in schematic form the interaction between a smart card 102 and a terminal 110 in accordance with one embodiment of the invention. The smart card 102 comprises multiple applets, 351A, 351B, etc., each incorporating its own AID interpreter object, 411A, and 411B respectively. Each applet 351 also comprises its own AID 401. From a logical perspective, the AID 401 for a card can be regarded as contained with the card's AID interpreter 411. Thus a card AID interpreter 411 is responsible for providing access to the AID 401 (and parts thereof) for the applet 351 concerned. This interaction between the card AID interpreter 411 and the AID 401 is described in more detail below.

In operation, the smart card 102 contacts a terminal 110, which contains one or more proxies (410A, 410B). As shown in FIG. 4, there is a corresponding back office application 130A, 130B for each proxy. Note that in FIG. 4, there is a one-to-one correspondence between a proxy 410 in the terminal 110 and an applet 351 on smart card 102, although in other embodiments one proxy 410 may be associated with multiple applets 351. Each proxy comprises its own proxy AID interpreter 811 (again as described in more detail below).

If there is only a single proxy 410 installed on terminal 110, this can be set to trigger automatically when a card 102 is inserted into the terminal 110 (or otherwise engages with the terminal). Note that the proxy need not be terminated after each session with a card, but rather may only be suspended pending insertion of a new (potentially different) card. This helps to reduce proxy start-up time for the new card interacting with a terminal.

Figure 5:
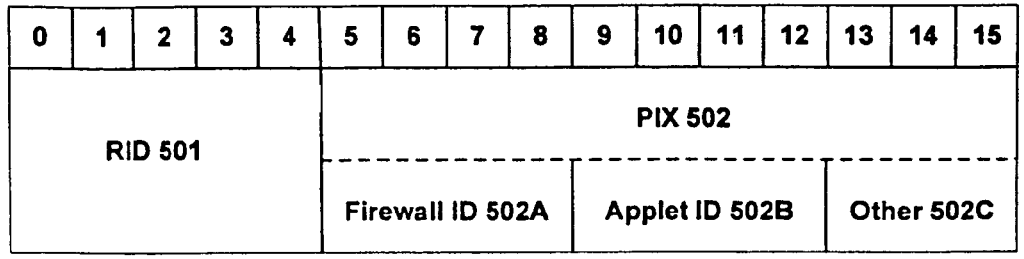
FIG. 5 illustrates the composition of an AID in accordance with one embodiment of the invention.

FIG. 5 illustrates the structure of an AID in terms of byte string 401 in accordance with one embodiment of the present invention. As previously described, an AID 401 is divided into two portions in accordance with the international standard ISO/IEC 7816-5. In particular, the AID commences with a 5-byte RID portion 501 that identifies the supplier or operator of the applet 351 (i.e. the RID operator), and then has an 11-byte (maximum) proprietary application identifier extension (PIX) portion 502, whose format and content are under the control of the RID operator identified by the RID.

FIG. 5 further illustrates various subfields within the PIX portion 502 of the AID 401, in accordance with one embodiment of the present invention. Thus the PIX portion 502 is used to store both an identifier 502A of the firewall 360 that contains the applet concerned, and also an identifier 502B of the particular applet 351 itself. If required, additional information 502C can also be encoded into the PIX, as described later in more detail.

It will be appreciated that in contrast to the high-level breakdown of the AID 401 into RID and PIX portions, which is specified by the ISO7816-5 standard, there is no such standardization of the subfields within the PIX portion 502. Accordingly, the sizes and layout shown in FIG. 5 for the Firewall ID portion 502A, the Applet ID portion 502B, and the Other portion 502C are illustrative only, and may vary from one applet to another. For example, in one embodiment the bytes allocated to a particular subfield are not contiguous. Thus the Applet ID 502B can be stored in two separate blocks, with bytes indicative of the Firewall ID 502A located in-between. Furthermore, one or more of these subfields can be omitted altogether if not required by a particular RID operator. All such variations are of course still constrained by total size of the PIX 502, which is limited to 11 bytes (or at least no greater than 11 bytes), in conformity with the international ISO/IEC standard.

One motivation for storing the Firewall ID 502A within AID 401 is that although all applets in the same firewall are expected to relate to the same RID operator (i.e. have the same RID 501), the converse is not true. In other words, applets having the same RID may be located in different firewalls. This might arise if the cardholder has more than one relationship with an RID operator, and these different relationships are to be kept independent. One common situation in which this may occur is where an organization (such as a bank) is responsible for both a general card management application, and also some particular application for account manipulation, e.g. cash withdrawal from an ATM. In this case, the general card management application is likely to have privileges that should not be extended to the specific application for account manipulation. Another possibility is where a contractor for a large supermarket may have identity information encoded in a card to allow them to access particular areas of the supermarket in a business capacity. At the same time, the contractor may also have a loyalty or reward program installed in their card for when they make personal purchases at the supermarket.

FIGS. 5A, 5B, 5C, and 5D illustrate schemes for storing an AID byte string 401 within an applet 351 in accordance with alternative embodiments of the invention. In all cases the AID is accessed via the card AID interpreter object 411. The card AID interpreter object 411 supports a predetermined set of method calls to perform operations on the AID, such as (for example) get_AID( ), which accesses and returns the complete AID, get_RID( ), which accesses and returns just the RID component of the AID, etc. From the perspective of other software, the card AID interpreter 411 may therefore be regarded as an AID object. (Any separate existence of an AID object internal to the AID interpreter is transparent to software external to the AID interpreter).

The internal implementation of the card AID interpreter 411 differs between the various embodiments shown in FIGS. 5A, 5B, 5C, and 5D. However, it will be appreciated that these differences are transparent to (i.e. hidden from) software that uses the card AID interpreter 411 to access the AID and its components (due to object encapsulation). Thus in all cases there is a common method signature for the card AID interpreter class 411. Nevertheless, differences in the internal implementation of the card AID interpreter 411 may have implications for performance, required storage capacity, and so on, as will now be discussed.

In the embodiments illustrated by FIGS. 5A, 5B, 5C, and 5D, the underlying AID byte string 401 itself is stored in one or more byte arrays, although any other appropriate form of storage primitive(s) could be used. A byte array is then accessed via a buffer object 561, which is a general purpose object that provides method calls for accessing and manipulating its byte array of stored data (i.e. in this case the AID). However, the buffer object 561 has no knowledge of the internal composition of the stored data, such as that the first portion of the AID byte array represents the RID 501, and the second portion of the AID byte array represents the PIX 502.

Figure 5A:
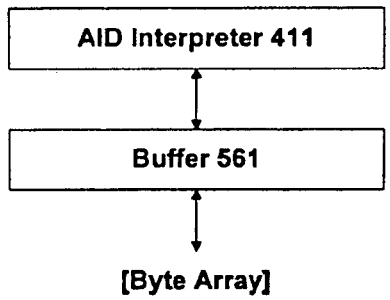
FIGS. 5A, 5B, 5C, and 5D illustrate the structure of an AID interpreter in accordance within certain embodiments of the invention.

In the embodiment of FIG. 5A, there is relatively little internal structure, and the card AID interpreter 411 calls the buffer object 561 directly in order to access the stored AID data. The card AID interpreter 411 therefore acts in effect as a wrapper for buffer object 561. In a variation on this configuration, the card AID interpreter 411 may be implemented as an extension of the buffer object 561. In either case, the AID interpreter 411 therefore has knowledge of the structure and coding of an AID 401, in order to be able to derive the various AID components from the full stored AID.

Figure 5B:
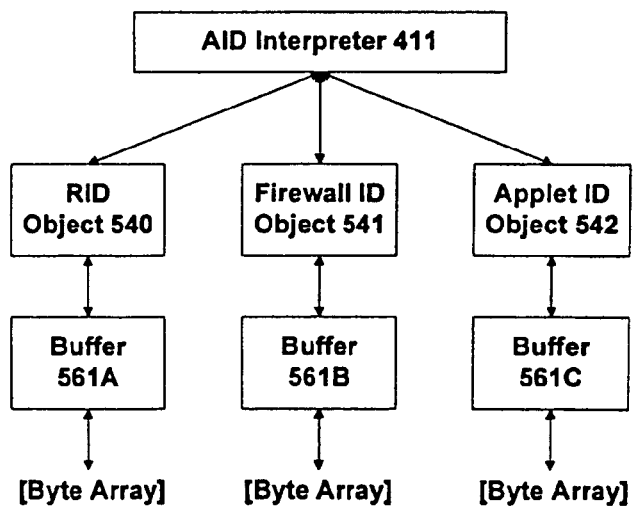

FIG. 5B illustrates an alternative implementation of the card AID interpreter 411, in which three components of the AID, namely RID 501, Firewall ID 502A, and the Applet ID 502B, are each represented by a respective (sub)object, namely RID object 540, Firewall ID object 541, and Applet ID object. These three subobjects interact with respective buffer objects 561A, 561B, 561C. (It is assumed here that the PIX portion comprises only a Firewall ID 502A and Applet ID 502B—i.e. that there is no Other portion 502C in this particular PIX 502). When card AID interpreter 411 receives a method call for the AID or one of its components, it calls the relevant subobject(s). For example, in response to a getRID( ) call, the card AID interpreter 411 calls the RID (sub)object 540, while in response to a getAID( ) call, the AID interpreter 411 retrieves all the components of the AID (i.e. RID 501, Firewall ID 502A etc.) from their respective subobjects 540, 541, etc. In the latter case, the card AID interpreter then knows how to assemble the retrieved AID components into the complete AID.

It will be noted therefore that the embodiment of FIG. 5B does not store the AID byte string as a complete entity per se. Rather, the various components of the AID are stored separately (in different byte arrays). These components are then assembled in response to a call into the AID interpreter to dynamically generate the complete AID. (A more extensive use of dynamically generated AIDs will be described later in more detail).

Figure 5C:
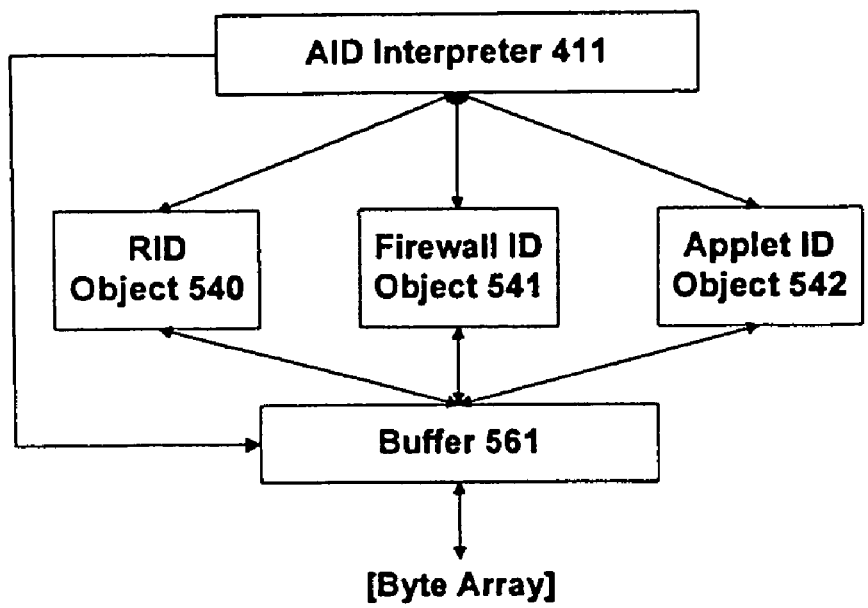

The embodiment of FIG. 5C represents something of a hybrid between the embodiments of FIGS. 5A and 5B. Thus in the embodiment of FIG. 5C, the AID subobjects (i.e. RID object 540, Firewall ID object 541, and Applet ID object 542) all access a single buffer object 561, which is used to store the complete AID. This use of a common buffer for holding the AID generally permits a more compact storage than the three separate buffers shown in FIG. 5B.

Note also that in the embodiment of FIG. 5C, the card AD interpreter 411 itself is also able to communicate with buffer 561 directly, i.e. not through one of the subobjects. This helps to speed up operations involving the whole AID (i.e. it avoids having to reconstruct the AID from its various components).

Figure 5D:
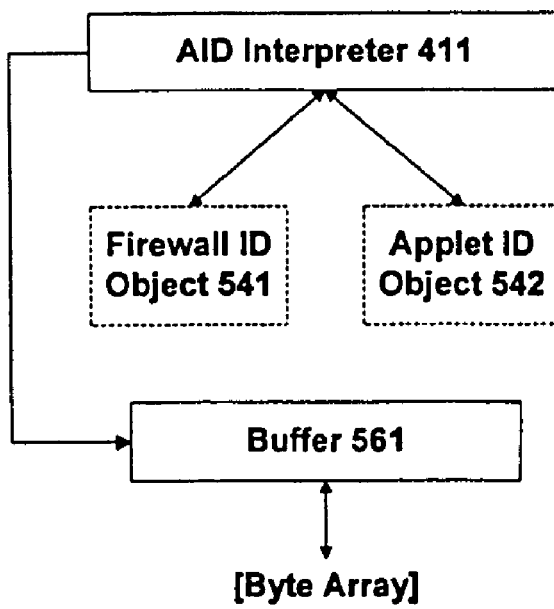

FIG. 5D illustrates another embodiment in which the Firewall ID object 541 and the Applet ID object 542 are implemented as transient objects (stored in RAM) rather than persistent objects (stored in EEPROM). In other words, the Firewall ID object 541 and the Applet ID object are only instantiated if particularly required, thereby saving storage on the card.

There are various trade-offs between speed, storage capacity, flexibility, and so on regarding the different embodiments of FIGS. 5A, 5B, 5C, and 5D. For example, the full subobject hierarchy of FIG. 5B provides a good logical representation of the AID structure, but may not offer the best performance levels.

Accordingly, it will be appreciated that the particular implementation adopted for card AID interpreter 411 in any given situation depends upon the circumstances in question. For example, one implementation may be selected if speed is of paramount concern compared to data and code storage capacity, while another embodiment may be selected if the relevant importance of performance and storage capacity is reversed. The skilled person will be aware of which embodiment to select for a given set of circumstances, and will also be aware of potential variations on the particular embodiments illustrated in FIGS. 5A, 5B, 5C, and 5D.

Returning now to the interaction between a smart card and a terminal, such as illustrated in FIG. 4, the provision of multiple (potentially unrelated) applications on a smart card makes it important that the correct application is selected and utilized for any particular session. Note that terminal 110 itself may be dedicated to a single type of application, or may instead support a range of applications.

Figure 1B:
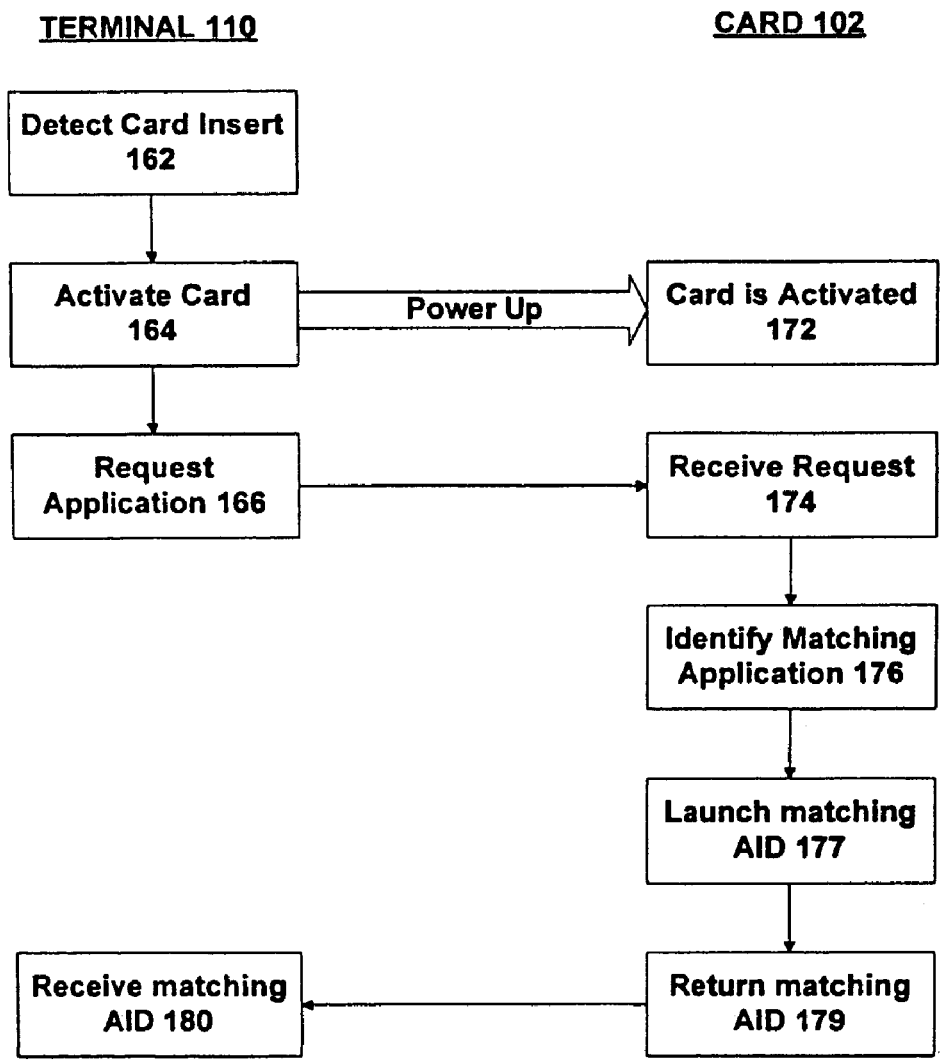
FIG. 1B is a flowchart whereby a terminal selects and launches one application out of potentially multiple applications on a smart card by providing a full AID to the smart card.

In accordance with one embodiment of the invention, the interaction between a smart card and a terminal still follows in general terms the high-level pattern set out in FIG. 1B. However, at a more detailed level, the procedure is significantly different, as illustrated in FIG. 6, which depicts processing in accordance with one embodiment of the invention.

Figure 6:
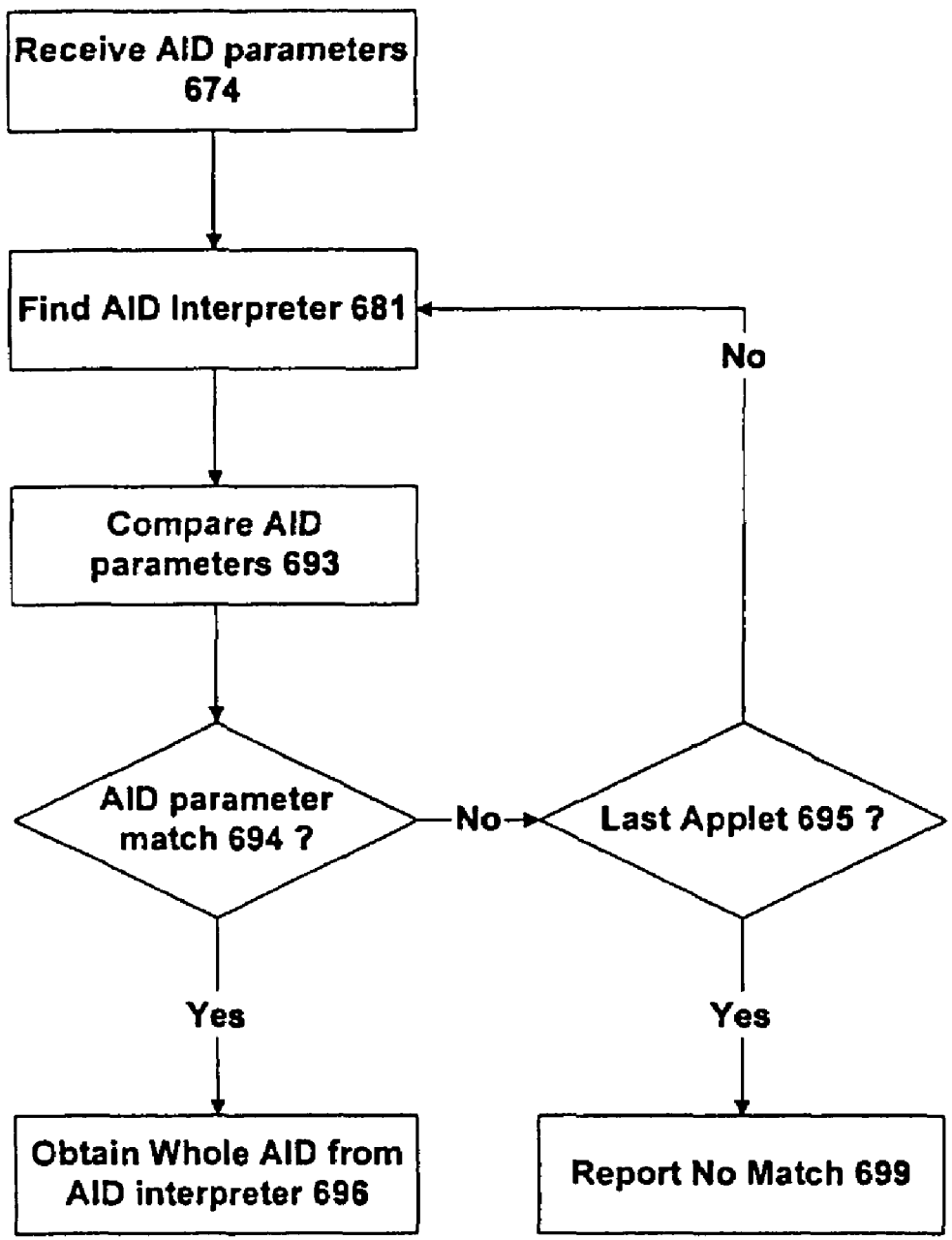
FIG. 6 is a flowchart depicting a procedure for matching an applet on a card in accordance with certain embodiments of the invention.

The processing of FIG. 6 commences with the receipt at 674 by the smart card 102 of a request from the terminal 110. This request generally corresponds to that transmitted at reference numeral 166 in FIG. 1B, except that the terminal 110 does not specify a single, complete (or partial) AID per se. Rather, the desired application is identified in terms of multiple parameters. These multiple parameters reflect the different components of the AID, for example as illustrated in FIG. 5.

It is now determined which application (if any) on the smart card is identified by the received parameters. This is achieved by comparing the received AID parameters against the AID parameters for the applications on the smart card, which as previously described can be accessed via the AID interpreter 411 for the corresponding applet. Accordingly, the AID interpreter 681 for each applet is located (681), thereby permitting the above comparison to be performed (693). Various mechanisms for performing this comparison are described in more detail below.

If the AID parameters from a particular applet match those received from the terminal (at reference numeral 694), then the complete AID is obtained from the relevant applet (696). This complete AID can then be returned to the terminal and the applet corresponding to the AID activated on the card (corresponding to reference numerals 177 and 179 in FIG. 1B).

If however the AID parameters from an applet on a card do not match those received from a terminal, then it is checked to see if there are any more applets to examine (695). If so, the AID parameters for these further applets are retrieved and tested against the AID parameters received from the terminal. However, if all the applets have now been tested without a positive response at 695, the smart card now reports to the terminal that it cannot find a match to the requested application (699).

Figure 6A:
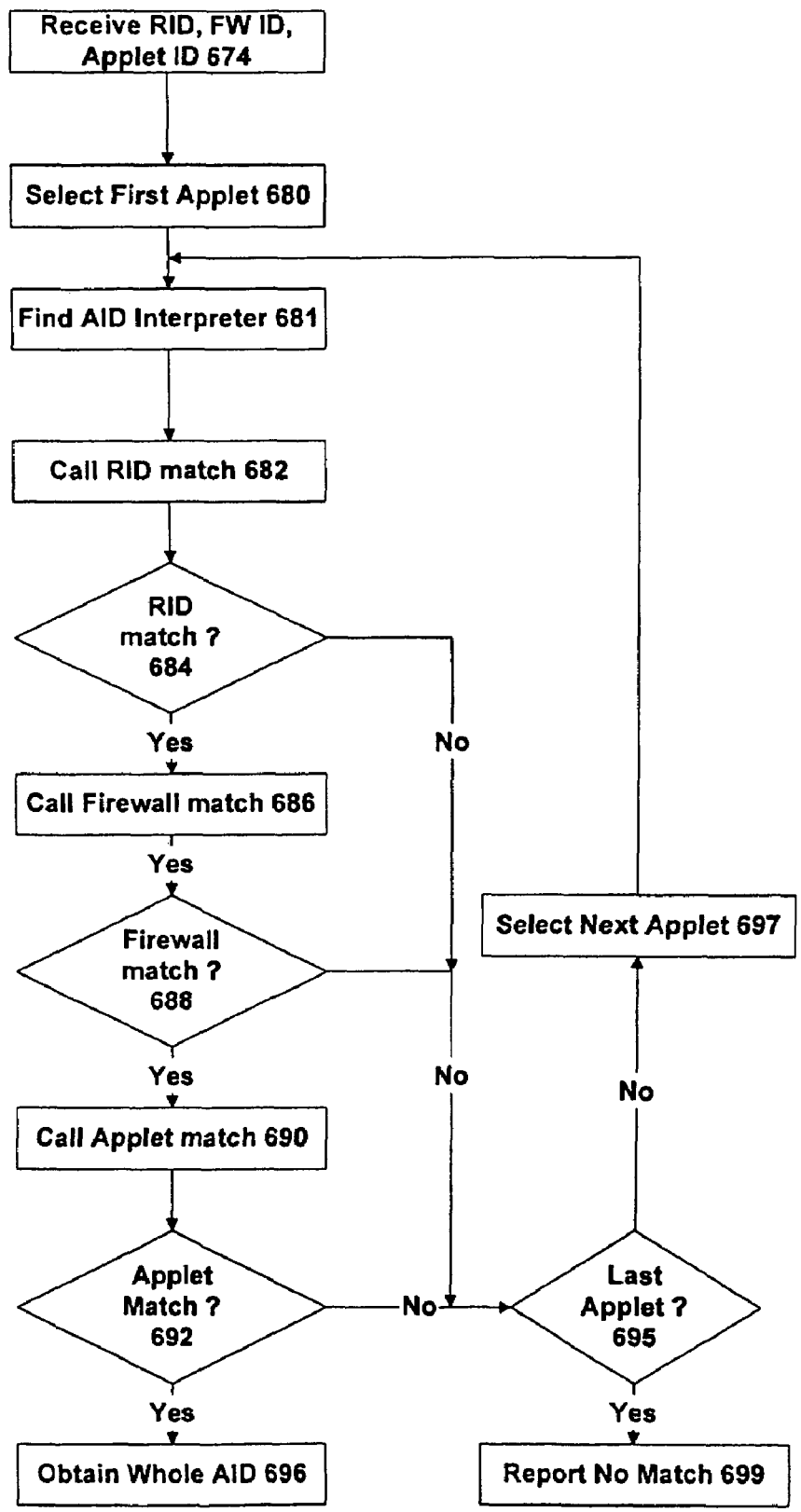
FIGS. 6A through 6E are flowcharts illustrating in more detail the procedure of FIG. 6 in accordance with various embodiments of the invention.

FIG. 6A illustrates in more detail the processing of FIG. 6 in accordance with one particular embodiment of the invention. As previously described, this processing commences with the receipt at 674 by the smart card 102 of a request from the terminal 110. In this embodiment the desired application is identified in terms of three parameters:
(i) an RID 501
(ii) a firewall identifier 502A; and
(iii) an applet identifier 502B.

Note that although these parameters are logically separate, they in practice be conjoined into a single string in the request itself in order to facilitate transmission between the terminal 110 and the smart card 102 (this is discussed in more detail below).

In one embodiment, if the firewall identifier 502A specifies a firewall that is known to contain at most only a single application, then the applet identifier 502 can be omitted. Conversely, the firewall identifier 502A can be omitted in one embodiment, for example if the applet identifier 502B is known to be unique to that RID 501.

A request containing the above three parameters is therefore received on the smart card at 674 by the applet selector 412 (see FIGS. 3 and 4). The applet selector then has to find an application 351 on the card that matches these parameters (corresponding in general terms to reference numeral 176 of FIG. 1B, or to reference numerals 681, 682, and 684 of FIG. 6). Thus following receipt from terminal 110 of the request specifying the RID 501, Firewall ID 502A, and Applet ID 502B of the desired applet, the applet selector 412 calls each installed applet to try to match these three parameters. More particularly, a first applet is selected (680), and the applet selector 412 calls this applet in order to obtain access to the card AID interpreter 411 within the applet (681).

Once the card AID interpreter for the applet has been located, the applet selector 412 calls a match_RID( ) method (or such-like) on the card AID interpreter 411 (682). In making the match_RID( ) call, the applet selector passes as a parameter the particular RID 501 that was received from the terminal—i.e. the RID to be matched. The card AID interpreter 411 then tests the received RID against the locally stored RID for that applet (684). The exact manner of performing this test will depend upon the method signature and internal implementation of the card AID interpreter 411, such as discussed above in relation to FIGS. 5A, 5B, 5C, and 5D.

After the card AID interpreter 411 has tested the RID received from the terminal against the RID for that applet, the matchRID( ) method call returns a positive or negative response as appropriate (684). If this response is negative, then it is known that this applet cannot be the one desired by the terminal 110, since the RID does not match. Accordingly, in this case the applet selector 412 proceeds to select another applet 351 on the card to test (697).

On the other hand, if an RID match is obtained at 684, the applet selector 412 next examines whether the Firewall ID received from the terminal matches the locally stored Firewall ID for the applet. This testing is again performed by making an appropriate call (e.g. match_FirewallID( )) from the applet selector to the card AID interpreter 411 (686). If the card AID interpreter produces a negative response to the match_FirewallID( ) call, the Firewall ID received from the terminal does not match the Firewall ID stored in the applet. Accordingly, the applet in question cannot be the one desired by the terminal. The applet selector therefore again proceeds to select the next applet for investigation (697).

Alternatively, if the testing of the Firewall ID at 688 results in a positive match, the applet selector 412 now examines whether the Applet ID received from the terminal matches the Applet ID stored within this applet (690). Again, this is achieved by making an appropriate method call into the card AID interpreter 411 (690). In response to this call, the card AID interpreter 411 tests the Applet ID received from the terminal against the Applet ID stored within the applet (692). If this test yields a negative outcome, then the applet in question cannot be the one desired by the terminal, since the Applet ID does not match. Accordingly, the applet selector 412 again proceeds to select the next applet for consideration (697).

On the other hand, if the test of Applet ID at 692 gives a positive result, then the desired applet been located, since the RID, Firewall ID and Applet ID must all match. In this case, the applet selector 412 calls the get_AID( ) method of the card AID interpreter 411. This call returns the complete AID for the matching applet (696), which can then be passed back to the requesting terminal (corresponding to reference numeral 179 in FIG. 1B). In addition, the matching applet will also be launched on card 102 (corresponding to reference numeral 177 in FIG. 1B).

Note that it has been assumed so far that there is a single applet 351 on a card that matches the terminal request. However, this assumption may not necessarily hold. Thus if the application 351 requested by the terminal 110 is not present on the card 102, then no matching applets will be found. This situation is accommodated in the flowchart of FIG. 6A where a test is made at 695 to see if all the applets have been examined. If so, and there are no further applets to investigate on the card, the applet selector 412 has to send a negative report back to the terminal (699), indicating that the requested application is not installed on the card. Depending on the particular terminal in question, this may terminate the session between the card and the terminal, or may lead the terminal to submit a request for a different application on the card (i.e. to specify a different set of RID 501, Firewall ID 502A, and Applet ID 502B parameters).

It is generally expected that the RID, Firewall ID and Applet ID reliably define a unique application, so that the situation of finding more than one matching applet on a card for a particular terminal request should not arise. However, in some embodiment, a more generic matching process can be utilized. For example, the terminal can be permitted to omit an applet ID from its request at 674. In this case, there may potentially be multiple matching applications (i.e. all the applications located within the specified firewall). One option would be to handle this situation similarly to the way in which existing systems handle a partial AID that matches multiple applications (i.e. by returning one match at a time for each terminal request). Another possibility is to modify the flowchart of FIG. 6A by proceeding from 694 (obtain whole AID) to 695. In this case, processing would always eventually arrive at 699, once the applet selector had investigated all the applets on the card. At this point the applet selector 412 can then return to the terminal the complete set of matching AID(s) that have been found, or report the absence of any match (as appropriate).

Figure 6B:
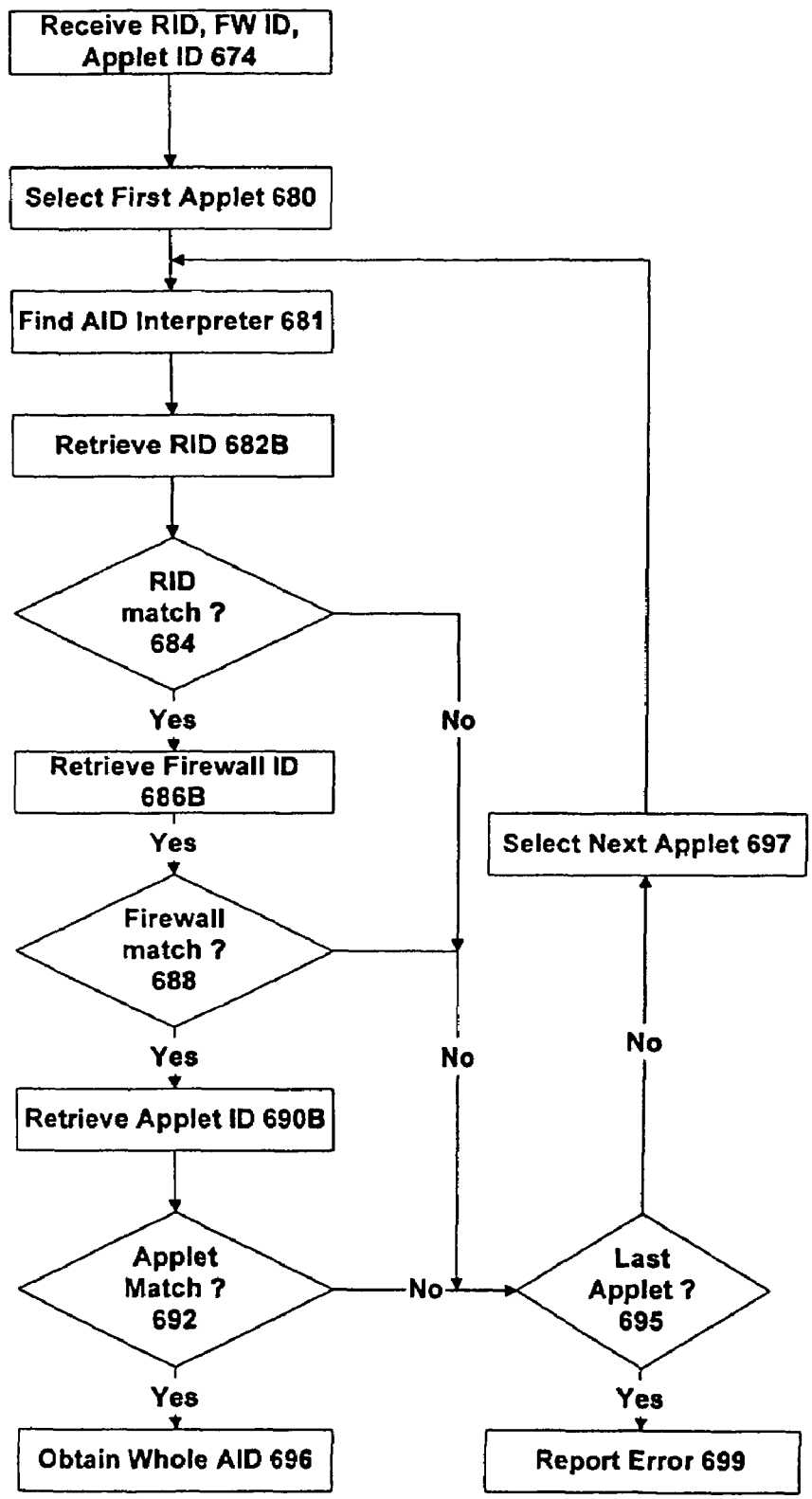

FIG. 6B depicts an alternative implementation of the application matching process in accordance with one embodiment of the invention. Note that many aspects of this embodiment are the same as for the embodiment of FIG. 6A, and so will not be described in detail. The main difference is that in this implementation it is the applet selector 412 that is responsible for performing the testing of the three input parameters, namely the RID 501, the Firewall ID 502A, and the Applet ID 502B (rather than the card AID interpreter 411, as in the embodiment of FIG. 6A).

The processing of FIG. 6B again starts when a terminal 110 sends a request containing the parameters identifying the desired application, and this request is then received by the smart card (674). However, instead of the applet selector 412 now passing these parameters to the selected individual applets 351 (as in the embodiment of FIG. 6A), in this embodiment the applet selector 412 calls the card AID interpreter 411 for each selected applet in order to retrieve the corresponding parameters stored in that applet. Thus the applet selector retrieves the RID 501 for a selected applet from the card AID interpreter 411 at 682B, the Firewall ID 502A for the selected applet from card AID interpreter 411 at 686B, and the Applet ID 502B for the selected applet from card AID interpreter 411 at 690B. The retrieval of 682B can be regarded as being performed using a getRID( ) call, in contrast to the match_RID( ) call used in the embodiment of FIG. 6A.

After each parameter has been retrieved from the card AID interpreter 411, the Applet selector 412 tests the retrieved parameter against the corresponding parameter received in the request from the terminal. Thus applet selector 412 tests at 684 for a match of RID 501, at 688 for a match of Firewall ID 502A, and at 692 for a match of Applet ID 502B. If all three matches turn out positive, then the desired applet has been identified, and the applet selector can request the complete AID for this applet from the relevant card AID interpreter (694). (Note that the applet selector 412 itself will not generally know how to form a complete AID from the three parameters it already has, nor will it know whether any additional information, such as Other 502C (see FIG. 5), might be required for such a task).

The applet selector can then return the complete AID back to the terminal that originally submitted the request (corresponding to reference numeral 179 in FIG. 1).

Figure 6C:
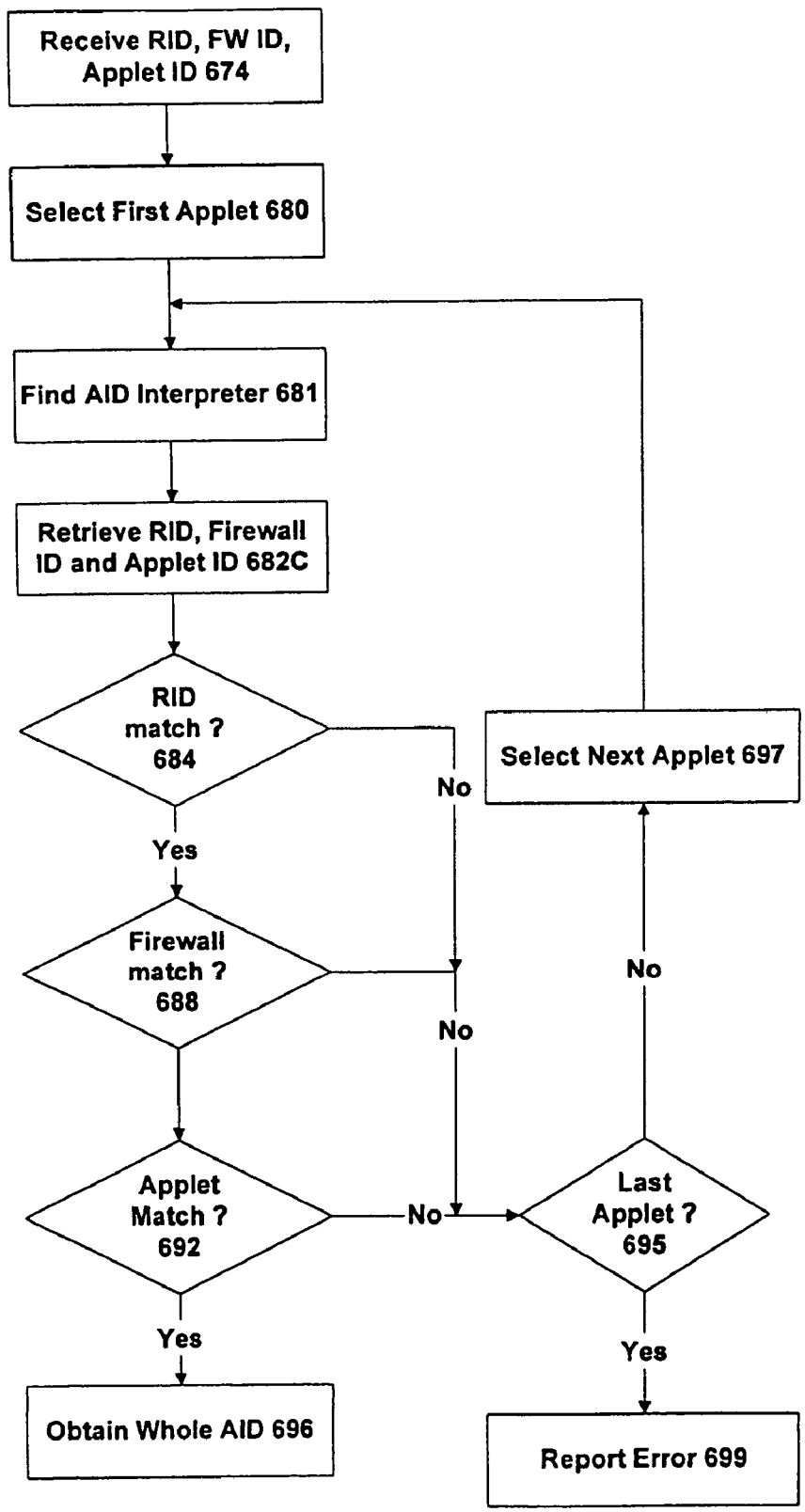

It will be appreciated that there are many variations on the above approach. For example, rather than investigating the RID, the Firewall ID, and the Applet ID in turn, the card AID interpreter 411 can support a single combined method call to match (or retrieve) two or three of these identifiers at once. One example of this is shown in FIG. 6C, which depicts processing in accordance with one embodiment of the invention. The flowchart of FIG. 6C is broadly similar to the flowchart of FIG. 6B, except that the applet selector retrieves all three parameters, namely the RID, the Firewall ID and the Applet ID, in a single operation at 682C. These three retrieved parameters can then be matched against the parameters received from the terminal, in the same way as described for FIG. 6B. Note that in one embodiment, the selector can retrieve the complete AID at 682C as well as the various AID components, in which case reference numeral 696 of FIG. 6C can subsequently be omitted.

Figure 6D:
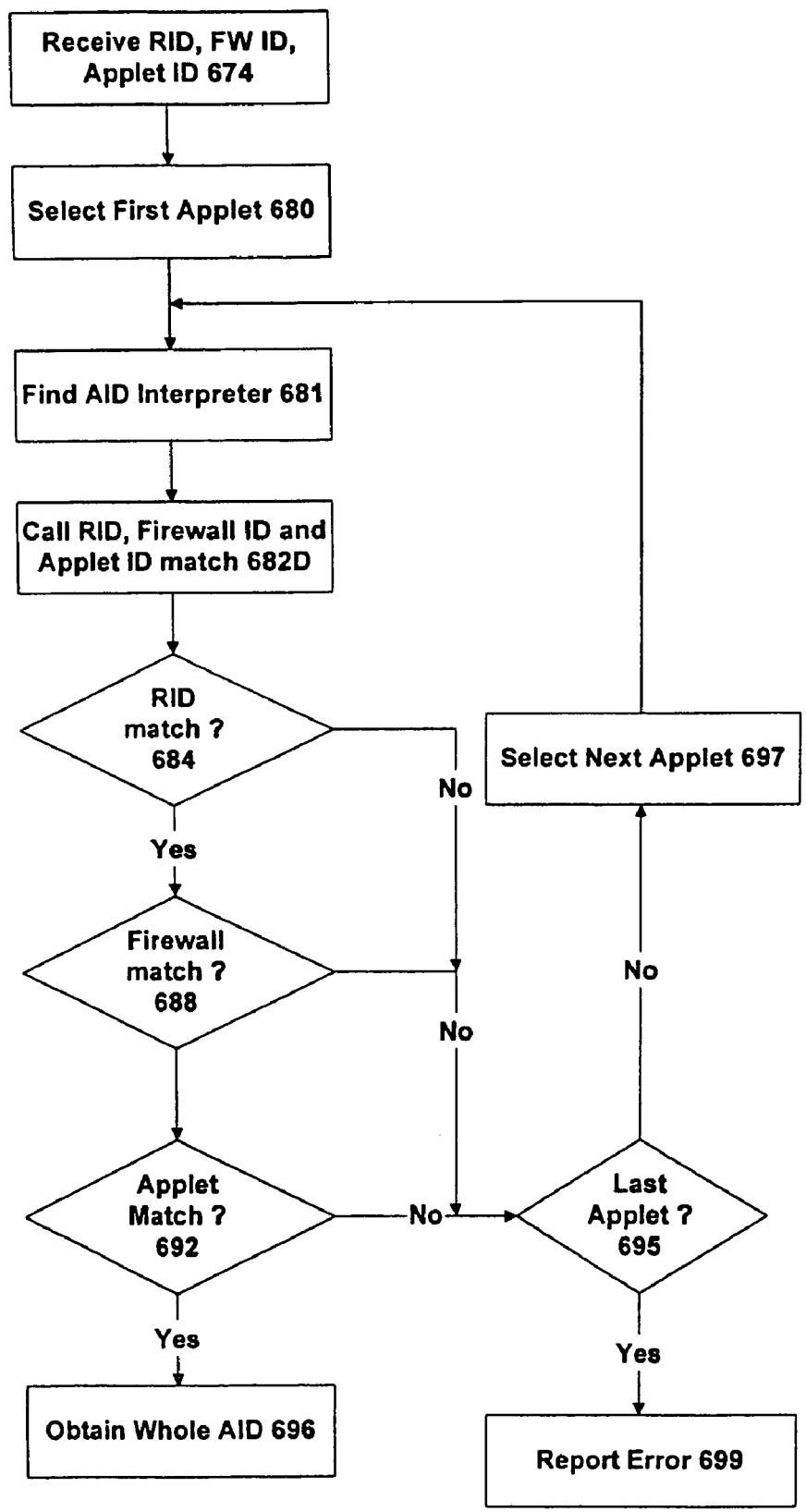

FIG. 6D illustrates a further embodiment, which is the same as that of FIG. 6C, except that the parameter matching is performed by the various AID interpreters 411 at 682D (as in FIG. 6A), rather than by the applet selector. Thus in the embodiment of FIG. 6D, the applet selector 412 invoke a (combined) call on the AID interpreter 411, and as part of this call passes to the card AID interpreter 411 of an applet the parameter triplet of RID 501, Firewall ID 502A and Applet ID 502B received from the terminal (682D). The card AID interpreter 411 then tests these three parameters against the corresponding components of the AID stored within the relevant applet (reference numerals 684, 688, and 692). If all three parameters match, then the card AID interpreter 411 returns a positive response to the call. On the other hand, if one or more of the parameters do not match, a negative response is returned. (N.B. In one implementation, in the event of all three parameters matching, the card AID interpreter 411 comprises the complete AID string in its return to the applet selector 412, thereby avoiding the applet selector having to make a separate request for this at 696).

Figure 6E:
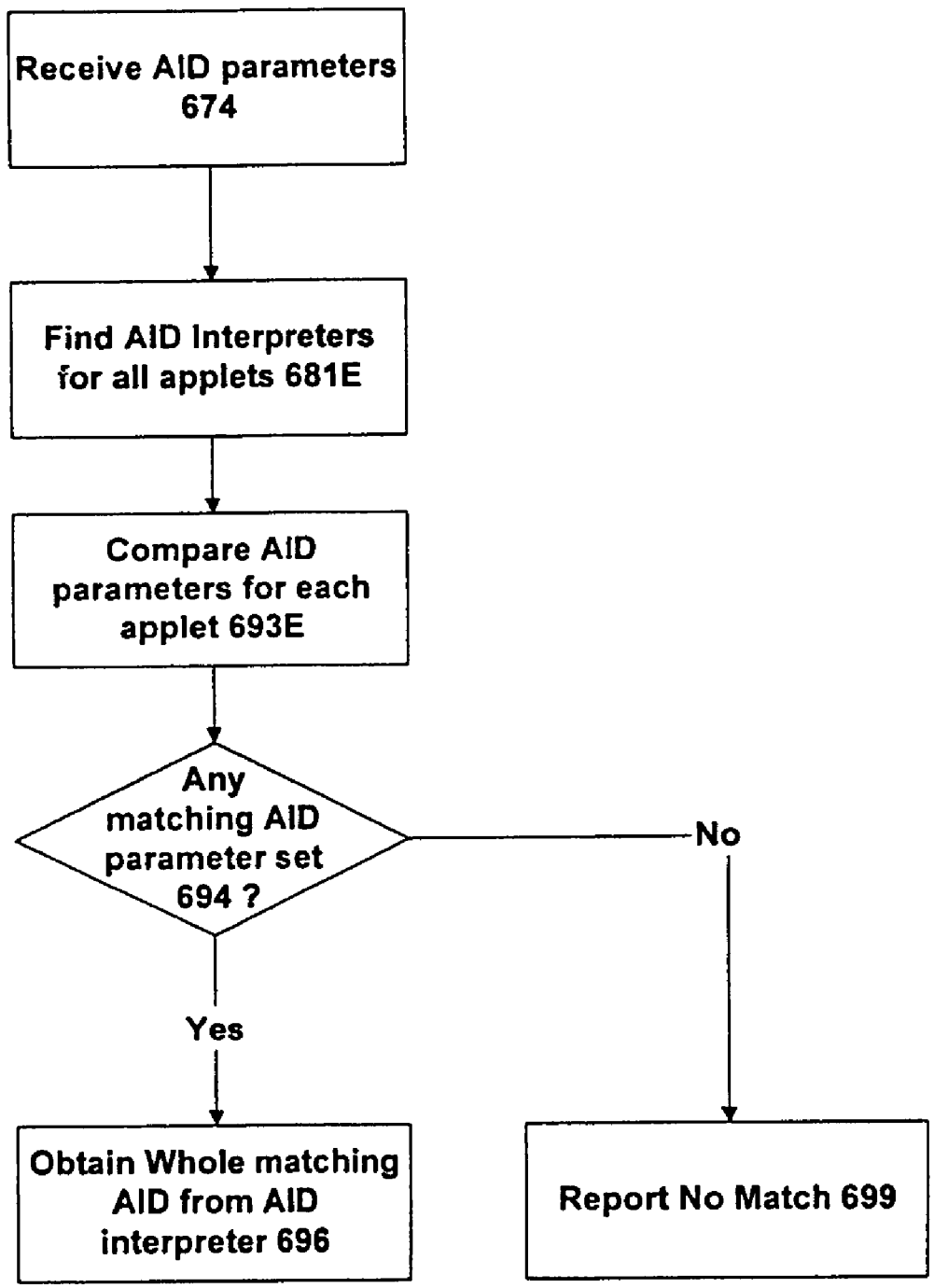

A further possible variation is that rather than the applet selector investigating the different applets on a card sequentially (i.e. one applet at a time), as in FIG. 6, the applet selector 412 instead investigates multiple (potentially all) applets at the same time. In other words, the processing of FIG. 6 (reference numerals 681 through to 694 in particular) is performed for each applet in parallel. This is illustrated in the flowchart of FIG. 6E, which depicts processing in accordance with one embodiment of the invention. Note that the processing of FIG. 6E can be performed by any suitable parallel implementation of the flowcharts of FIG. 6A through 6D, in which case the loop back via reference numeral 697 is clearly omitted. The applet selector 412 can then collate the results from each separate applet in order to determine overall whether a matching applet has been identified.

Figure 6F:
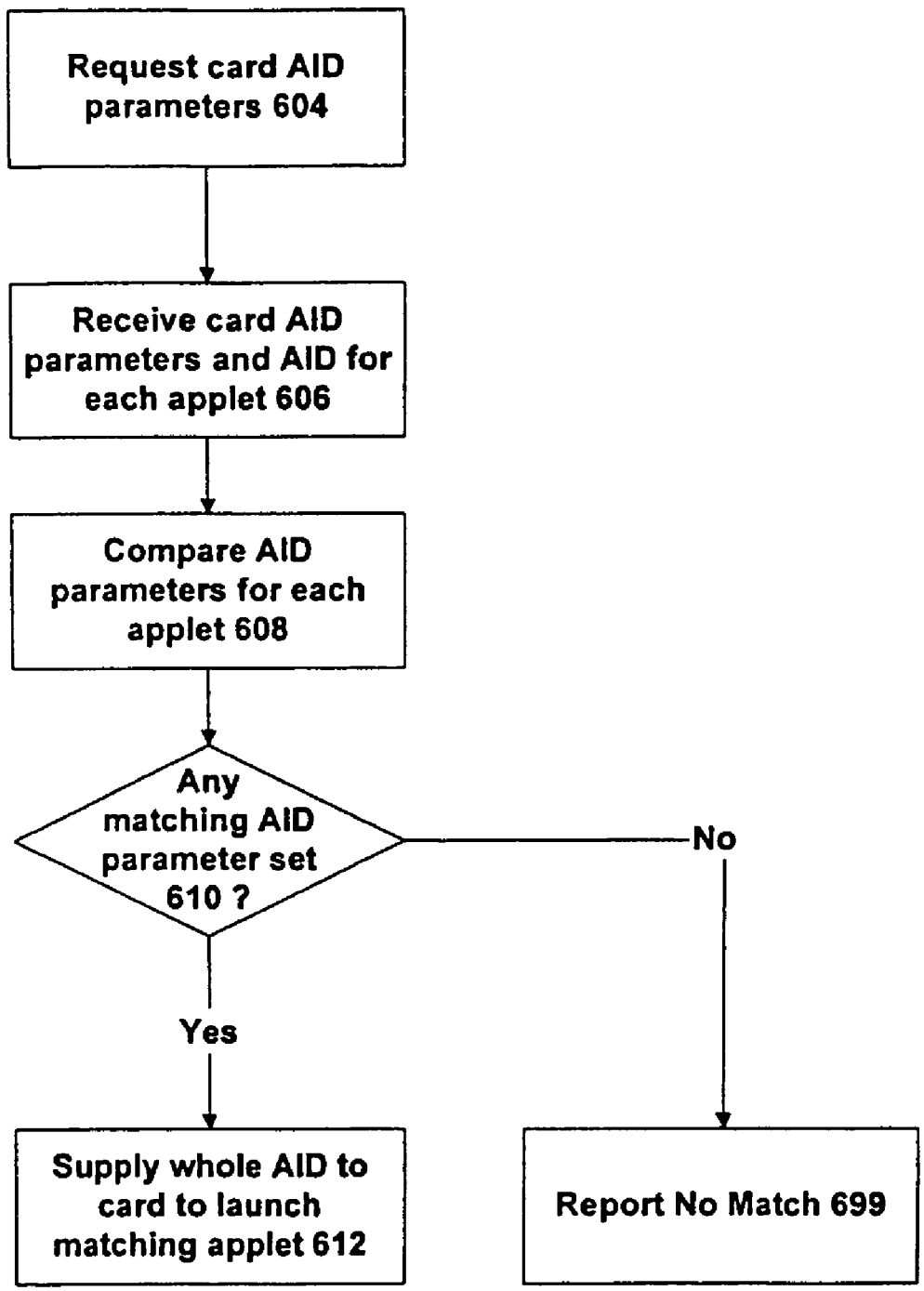
FIG. 6F is a flowchart depicting a procedure for matching in the terminal an applet on a card in accordance with one embodiment of the invention.

Although the embodiments of FIG. 6 through to 6E all perform the applet matching on the smart card 102, this matching can also be performed on terminal 110, as illustrated in the flowchart of FIG. 6F, which depicts processing in accordance with another embodiment of the invention. The flowchart of FIG. 6F commences with the terminal requesting information about the applets on the card 102 (604). In response, the terminal receives the RID 501, firewall ID 502A and applet ID 502B as well as the complete AID 401 for each applet on the card (606). This allows the terminal to try to identify the desired applet, based on matching its RID 501, firewall ID 502A and applet ID 502B (610). Once this applet has been identified, the terminal can now ask the applet selector 412 to launch or activate this applet by specifying the corresponding (complete) AID (612). A further possibility is for the terminal itself to comprise a proxy AID interpreter 811, as described in more detail below.

It will be appreciated that selecting an application on the basis of the RID 501, Firewall ID 502A, and Applet ID 502B avoids a terminal 110 having to identify a desired application by its precise AID 401. This considerably enhances flexibility compared to existing implementations, in which a terminal has to provide a full or partial AID, and receives back the full AID for each matching application. In particular, it is now possible for the contents and format of an AID 401 to vary without compromising compatibility with the terminal 110, provided that the Firewall ID 502A and Applet ID 502B themselves are maintained constant.

There are several reasons why such variation in the contents and structure of an AID 401 may occur. For example, the PIX portion 502 of the AID can be used to store additional information (i.e. Other 502C, as shown in FIG. 5) which is potentially variable. Such additional information can relate to the card itself, such as its remaining memory capacity. Another possibility is that this additional information relates to the card application corresponding to the AID in question. For example, the Other 502C portion can comprise a version number or configuration details for the application. According to one embodiment, the information in the Other 502C portion is used for application selection. According to another embodiment, the information in the Other 502C portion is used for further processing of the session.

The additional information stored in the Other 502C is normally not available to the terminal 110 (prior to interaction with card 102). Consequently, the terminal does not know the entire AID for matching. However, using an approach such as illustrated in FIGS. 6 though 6F, the terminal can still locate the desired application on the card by virtue of the application's RID, Firewall ID, and Applet ID, which the terminal does know in advance.

Of course, existing systems can potentially accommodate additional (variable) information in the AID by placing such information at the end of the AID, and then using a partial match on the prior (fixed) portion of the AID. However, this requires the terminal to know in advance the specific byte sequence for the partial AID. Furthermore, it also restricts the placement of any variable information to the end of the AID. In contrast, the approach described herein does not impose any restrictions as to where or how the Firewall ID 502A and the Applet ID 502B are stored within the PIX portion 502 of the AID. For example, they could be located at the end of the AID, after any other (potentially variable) information.

In one embodiment, the terminal and the AID interpreter apply a shared or common data representation to the Firewall ID and the Applet ID. This common data representation can correspond to a primitive data type (such as an integer), or to a complex data type (such as a 16-byte string). This shared representation is generally larger than the actual number of bytes allocated to each parameter inside the stored AID (which is of course limited to a maximum of 11 bytes corresponding to the size of the PIX portion 502 of the AID). Consequently, the AID interpreter 411 performs the appropriate size conversion between the internally stored Firewall ID (of say 3 bytes) and the external data representation of the Firewall ID (of say 16 bytes), and vice versa, as required.

Having a shared data representation for external manipulation of the Firewall ID 502A and/or Applet ID 502B portions allows the internal storage of these parameters to be altered without impacting terminal compatibility. For example, a particular supplier (i.e. having a particular RID 501) may have originally allocated a certain portion of the PIX 502 to the Firewall ID 502A and the remainder to the Applet ID 502B. However, it may subsequently transpire that there are a greater number of potential Firewall IDs than can be accommodated within the initially allocated portion. In this situation, the supplier may decide to increase the portion of the PIX 502 used to store the Firewall ID 502B. Since terminal 110 is only concerned with the external manifestation of these parameters, such modifications are quite transparent to the terminal. (In contrast, if the terminal 110 were matching a precise AID string, as in existing systems, the byte reallocation between the Firewall ID and the Applet ID is potentially problematic).

A further possibility is to divide the PIX portion at the bit (rather than byte) level, which helps to maximize utilization of this very limited coding space—e.g. a single byte can be split across two or more fields. This then requires somewhat more complicated processing of the internal representation (i.e. within the AID interpreter), given the need to work with individual bits. However, if the common data representation is maintained at the byte level, external programs (such as running on terminal 110) are shielded from the complexities of the internal bit operations.

It will be appreciated that if the internal data format within the AID interpreter is different from the common data representation, then operations involving getting (reading) or matching an AID component have to perform a conversion from internal to external format. The conversions for such reading or matching operations can be achieved in a straightforward manner by prepending the appropriate number of null bytes (e.g. 13 in the above case) in order to convert from an internal format into an external format.

Note that the situation is a little more complex in reverse, when going from the external representation to the internal representation. In these circumstances, the value supplied from the terminal will generally be longer (say 16 bytes) than the space available (say 3 bytes) within the AID byte array on the card (or other internal storage facility). If most of the bytes in the AID parameter passed from the terminal to the card are zero, they can be truncated to fit the parameter into the AID byte array. On the other hand, if a non-zero byte is to be truncated, then this generally represents an error situation, and should be flagged accordingly. However, the AID components in question (i.e. the Firewall ID portion 502A and the Applet ID portion 502B) are not normally updated after applet initialization, thereby avoiding difficulty in this respect.

In summary therefore, the present approach matches AID parameters (generally RID 501, Firewall ID 502A and Applet ID 502B) via an AID interpreter in order to identify a desired application on a card. The precise manner in which the AID and its components are encoded and stored onto card 102 is hidden behind the AID interpreter, and need not be known to the terminal 110. This then enables terminal 110 to use a relatively stable and straightforward interface to identify applications across a wide range of cards 102, preserving compatibility without unnecessarily constraining the contents of the AID itself. Consequently, the extra level of indirection, whereby the AID 401 contents are only accessed via AID interpreter 411, provides great flexibility as to how the AID 401 is utilized and updated.

Note that although FIGS. 6 through 6F depict from the handling of an AID in terms of multiple (logical) components, it will be appreciated that from an implementation perspective the separation of these parameters can be less apparent. For example, in communications between the smart card 102 and the terminal 110, the parameters (i.e. RID 501, Firewall ID 502A and Applet ID 502B) can be combined into a single byte sequence for ease of transport and manipulation (e.g. as a data packet). This implies that in addition to a single common data representation for the parameters themselves, there can be a standard way of packing them into a single byte sequence or other appropriate transport format.

Likewise, although the different parameters are depicted in FIG. 5 as independent of one another, this need not necessarily be the case. For example, in some embodiments the firewall ID can in fact be defined as the concatenation of RID portion 501 and Firewall ID portion 502A. It will be appreciated that such an approach still allows a terminal or other software to distinguish between applications in different firewalls. Moreover, this hierarchy reflects the fact that each RID operator (as defined by RID 501) defines its own set of firewalls, and so Firewall ID portion 502A can only be sensibly interpreted given its corresponding RID portion 501. An example of an implementation that adopts such a hierarchical structure is included in Appendix A.

Figure 7:
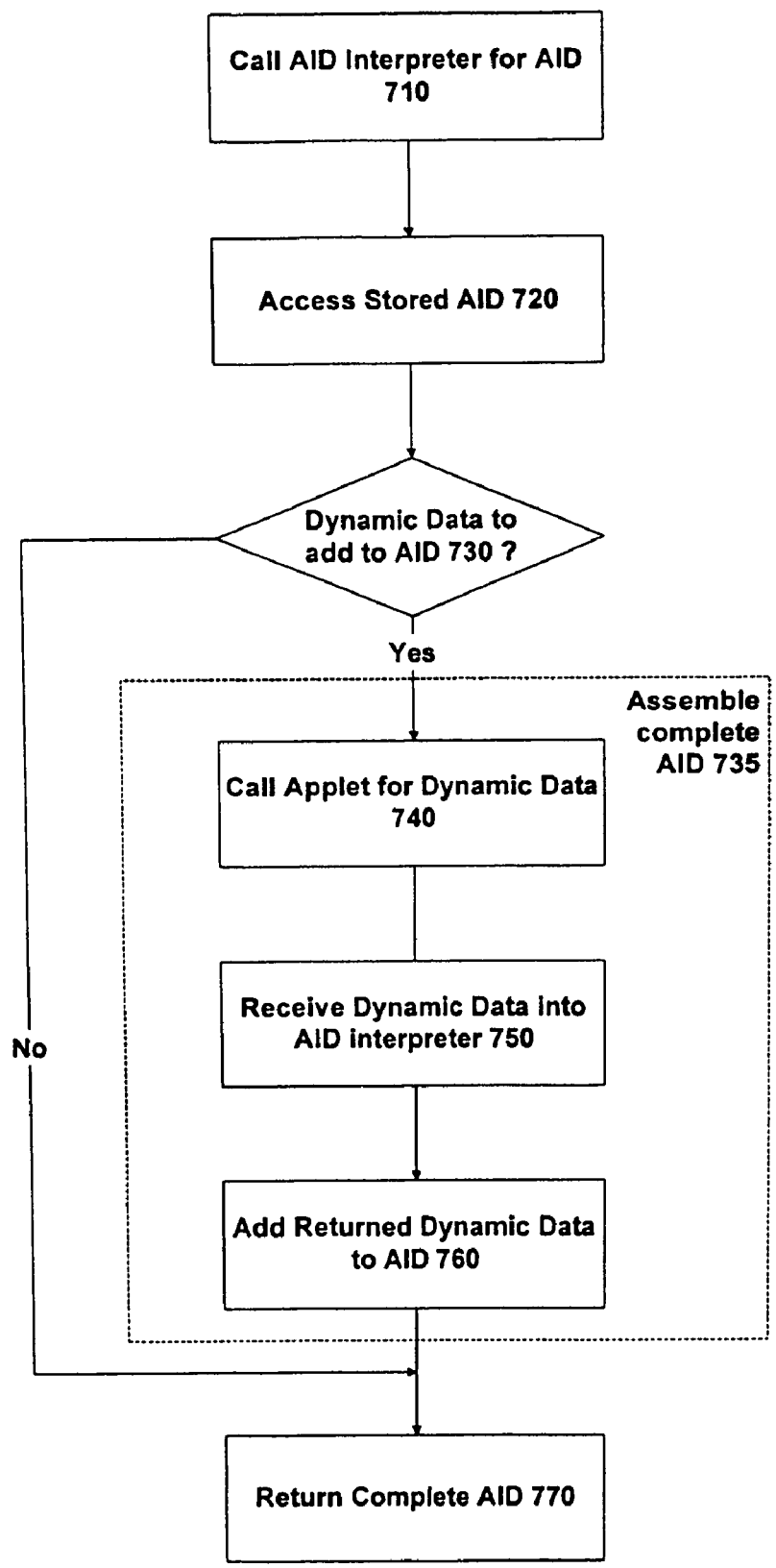
FIG. 7 is a flowchart illustrating a smart card dynamically generating an AID to provide to a terminal in accordance with one embodiment of the invention.

FIG. 7 is a flowchart that illustrates in more detail a mechanism for a card AID interpreter 411 to provide an AID in accordance within one embodiment of the invention. The processing of FIG. 7 illustrates in particular the situation where at least a portion of the AID is constructed dynamically using state information maintained on the card 102. In other words, the AID is used to encode information about the state of the card or the application corresponding to that AID. Some of this data may be stored separately from the static portions of the AID (such as RID 501, Firewall ID 502A, and Applet ID 502B0). This state information then has to be dynamically combined with the static portions to create the complete AID. (N.B The Other portion 502C of an AID, such as illustrated in FIG. 5, may comprise static data and/or dynamic data).

The flowchart of FIG. 7 commences with the card AID interpreter 411 receiving a method call for the (complete) AID (710). Such a call can arise during a session with a terminal, perhaps because the applet selector 412 wants to retrieve the AID for the matching application in order to return the AID to the terminal (as per reference numeral 696 of FIG. 6). However, the card AID interpreter may have to provide a complete AID in other circumstances as well. One possibility is that a smart card is asked to provide a complete listing of AIDs for the applets installed on the card, either for applet selection purposes (as in FIGS. 6 and 6A), or for more general card management operations. Another possibility is that if a transaction updates some portion of the AID to be stored on the card, then it can request a read-out of the AID at the end of the session, in order to confirm that the update has been correctly saved onto the card.

The AID interpreter responds to the request of reference numeral 710 by accessing the stored AID byte array (720). The exact manner in which this is performed depends on the internal implementation of the AID interpreter, as discussed above in relation to FIGS. 5A, 5B, 5C, and 5D. For some applets, the byte array retrieved at this stage represents the complete AID (i.e. there is a negative outcome to the test of reference numeral 730). In such cases, the card AID interpreter can immediately proceed to return the retrieved AID to the calling object (reference numeral 770, via reference numeral 730). However, in other situations, the AID comprises a dynamic component, i.e. there is a positive outcome from reference numeral 730. (It will be appreciated that in an actual implementation of a card AID interpreter 411, the test of reference numeral 730 may be omitted; rather, the card AID interpreter is hard-wired to include, or not to include, dynamic data, as appropriate for the applet in question).

The dynamic component of the AID may represent, for example, a current balance for the card, the date of the last transaction of an application, or any other desired data. This dynamic data can, in principle, be stored within the card AID interpreter 411 itself, and so be directly accessible to the card AID interpreter. However, more generally the dynamic data is located separately from the card AID interpreter, which pulls in the dynamic data on-the-fly when it is required to generate a complete AID. For example, in some embodiments the dynamic data is held in general card data storage 414 (see FIG. 4), which can be implemented in a portion of EEPROM 314 assigned to or accessible by the application in question.

If the AID does incorporate dynamic data, the next task is to assemble the complete AID from this dynamic data and the static data (735). The exact manner of doing this depends upon how and where the dynamic data is stored. FIG. 7 illustrates one particular situation, where the card AID interpreter 411 calls the applet to which the card AID interpreter belongs to provide the dynamic data (740). The applet responds by obtaining the dynamic data, for example by accessing one or more subobjects within the applet that are responsible for maintaining the dynamic data. Next, the applet returns this dynamic data to the card AID interpreter, for example by using a call-back mechanism (750). When the AID interpreter 411 has obtained the desired information, it generates a composite or final AID by combining the stored and dynamic components as appropriate (760). The newly generated AID can then be returned (770) in response to the original request at reference numeral 710.

It will be appreciated that there are many other possible implementations of reference numeral 735 apart from that shown in FIG. 7. For example, in some embodiments the card AID interpreter itself maintains the dynamic AID component, in which case it would not need to contact the applet for this information. Alternatively, the applet may (upon prompting) write the dynamic component directly into the low-level AID storage facility. In this situation, reference numeral 720 is postponed until after 735, whereupon the card AID interpreter 411 would, in effect, retrieve a complete and already updated AID. Other possible implementations will be apparent to the skilled person.

An example of the dynamic data that can be handled by the processing of FIG. 7 is a credit balance controlled by a purse object. The purse object may perhaps store two parameters in card data 414, the first representing the amount of money deposited onto the card, and the second the amount of money spent from the card. The difference between these two amounts then gives the current balance, and it may be this figure (the balance) that is to be incorporated into the AID. In this situation, the purse object responds to the call of reference numeral 740 by calculating the current balance (i.e. by subtracting the amount spent from the amount deposited), and then returning the balance to the card AID interpreter for incorporation into the AID. Note that in this implementation, not only is the AID assembled dynamically, but it also incorporates data that does not normally exist per se on the card (rather, the dynamic data that is incorporated into the AID is derived from other data values that are present on the card).

It will be appreciated that there is a wide range of possibilities for dynamic data to be included in an AID. For example, the dynamic data can reflect the date and/or time of last use of the application, the location of the terminal of last use, or any other desired application or card property. This then gives considerable flexibility in terms of how the card, and in particular the AID, is used.

Note that the dynamically inserted data is not necessarily subject to change during the lifetime of the card or application. In some embodiments this data can instead represent a fixed (or relatively fixed) property, such as the remaining memory capacity of the card, the version number of an applet, etc. One advantage of storing details of this (potentially fixed) property or state outside the card AID interpreter 411 is where the same data is to be utilized by multiple applications. For example, the AD may be constructed to comprise an indication of which encryption facilities are present on the card, since this may impact the type of operations that a terminal can perform with the card. However, since these encryption facilities are common to all applications on the card, it is convenient for the relevant indication to be stored in a single, centralized location (such as in card data 414).

In these circumstances, the card AID interpreters for the various applications on the card 102 can use the procedure of FIG. 7 to retrieve this centralized indication of encryption facilities as dynamic state information. The retrieved information can then be incorporated into the AID for the respective applications, as and when required by the AID interpreters 411. It will be appreciated that storing a single copy of data (in this case the indication of encryption facilities) in a shared resource, such as data block 414, where it can then be accessed by multiple applications on the card, is generally more efficient than encoding the data separately into the AID for each application on the card.

Another benefit of storing dynamic data outside the card AID interpreter 411 is that the card AID interpreter itself does not need to know how to access, manipulate or format the dynamic data. Rather, this can be left to those objects that primarily interact with the dynamic data (and possibly update it). This then allows a higher degree of generality for the card AID interpreter 411 itself.

Thus in one embodiment the card AID interpreter knows whether or not the AID comprises dynamic data, and if there is such dynamic data, how to obtain it (e.g. which method to call on the applet) and how to incorporate it into the AID byte string (perhaps to insert the dynamic data as Other 502C in bytes 13–15). However, the card AID interpreter does not need to have any further understanding of or interaction with the dynamic data.

For example, if the smart card stores two values, one representing amount placed on the card, the other amount spent (as suggested above), then in general the card AID interpreter 411 does not calculate the balance itself. Rather, the card AID interpreter calls its applet for the dynamic data to incorporate into the AID, and receives back the balance (already calculated) in response. The applet itself can obtain the balance by calling an appropriate method on the object responsible for maintaining the two data values in question (such as a purse object). This object then performs the necessary subtraction in order to produce and return the current balance to the card AID interpreter. The same object would also generally be responsible for suitably formatting the dynamic data for inclusion in the AID. For example, where the balance details are maintained in the purse object as real numbers (or possibly integers), the result can be converted into a byte string before return to the card AID interpreter for compatibility with the rest of the AID.

As described above, the presence of the AID interpreter 411 on smart card 102 relieves the terminal 110 of having to utilize the AID 401 directly in order to locate a desired application. Nevertheless there are other situations where the terminal 110 itself does want to be able to access and interpret the AID 401. For example, there may be other information encoded into an AID 401 passed to the terminal 110 that the terminal desires to use during the session, such as the Other portion 502C (see FIG. 5).

Figure 1C:
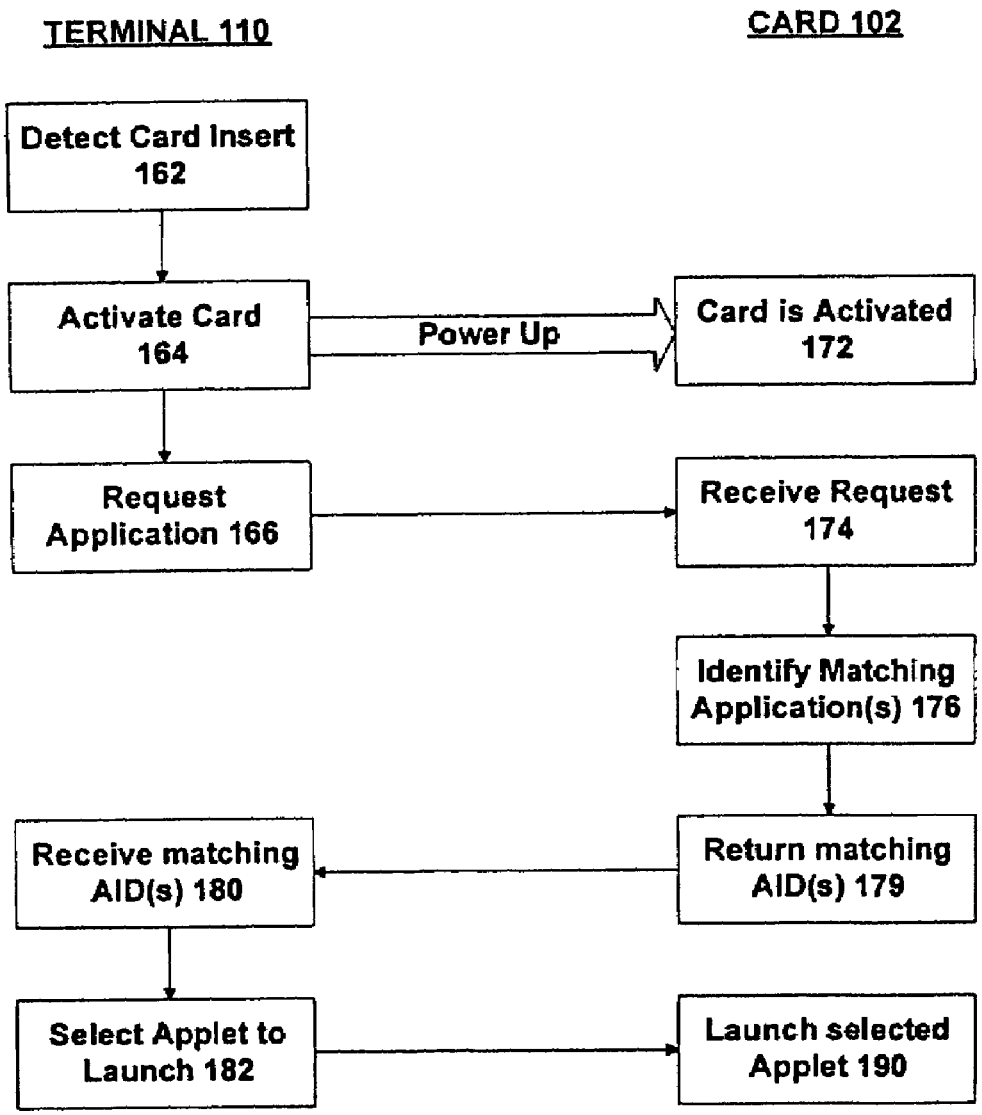
FIG. 1C is a flowchart whereby a terminal selects and launches one application out of potentially multiple applications on a smart card using partial AID matching.
Figure 2:
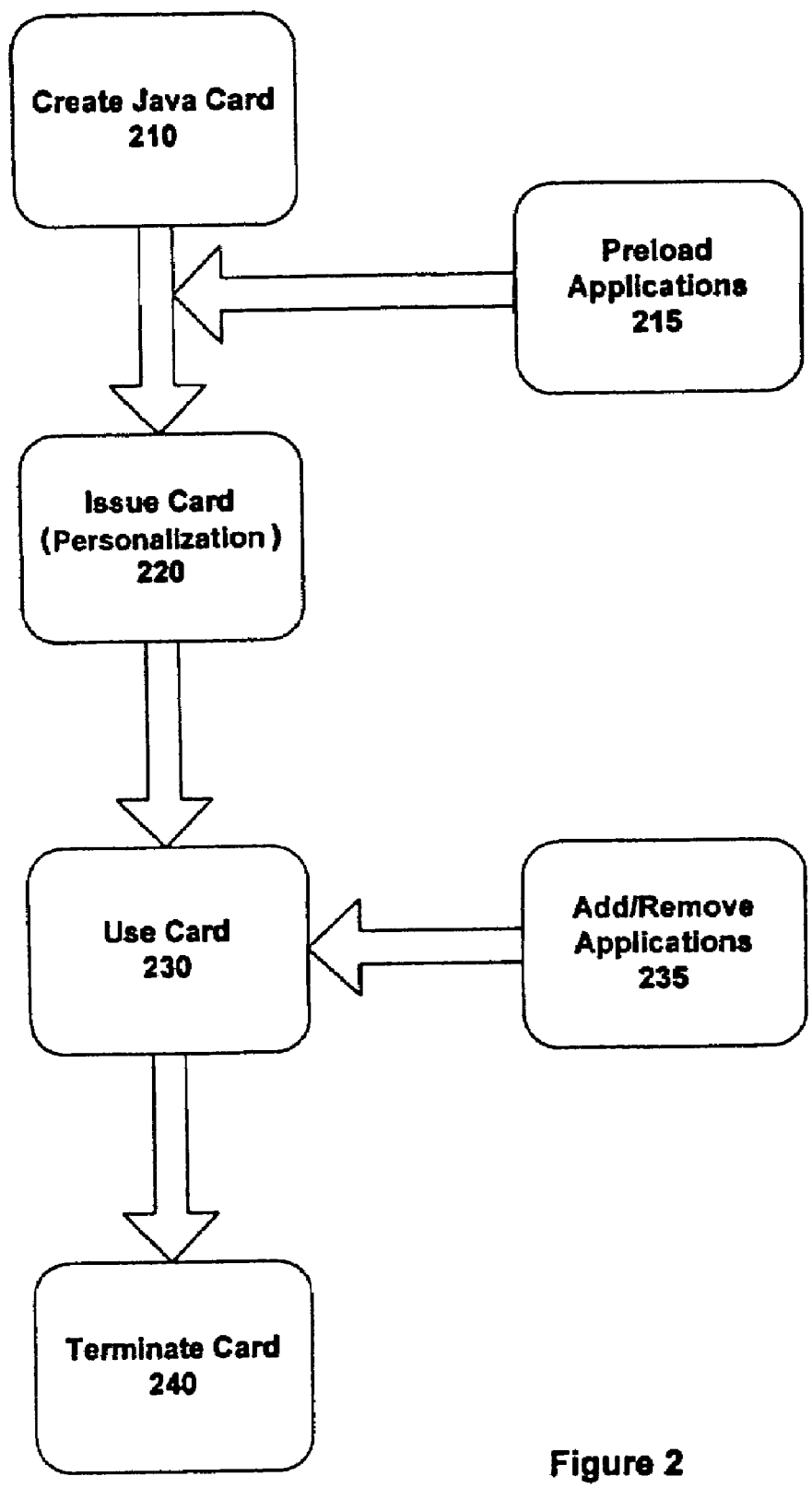
FIG. 2 is a schematic diagram illustrating the typical life cycle of a smart card.
Figure 8:
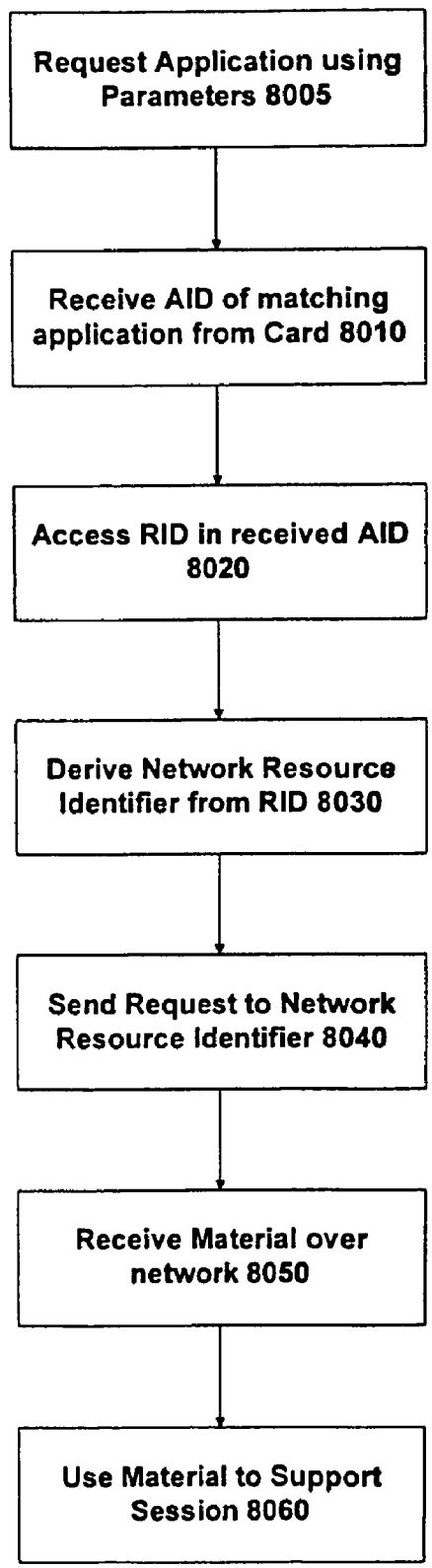
FIG. 8 illustrates a procedure for a terminal to utilize an AID to obtain code or information to support processing the AID in accordance with one embodiment of the invention.

This situation is addressed by the procedure of FIG. 8. FIG. 8 which illustrates processing performed at a terminal 110 during a session with a smart card 102 after preliminary interactions between the terminal 110 and the card 102, such as card activation (see FIG. 1B), have been completed, in accordance with one embodiment of the invention. The flowchart of FIG. 8 commences with the terminal specifying a desired matching application (8005). This operation corresponds in general terms to reference numeral 166 of FIGS. 1B and 1C. In the particular implementation shown, the request for a matching application is performed using multiple parameters, such as RID 501, Firewall ID 502A, and Applet ID 502B. These parameters allow the smart card to identify a matching application, as described above in relation to FIGS. 6 through 6E. The smart card then returns the AID for the matching application, which is duly received by the terminal (reference numeral 8010, see also reference numeral 180 of FIGS. 1B and 1C).

Having received the AID from the card, the terminal has to interpret the AID in order to complete the desired user interaction. However, maintaining knowledge of the AID structure within the terminal itself can be problematic, particularly where the terminal 110 supports multiple applications from a variety of suppliers. Furthermore, as described above, a matching application can now be identified on the basis of certain parameters, such as Firewall ID and Applet ID, rather than requiring the terminal to store a complete AID string for this purpose. Having therefore avoided the terminal initially needing full knowledge of the AID on the card for application selection, it is also desirable to prevent the terminal having to maintain a detailed understanding of the AID format for subsequent interaction with the application. This then allows a terminal to be generic as possible, and avoids having to update terminal software whenever there is a change in AID structure (or conversely, permits changes in AID structure without compromising compatibility with the installed base of terminals).

Nevertheless, a terminal always knows from international standard ISO/IEC 7816-5 that the first five bytes of an AID represent the associated RID 501. Accordingly, once the terminal has received the incoming AID from the smart card 102, it is able to retrieve this RID portion 501 by extracting the first five bytes of the received AID (8020).

In accordance with the procedure of FIG. 8, the terminal now uses this RID portion 501 to obtain some form of network resource identifier (8030). This network resource identifier represents a Uniform Resource Locator (URL) on the Internet (or similar intranet or extranet). Alternatively, it may represent any other suitable type of network address or resource specifier, etc. There are a variety of possible mechanisms by which such a URL may be acquired from the extracted RID portion 501. For example, the terminal may maintain a lookup table that maps from RID portion 501 to specific URL. Alternatively, the terminal may follow some algorithm to convert from the RID to a URL. A further possibility is that some hybrid of the above two approaches is adopted, such as using the lookup table as the first option, and then forming a URL directly if there is no entry in the lookup table for that particular RID.

If reference numeral 8030 involves forming a URL directly from the RID, then some mechanism is provided (such as a constructor method) for converting from the RID byte string into a URL. Thus the RID byte string can first be represented in hexadecimal form, which is then transformed into a corresponding text string for incorporation into a URL. Alternative methods for deriving a network resource identifier from the RID byte sequence can also be employed, such as using one or more bytes directly to specify an IP address of a URL (this can be done by using the "%" character, followed by two hexadecimal characters to specify an octet).

Note that any initial mapping of the AID into a URL by the terminal is non-semantic, in that the terminal converts the AID byte sequence into a URL via some mechanism such as the hexadecimal transformation discussed earlier. However, this mapping process is not expected to recognize or interpret any components of the AID (other than perhaps the RID, whose position within the AID is predefined by standard).

Once the network resource identifier has been derived from the RID, terminal 110 now sends a request to the URL or other address corresponding to the RID 501 (8040). In due course, the terminal receives back over the network a response comprising some form of material relevant to the AID (8050), which is then used to support further activities in the session (8060). It will be appreciated that the manner of this use depends upon the nature of the downloaded material (e.g. whether it is code, data or a network service address, etc.). One particular situation, where the downloaded material comprises an AID interpreter for use on the terminal 110, will be discussed in more detail below.

Figure 8A:
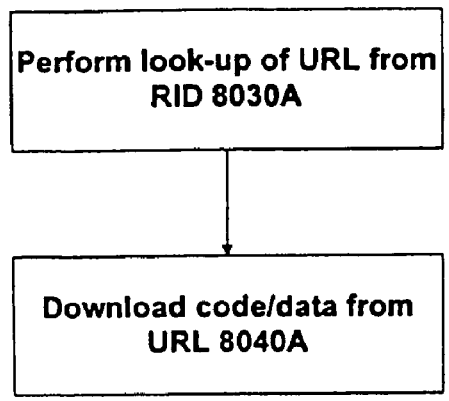
FIGS. 8A through 8F illustrate aspects of the processing of FIG. 8 in more detail for various embodiments of the invention, comprising some of the processing performed at a server.

Returning to reference numeral 8030, the RID can be used to define the domain name portion of a URL. In other embodiments, the RID can be provided in effect as an http parameter associated with the domain. One embodiment involving the former option is illustrated in FIG. 8A, which provides more detail for FIG. 8. Thus in FIG. 8A, the network resource identifier represents a URL which is derived from the RID by performing a lookup in a table or database, etc. (reference numeral 8030A, corresponding to reference numeral 8030 in FIG. 8). The table or database is maintained locally on the terminal. The terminal then downloads code and/or data as required from this URL (reference numeral 8040A, which can be regarded as corresponding to both reference numerals 8040 and 8050 in FIG. 8).

In some embodiments, the URL initially derived from the RID 501 comprises a guide or indicator to one or more sites from which further material can be accessed. For example, the URL initially obtained at 8030 can provide a link to a further web site where the material is located (perhaps using the http redirect mechanism). The terminal then follows this link (or chain of links) in order to retrieve the relevant material. An example of this is where the terminal forms a URL comprising a generic portion, representing perhaps a constant Web site (and page), and an RID-dependent portion, comprising the RID in hexadecimal form. The RID-dependent portion is therefore presented in effect as an entry field associated with the generic page (analogous to encoding a search term into a URL for a search engine). This can then be used to determine the address of further material.

Figure 8B:
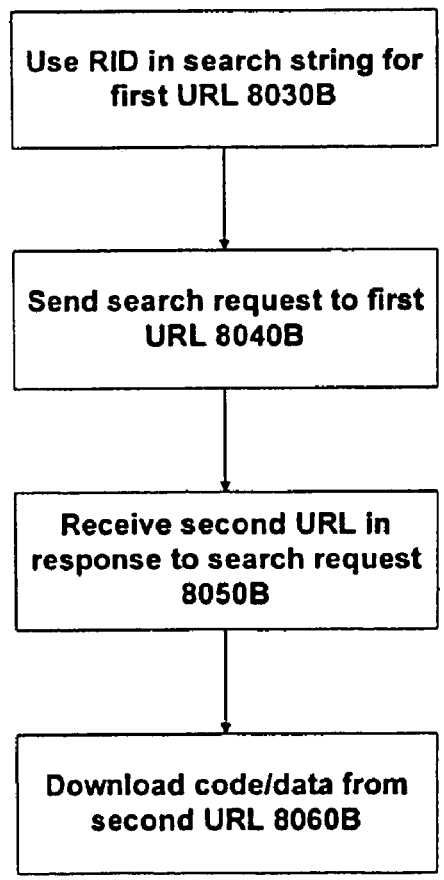

Such an embodiment is illustrated in the flowchart of FIG. 8B, which again provides more detail for FIG. 8. Thus in FIG. 8B, the RID received from the card is appended as a search parameter to a predetermined first URL stored locally on the terminal (reference numeral 8030B, corresponding to reference numeral 8030 in FIG. 8). This then forms a search request which is sent to the first URL (reference numeral 8040B, corresponding to reference numeral 8040 in FIG. 8). In response to this request, the terminal receives a second URL (reference numeral 8050A, corresponding to reference numeral 8050 in FIG. 8). The terminal now downloads code and/or data from this second URL for use in the session with the card (reference numeral 8060B, corresponding to reference numeral 8060 in FIG. 8).

Figure 8C:
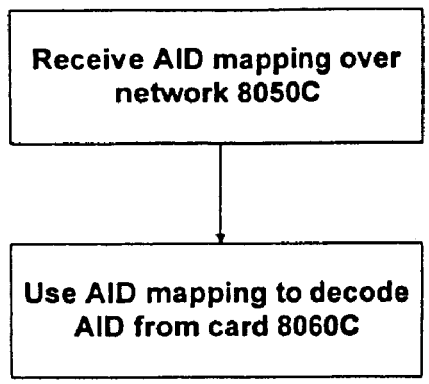

There is a very wide range of material that can potentially be obtained by the terminal at reference numeral 8050 in FIG. 8. For example, in the embodiment of FIG. 8B, the material initially downloaded for use in the session is in fact the second URL, which then directs the terminal to another location from which additional material can be obtained. In another embodiment illustrated in FIG. 8C, the downloaded material comprises a data mapping, representing the structure of the AID 401 used by that organization (reference numeral 8050C, corresponding to reference numeral 8050 in FIG. 8). The terminal can then use this mapping in order to extract desired information (such as a current balance) from the AID supplied from the smart card (reference numeral 8060C, corresponding to reference numeral 8060 in FIG. 8). Note that there can be multiple such mappings for a single organization (as specified by the RID), with the particular mapping to be used dependent on some other data encoded into the PIX portion of the AID. In one such embodiment, the terminal receives over the network a full set of possible mappings for that RID, and then selects an appropriate mapping from this set based on the particular AID that it obtained from the smart card. In another embodiment, illustrated in FIG. 8D, the terminal incorporates the full AID into the initial network request of reference numeral 8040D (corresponding to reference numeral 8040 in FIG. 8). The web server receives this request (8043) and uses the complete AID to select the material to supply back to the terminal (reference numeral 8046), downloading only the material (e.g. a mapping) appropriate to that particular AID (8049), which is received by the terminal in due course (reference numeral 8050D, corresponding to reference numeral 8050 of FIG. 8).

In other embodiments, the material received by the terminal over the network comprises code (potentially in addition to other forms of material). There are a variety of possible code components in the supplied material, such as a user interface for the terminal to use with the cardholder, or a proxy AID interpreter 811 (see FIG. 4) to allow the terminal 110 to decode the AID received from the smart card. In an alternative embodiment, the code downloaded is responsible for actual processing of application data during the session with the card (i.e. forming part of proxy code 410). It will be appreciated that two or more of these code components can be downloaded in any given session.

The code can be provided to the terminal in a variety of forms, such as raw class files or as Java Archive (JAR) files or packages, each containing (compressed) Java code plus manifest. The downloaded code can then indicate further classes or packages that may need to be retrieved from over the network in order for the application to run. A further possibility is that the terminal receives a Java Application Descriptor (JAD) file. This is an XML file that comprises one or more URLs specifying where the relevant application code is located, as well as the location of any data associated with the application. The XML file can further comprise one or more descriptors relating to the application. The terminal can then download the code and data in accordance with the information provided in the JAD file.

Other types of material that can be downloaded over the network in response to the request from the terminal include multimedia data, such as a logo image to be utilized for the user session on a terminal screen; some form of contractual documentation associated with the session—perhaps a user license or agreement; and some form of authorization or verification, such as a third party certificate guaranteeing the bona fide nature of a merchant involved with the session.

The material can also comprise a further network resource identifier representing a location, such as a portal, where a desired service can be obtained. Such a service may be the download of some product (e.g. music), some on-line purchase facility (e.g. for buying aircraft tickets), some data service (e.g. the supply of recent financial results), and so on. This further network resource identifier can also represent a site at which documentation relating to the commercial transaction (such as contractual details) is located. It will be appreciated that in many circumstances, the terminal is specialized for a particular application—e.g. the terminal may comprise a facility to print aircraft tickets, or to burn music downloaded from the network onto a customer CD. The nature of the terminal will then determine the range and nature of application processing available to a customer at the terminal.

Note that the terminal can download multiple different items for a single smart card session. For example, from the initially derived network resource identifier (at reference numeral 8030), the terminal may obtain a set of further URLs specifying locations of various types of material relevant to the session (code, contractual terms, payment service location, etc).

It will also be appreciated that in some situations certain material available from a URL may in fact already be present on the terminal. For example, some Java packages from a specified URL may have previously been downloaded (for example as JAR files) and installed onto the terminal, perhaps to process an earlier session with a different card. In these circumstances, it will not normally be necessary to repeat the download (unless perhaps an expiry date for the material has passed). More generally, the terminal may already have available the material corresponding to the network resource identifier generated at 8030, either because the material is cached or mirrored locally, or because the identified resource happens to be located on the terminal itself. The material can then be accessed locally at reference numerals 8040 and 8050 without having to download over the network.

Figure 8D:
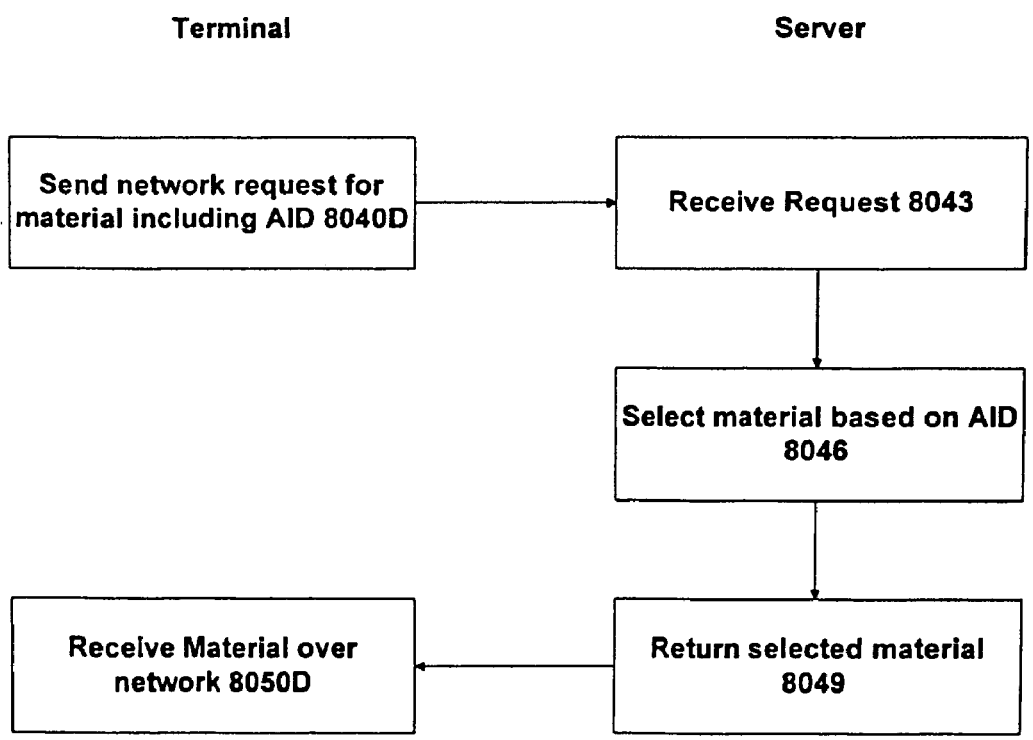
Figure 8E:
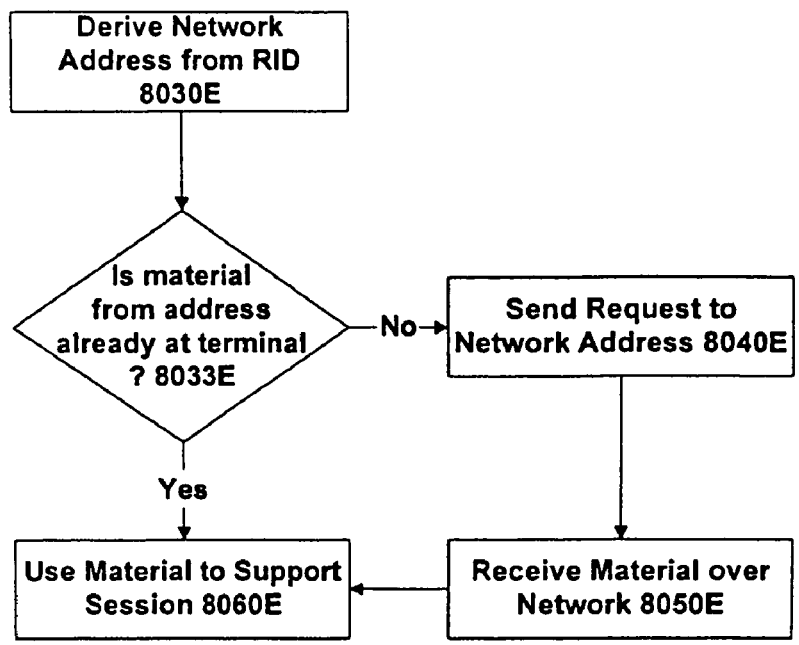

FIG. 8E illustrates a flowchart for one embodiment of the invention that takes into account the possibility of the terminal already having the specified material. Thus as shown in FIG. 8E, a test is made at reference numeral 8033E to determine whether or not the terminal already has material from the relevant network address. If so, this material can be used directly by the terminal, without having to be downloaded over the network. (The remainder of the processing of FIG. 8E is the same as that for FIG. 8).

As mentioned above, the terminal can use more than just the RID portion 501 of the AID in the processing of FIG. 8. For example, if the network resource identifier is generated at 8030 by having the RID as an entry field or input parameter for a URL request, then the PIX portion can be provided likewise as an input parameter in the URL request.

The web server can then utilize the PIX portion in determining the response that is provided back to the terminal (see reference numeral 8046 of FIG. 8D). For example, the web server may determine the type of application associated with the AID (based perhaps on the Applet ID in the PIX portion), and then provide code back to the terminal that is appropriate for interacting with this particular application.

Figure 8F:
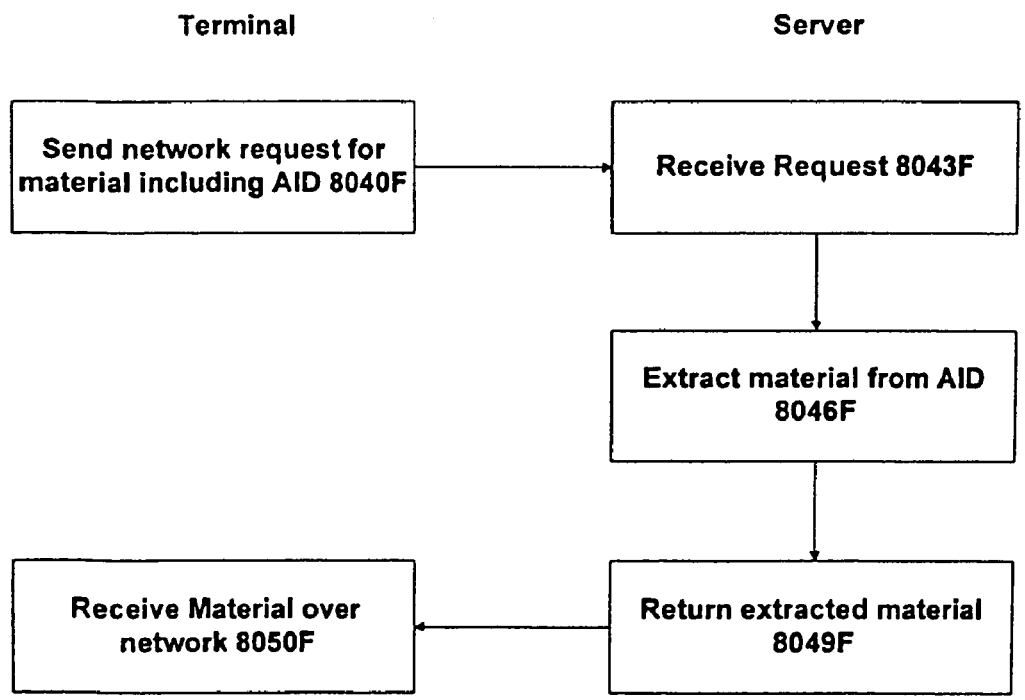

In some embodiments, the web-site or other network location performs some semantic interpretation of the AID obtained from the smart card by the terminal, so that the response back to the terminal incorporates data extracted from the AID (such as a current balance on the card, or other such state information included in the AID). This provides one mechanism to avoid the terminal itself having to be able to decode or interpret the AID byte string. Such an embodiment is illustrated in the flowchart of FIG. 8F, which generally corresponds to that of FIG. 8D, except that at 8046F, the server interprets the received AID in order to extract relevant information. This extracted information can then be returned to the terminal (8049F) for further processing in the session.

Note that the processing of FIG. 8 following reference numeral 8010 (receipt of the AID from the smart card 102) is generally independent of the exact mechanism or circumstances whereby this AID is obtained. For example, the AID may be received following the operations described in relation to FIG. 1B or 1C (i.e. without the use of multiple parameters to specify a matching application on the smart card). In addition, the processing of FIG. 8 (from reference numeral 8010 onwards) might also be performed if a terminal receives an AID from a smart card not as part of the initial selection of a matching application, but rather at some subsequent stage of the session between the card 102 and the terminal 110.

Figure 9:
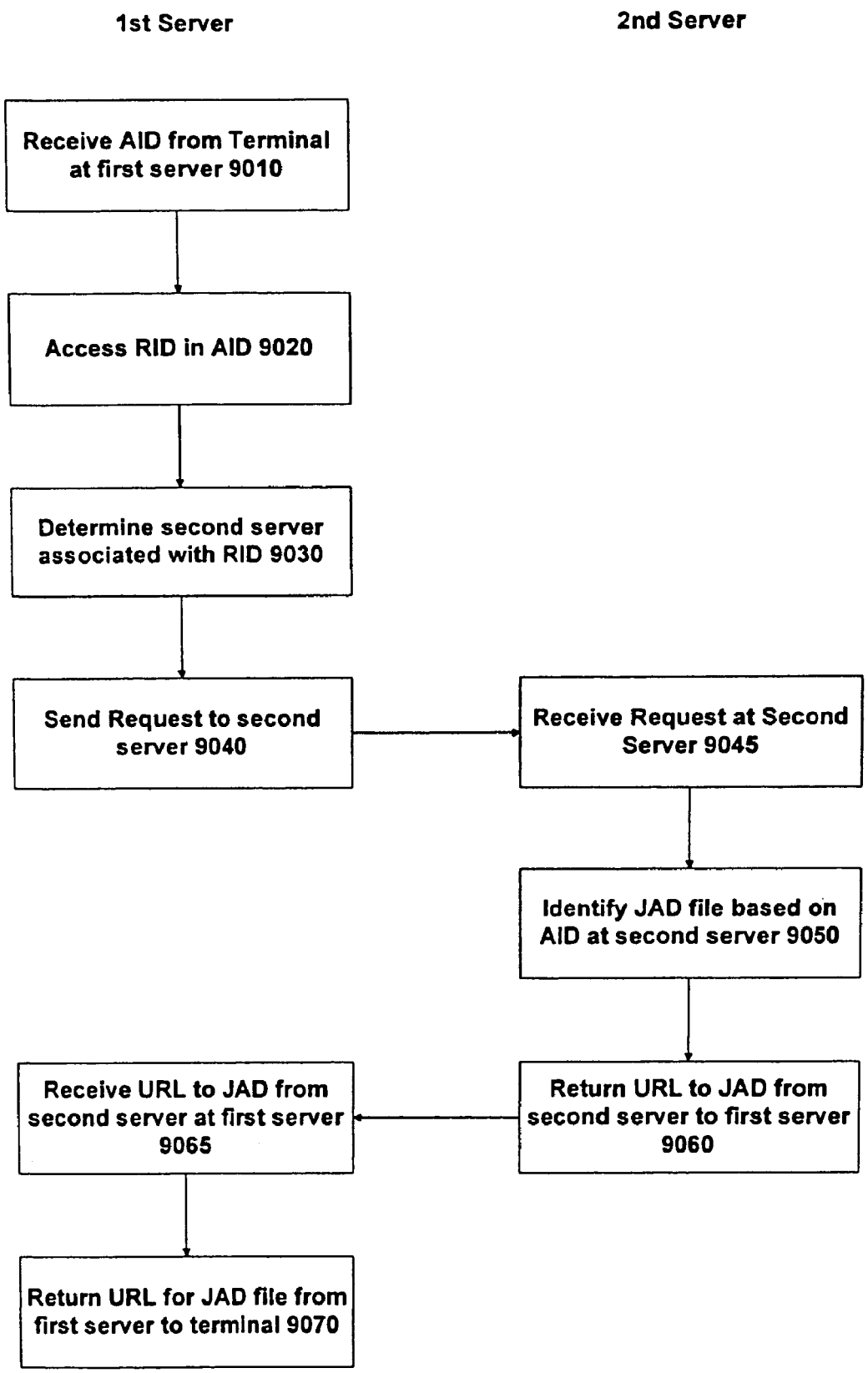
FIG. 9 illustrates the server processing for a request from a terminal in accordance with one embodiment of the invention.

FIG. 9 depicts in more detail the server processing in response to the (http) request of reference numeral 8040 of FIG. 8 for one particular embodiment of the invention. Processing starts with a first server receiving the http request from the terminal (9010), where it is assumed that this request comprises the relevant AID (RID and PIX portions). This first server extracts the RID portion 501 from the received AID (9020), and uses the RID to determine the URL of a second server (9030), generally by means of a database or lookup table available to the first server (either locally or over a network). The first server therefore can be considered as representing a form of generic gateway or portal, and the RID as a form of search term submitted to the portal.

Once the first server has determined the identity of the second server, the first server now in effect forwards the incoming request to the second server (9040). It is assumed that the second server is associated with the particular organization corresponding to the relevant RID. In other words, an organization having the RID in question maintains a web site on the second server. This web site is responsible for receiving and processing AID strings belonging to that organization (i.e. having an RID portion corresponding to that organization).

The AID string from the terminal is therefore received at the second server from the first server (9045), and decoded using an appropriate AID interpreter or other mechanism. (It is assumed that the organization knows how to decode its own AID strings). Using the information obtained from the decoded AID, the second server now identifies a Java Application Descriptor (JAD) file (9050) to be used by the terminal in processing the smart card. The JAD file is generally retrieved from a stored set of such files, but might also be built dynamically in response to the terminal request.

According to one embodiment, the identified JAD file comprises a URL or other reference indicating the location of an AID interpreter. The terminal can then use this reference to download code for decoding and processing the AID itself. The JAD file can also contain any other appropriate information, code references, descriptors, etc that may be required or useful for the session.

The second server now places the JAD file at a network-accessible location, and returns a URL for this location to the first server (9060). The first server duly receives the URL (9065), and in turn forwards the URL back to the terminal (9070). This URL therefore allows the terminal to retrieve the JAD file constructed by the second server, and then to download any code that it references.

Note that there are several possible variations on the processing of FIG. 9. For example, instead of initially returning a URL for the JAD file from the second server to the terminal (via the first terminal), in other embodiments the JAD file itself can be transmitted along this route. A further potential variation is that at 9040 the first server returns to the terminal the URL of the second server. In this approach, the terminal itself is then responsible for communicating directly with the second server, rather than using the first terminal as an intermediary. If so desired, this can be implemented in a straightforward manner by using the http re-direct mechanism.

Figure 10:
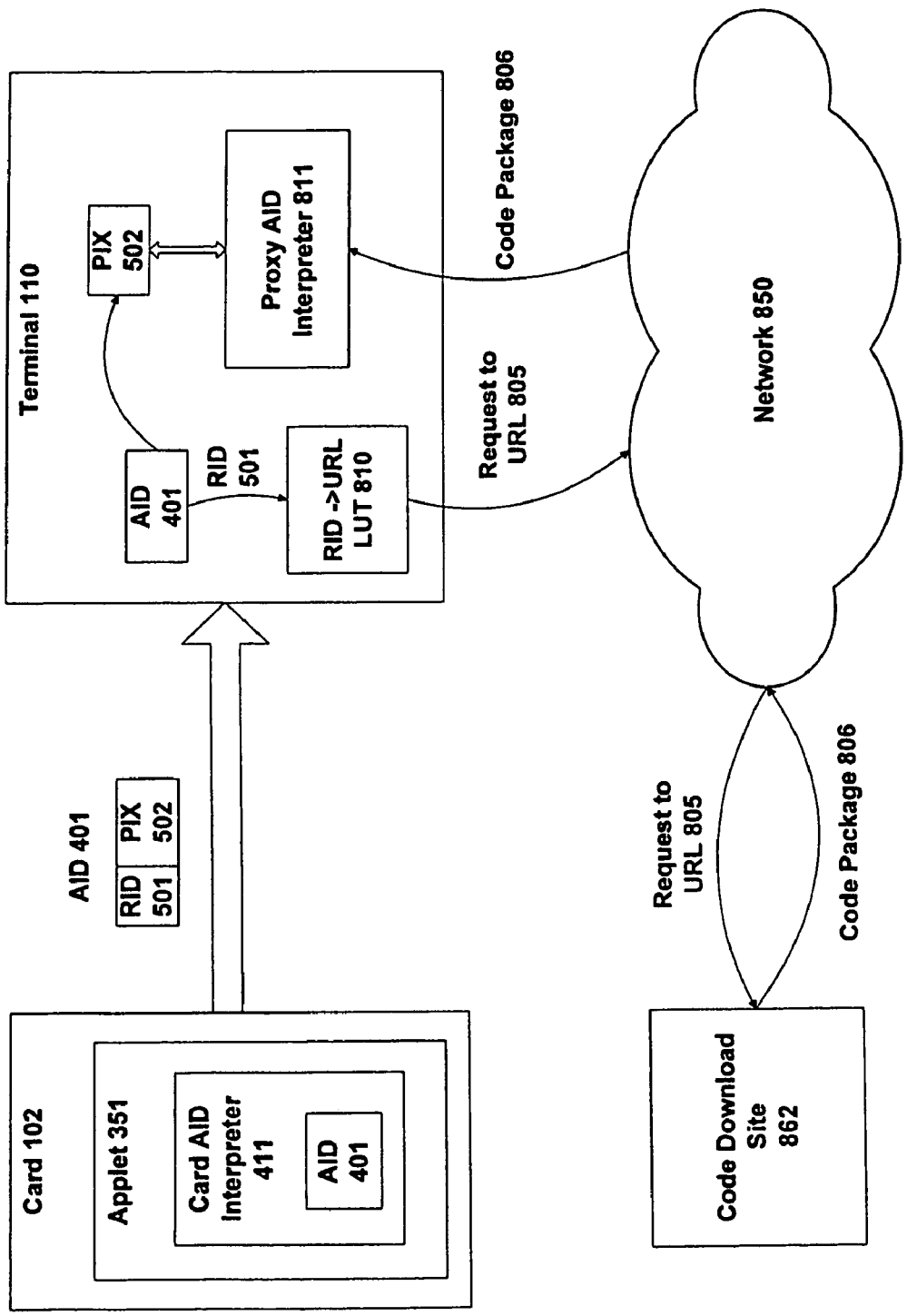
FIGS. 10 and 11 are schematic diagrams of the components involved in utilizing an AID to obtain code or information to support processing the AID in accordance with two different embodiments of the invention.

FIG. 10 depicts an environment in which the procedures of FIGS. 8 and 9 can be implemented in accordance with one embodiment of the invention. Thus applet 351 is installed on card 102, and incorporates AID 401 and card AID interpreter 411. When the card is engaged with terminal 110, the AID 401 for the desired application is extracted from applet 351 and passed to terminal 110 (such as previously described in relation to FIG. 6, for example).

Within terminal 110, the AID 401 is split into its two main constituents, namely RID 501 and PIX 502. The former portion (i.e. RID 501) is used to key into a lookup table 810, which contains a mapping of RID to URL. Based on the RID extracted from AID 401, a corresponding URL 805 can then be determined from the lookup table 810. This URL corresponds (in this particular situation) to a download site 860 for code to be used in processing the session involving card 102. A request 805 for such code is therefore sent to the download site 860. Note that this request may incorporate the full AID string received from the card. This AID string (or portions of it) can then be used by the download site to identify particular code of relevance for this session.

In response to the code request 805, a code package 806 for interpreting the AID 401 is returned over network 850 to terminal 110. This code package is then installed into terminal 110 to form a proxy AID interpreter 811. The newly installed code allows the proxy AID interpreter 811 to retrieve and interpret the data encoded in PIX 502 portion of AID 402, thereby permitting the terminal to continue processing the session with the card 102.

Proxy AID interpreter 811 on the terminal 110 comprises code that is analogous to or shared with AID interpreter 411 on the card, and may potentially be a superset (subclass) of the card AID interpreter 411. Note that proxy AID interpreter 811 is generally not only able to extract a firewall and applet identifier from PIX 502, but it is also able to access any other pertinent information that may be encoded into the PIX 502. (This additional information might relate to the state of the application on the card, such as described above in relation to FIG. 5).

Figure 11:
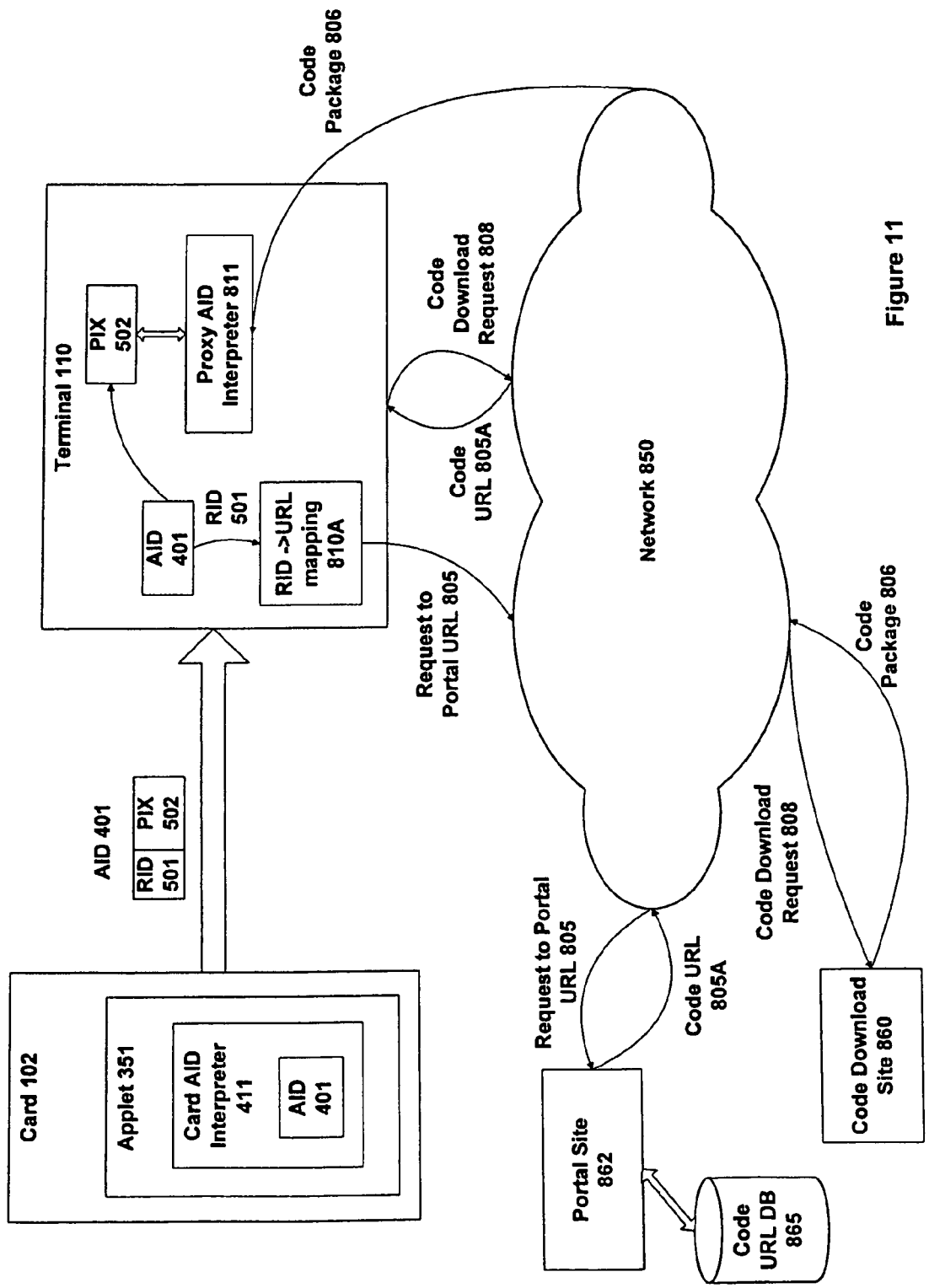

FIG. 11 illustrates another embodiment, which is similar to that of FIG. 10, but this time a slightly more complex chain of operations is involved for the terminal 110 to obtain the code for processing a session. Thus in this embodiment, there is a mapping process 810A that converts the RID received from terminal 110 into a first URL, this time corresponding to portal site 862. The terminal directs a query 805 to this portal site. According to one embodiment, the query comprises the AID of applet 351. In other words, the AID is incorporated into the URL associated with the request to portal site 862 (generally in an analogous manner to the way that a search string is supplied to a web search engine).

The portal site 862 responds to the incoming query 805 by providing in return the URL 805A of the code download site 860. In the particular embodiment of FIG. 11, portal site obtains this URL from database 865 using the received AID or at least a portion of it, such as the RID, as an index into the database 865. The code download URL 805A is therefore received back at terminal 110 from portal site 862.

The terminal now generates a code download request 808 directed to the received code download URL. Note that the terminal 110 may potentially comprise the AID in this code download request 808. The code download request 808 is received at code download site 860, which returns code 806 corresponding to the particular URL of the request. One use of this code download mechanism is to allow the terminal 110 to install its own proxy AID interpreter 811, for use during the session with applet 351, as described above in relation to FIG. 10.

Note that the code downloaded from site 860 to terminal 110 may be dependent upon the AID (if any) included in code download request 808. For example, the AID might contain membership details for the cardholder. The code 806 for download can then be selected so as to only offer services appropriate to the particular class of membership of the cardholder (as determined from the AID).

It will be appreciated that it is generally easier to maintain a single network-accessible database 865 of RID to URL mappings, such as depicted in FIG. 11, than to have separate mappings 810 stored in each terminal, such as depicted in FIG. 10. On the other hand, the approach of FIG. 10 is generally faster than that of FIG. 11, given the reduced number of network requests involved. One compromise therefore is to adopt a hybrid approach, in which lookup table 810 represents in effect a local cache of data from code URL database 865. In such an embodiment, terminal 110 first attempts to find the location of code download site 860 using lookup table 810. According to one embodiment, this table stores the mappings for recently processed RIDs. However, if no entry for the RID in question is found in the lookup table, the terminal then contacts portal site 862 to derive the location of code download site 860 from database 865 (which is assumed to be much larger and more complete than lookup table 810). Any mapping information obtained in this manner from the code URL database 865 may be added into the lookup table 810 for future use (depending on the particular cache occupancy strategy deployed).

It will be appreciated that the ability to download onto a terminal 110 a proxy AID interpreter 811 that is specific to the particular AID of the inserted card 102 complements the initial AID matching procedure described above (see e.g. FIGS. 6 through 6F). Thus the provision of card AID interpreter 411 on the card 102, and the use of Applet ID and Firewall ID (rather than the AID byte string itself) to specify a desired applet 351, allows a terminal to obtain the AID of the desired applet without needing to know (initially) the specifics of the AID itself.

Similarly, rather than having to preinstall appropriate AID processing software on all terminals, the AID obtained from the card can then be used by the terminal to identify and acquire a proxy AID interpreter 811 that is able to parse and manipulate the AID in question. According to one embodiment, the appropriate proxy AID interpreter 811 is downloaded over a network onto the terminal in order to complete the relevant session with the card 102. Accordingly, the dynamic provision of a proxy AID interpreter to a terminal helps to allow the PIX portion 502 of an AID to be used for more complex and varied tasks, which may perhaps be modified over time, without compromising compatibility at the set of terminals already present in the field.

Note that there are many potential variations on the embodiments of FIGS. 10 and 11. For example, a default structure may be defined for AID 401. Terminal 110 then has preinstalled a proxy AID interpreter 811 that is able to parse and extract information from an AID conforming to this default structure. In this case, there may be no need to derive a network resource identifier from an RID in this AID. For example, in the embodiment of FIG. 10, lookup table 810 may instead indicate that the default proxy AID interpreter is to be used (perhaps by simply having a null entry for that RID). This can be regarded as analogous to the processing of FIG. 8E.

On the other hand, in the embodiment of FIG. 11, the RID to URL mapping (box 810A) may still be performed, but the response from the portal site 862 then indicates that the default proxy AID interpreter is to be used. In this case there is no need for the terminal to send a subsequent code download request 808, assuming that the default proxy AID interpreter is already installed on the terminal.

A further possibility is that the terminal attempts to use the default AID interpreter 811 if it is unable to find any other suitable code for this session, for example because there is no entry for the RID in the lookup table 810 or the portal site 862 (depending on the particular embodiment) or because a network connection is currently unavailable. Alternatively, the lack of a positive indication of which proxy AID interpreter for the terminal to use for a given AID (default or otherwise) might be taken as an error, possibly causing the terminal to abort the session.

Figure 11A:
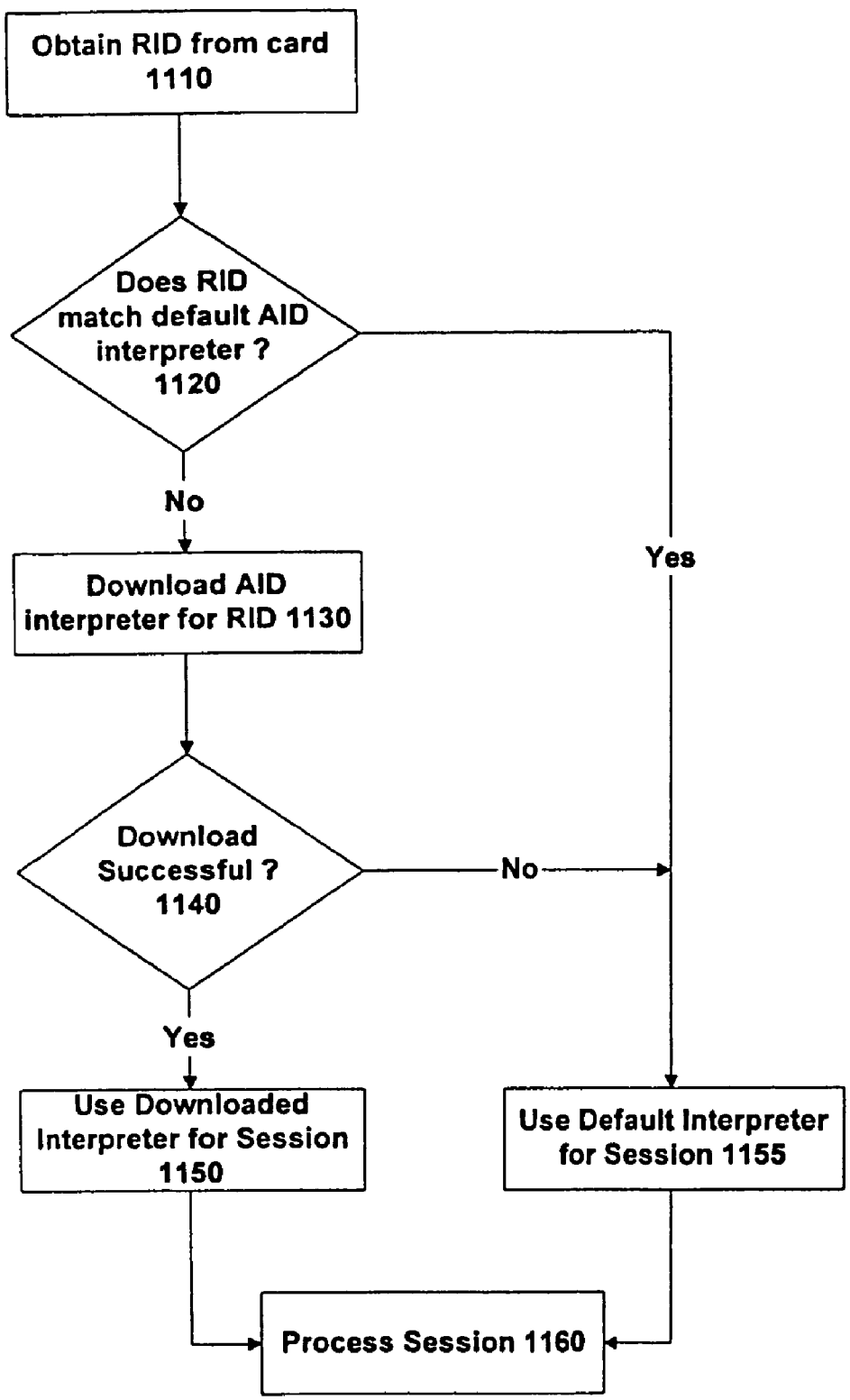
FIG. 11A illustrates the use of a default proxy AID interpreter in accordance with one embodiment of the invention.

FIG. 11A is a flowchart illustrating the operation of one embodiment of the invention in which the terminal may utilize a default proxy AID interpreter. The method starts with the terminal obtaining the AID from the card (reference numeral 1110, corresponding generally to reference numeral 8020 in FIG. 8). The terminal now determines whether the RID corresponds to the default interpreter (1120). If not, then the terminal attempts to download the AID interpreter corresponding to the RID, as previously described in relation to FIGS. 8 and 11 (1130). A test is now performed to see if this download has been successful (1140). If so, then the downloaded AID interpreter can be used for the session (1150). Alternatively, the default AID interpreter is used (1155) if this is the one indicated by the RID received from the card at 1120, or if the download was unsuccessful at 1140. The terminal now continues to process the session with the card (1160). Note that there may be certain restrictions on the functionality available during such processing if the default AID interpreter is being used because the specified AID interpreter is unavailable (i.e. the test of reference numeral 1140 was negative).

It will be appreciated that even for those cases where there is a specific proxy AID interpreter to use for a particular AID string, this will frequently be formed as a modification of the default proxy AID interpreter. For example, code obtained from a location such as code download site 860 can comprise a plug-in for the default proxy AID interpreter, or may be utilized via any other suitable mechanism. Alternatively, the downloaded code may subclass portions of the default proxy AID interpreter in order to provide more specific functionality in certain areas.

Figure 12:
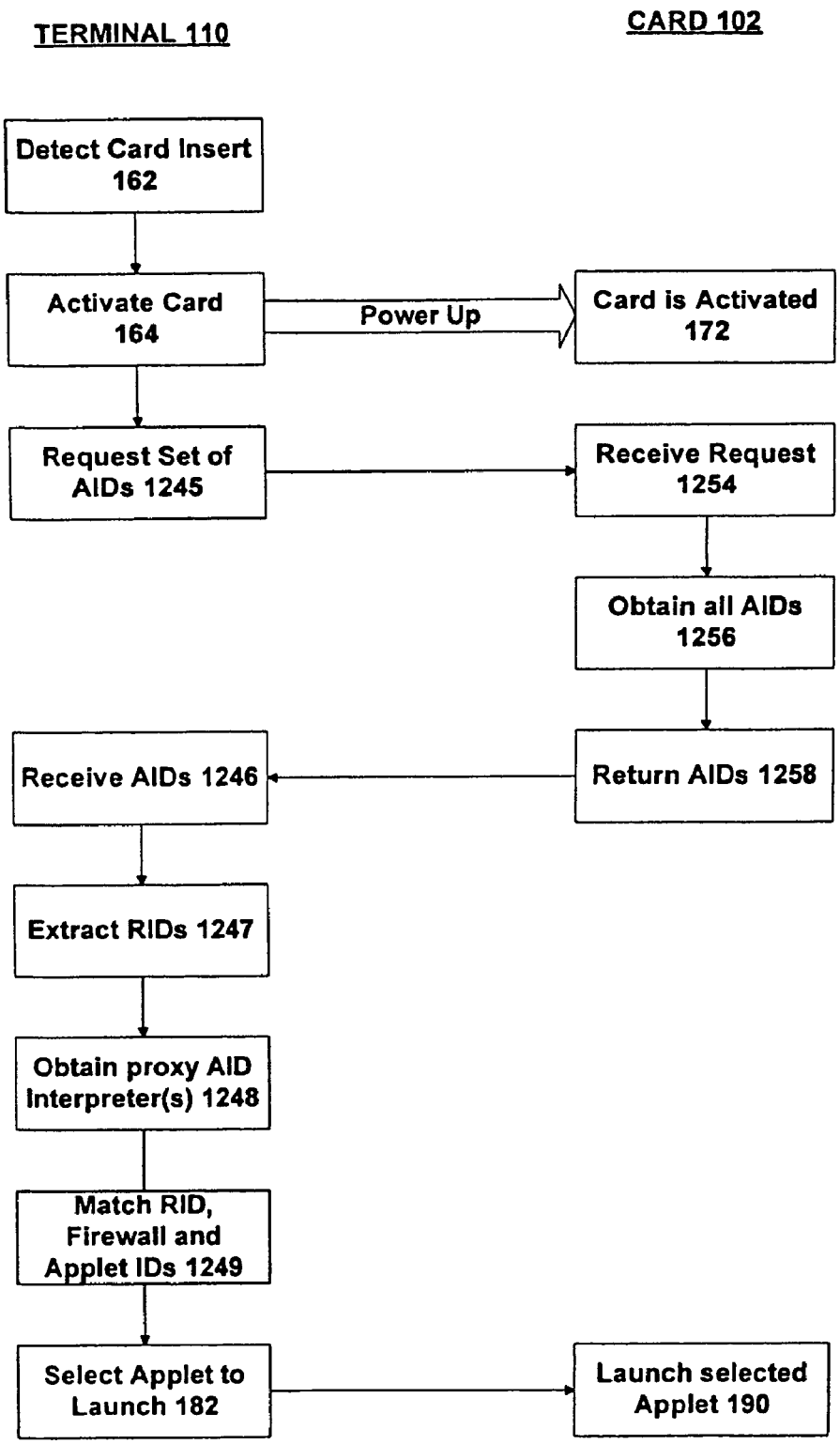
FIG. 12 is a flowchart illustrating a procedure for a terminal to obtain a set of AIDs from a smart card in accordance with one embodiment of the invention.

One implication of the ability to acquire a proxy AID interpreter 811 within the terminal 110 itself is that this now offers the possibility of performing the initial AID matching in the terminal 110 (in contrast to the AID matching performed on the smart card 102, such as illustrated above in FIG. 6). One embodiment of the invention which supports such processing is illustrated in the flowchart of FIG. 12, which commences in the same general manner as the flowchart of FIG. 1. In other words, the terminal detects insertion of the card (162), and consequently activates the card (reference numerals 164, 172).

At this point however, rather than specifying a desired application in terms of RID, Firewall ID, and Applet ID (corresponding to reference numeral 8005 of FIG. 8), instead the terminal requests the applet selector 412 to provide it with the full set of AIDs for the card—i.e. the AID for each available applet 351 on the card (1245). The applet selector receives this request (1254), and according to one embodiment, uses a get_AID( ) method call on the card AID interpreter 411 of each application installed on the card in order to retrieve the AID for that application (1256). The precise manner in which the get_AID( ) call is implemented will depend upon the internal details of the card AID interpreter 411 in question (as discussed above in relation to FIGS. 5A, 5B, 5C, and 5D). Note that prior to making the get_AID( ) call for an application, the applet selector may first have to call the applet itself in order to locate the card AID interpreter 411 for that particular applet (analogous to reference numeral 681 of FIG. 6). Note also that the AIDs for different applications may be collected in parallel, or one after another, or via any other suitable strategy.

The AIDs for the card applications are now returned from the card 102 to the terminal 110 (reference numerals 1258, 1246), where the RID is extracted from each AID (1247). This RID then allows the terminal to identify and to acquire (if necessary) a proxy AID interpreter 811 to be used in processing the corresponding AID (1248). Note that the same procedure can be used here to obtain the appropriate proxy AID interpreter 811 as described above in relation to FIGS. 8 and 9. (It will be appreciated that there may be a different proxy AID interpreter 811 to download for each application 351 on card 102).

Once the terminal has the appropriate proxy AID interpreter for an AID, it can now decode that AID to determine the Firewall ID and Applet ID encoded into the AID. This then allows the terminal to perform the matching of RID, Firewall ID and Applet ID in order to identify a desired application for use in this particular session (1249). The proxy AID interpreter 811 can adopt the same procedure to identify a matching application as described above in relation to card AID interpreter 411 on the card itself (see FIG. 6). After this matching has been completed, the terminal notifies the card (reference numeral 182, see also FIG. 1C) of the applet that matches the above parameters (RID, Firewall ID and Applet ID). According to one embodiment, this is achieved by returning the (complete) AID of the desired matching application from the terminal 110 to the smart card 102. This then allows the card to launch the specified matching applet (reference numeral 190, see also FIG. 1C again).

One advantage of performing parameter matching on the terminal instead of on the card is that resources (memory, processing power, etc) are much more readily available on the terminal than on the card. On the other hand, there is the potential as mentioned above of having to download multiple AID proxy interpreters onto the terminal, one for each applet on the card, which may be relatively time-consuming. In practice however, the number of proxy AID interpreters to download can be significantly reduced by looking at the RID 501 obtained by the terminal at 1247. If this RID matches the RID of the application desired by the terminal, then the terminal proceeds to obtain a proxy AID interpreter 811 for the associated AID. However, if the extracted RID does not match the RID of the application desired by the terminal, then there is no need to download the corresponding proxy AID interpreter 811, since this application cannot represent the desired application. Consequently, reference numeral 1248 need only be performed with respect to those AIDs that contain a matching RID, thereby greatly reducing the number of proxy AID interpreters to be downloaded to the terminal.

Figure 12A:
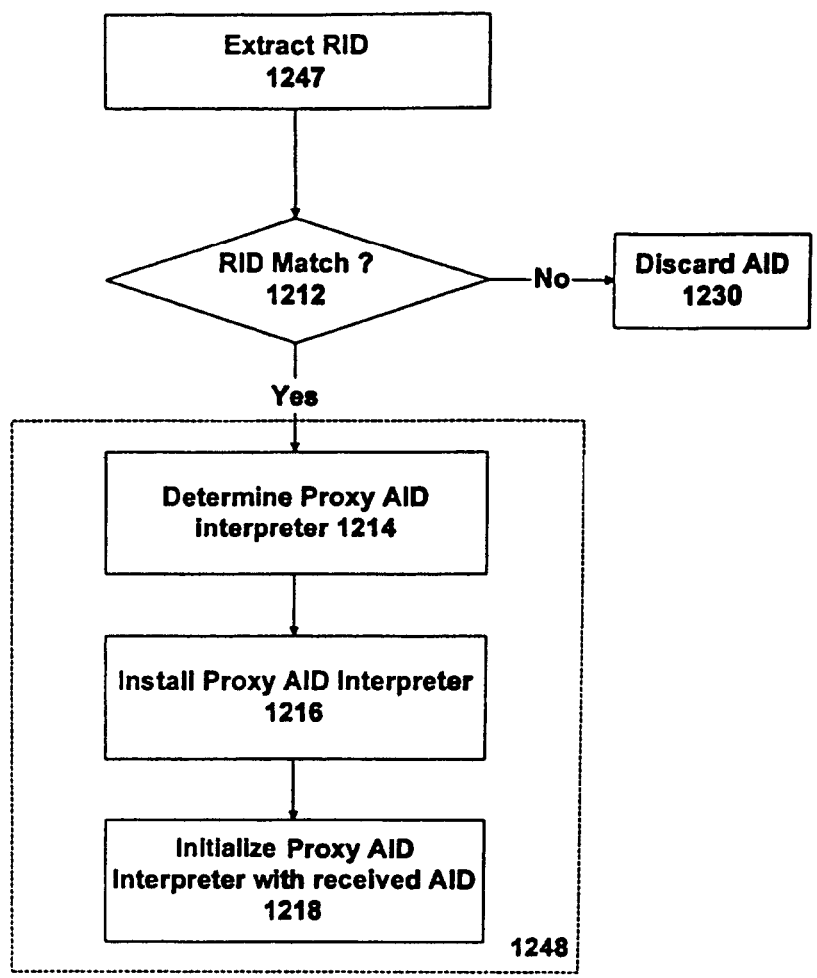
FIG. 12A is a flowchart illustrating some of the operations of the procedure of FIG. 12 in more detail in accordance with one embodiment of the invention.

This situation is depicted in FIG. 12A, which illustrates in more detail some of the processing of FIG. 12. (The dotted box in FIG. 12A corresponds to the box of the same number in FIG. 12). According to one embodiment, the procedure of FIG. 12A is performed in respect of each AID byte string received by the terminal 110 from the card 102.

The procedure of FIG. 12A commences with the extraction of the RID from the AID (1247), as previously discussed in relation to FIG. 12. A test is now performed to see if the RID for this received AID matches the RID of the desired application (1212). If not, then it is known that it is not desired to activate the applet on the card from which this AID has been received, and so the AID can be discarded, or other appropriate action taken (1230).

Assuming however that there is an RID match, the terminal now has to determine which proxy AID interpreter to use for the AID (1214), whereupon the relevant proxy AID interpreter is identified and installed onto the terminal (1216) (if it is not already present). Note that the identification and installation of the desired proxy AID interpreter is generally driven off the RID, as described above in relation to FIGS. 8 and 9. The proxy AID interpreter 811 is now initialized with the corresponding AID string from the smart card 102 (1218), which then allows it to proceed with the parameter matching of reference numeral 1249.

Figure 13A:
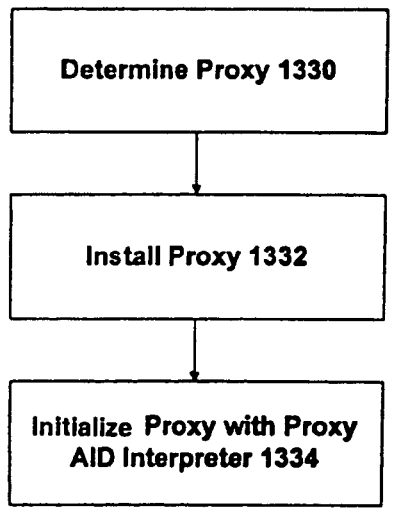
FIG. 13A is a flowchart illustrating the selection of proxy program on the terminal in accordance with one embodiment of the invention.
Figure 13:
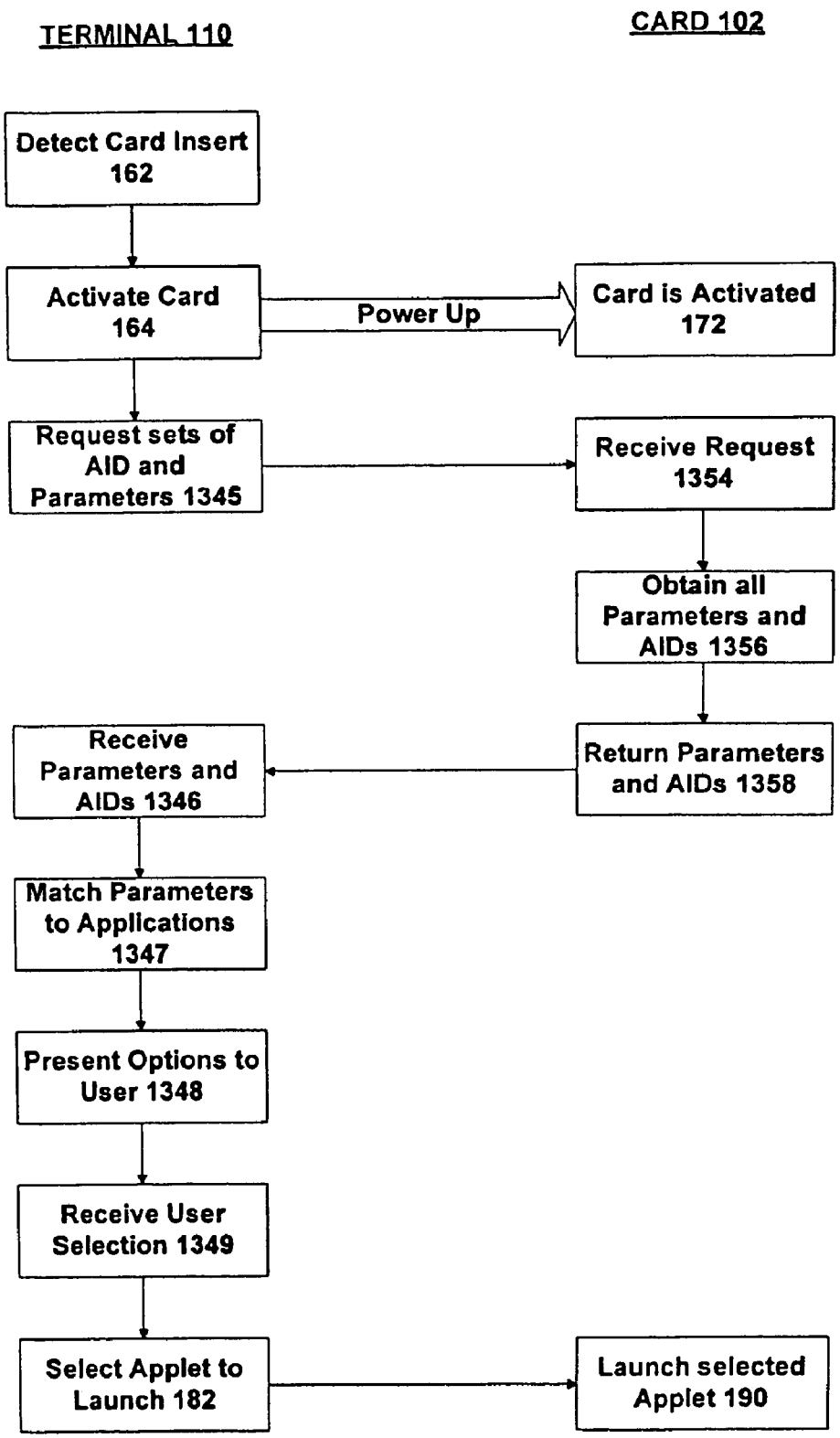
FIG. 13 is a flowchart illustrating a procedure for a terminal to identify a matching application in accordance with one embodiment of the invention.

FIG. 13 depicts a variation on the embodiments of FIG. 6 and FIG. 12. The embodiment of FIG. 13 commences as these other two embodiments, with the terminal detecting insertion of the card (162), and then activating the card in response to such detection (reference numerals 164 and 172). Next, the terminal requests not only the set of AIDs from the card, but also the three application identifying parameters for each application—i.e. the RID 501, the Firewall ID 502A, and the Applet ID 502B (1345). The applet selector on the card receives this request (1354), and responds by calling the get_AID( ), get-RID( ), get_FirewallID( ) and get_AppletID( ) methods for each applet (1356). Again, this may involve an initial call to the applet in question, in order to locate the card AID interpreter 411 for that applet (as shown in FIG. 6).

(Note that for clarity the AID and the RID are treated separately here, with two distinct calls being made to obtain them. However, it will be appreciated that since the RID is encoded in a fixed position within the AID, these two can be handled by a single operation. In other words, there is no particular need to make a getRID( ) call, but rather the RID can be obtained as and when required from the first five bytes of the retrieved AID).

The applet selector now returns the set of parameters for each applet back to the terminal (reference numerals 1358 and 1346). The terminal matches the parameters received from the card against the parameters for the desired application (1347). Note that because this matching is being performed using parameters supplied from the card, rather than the terminal itself having to derive the parameters from the AID string (as in the procedure of FIG. 12), there is no need at this stage for the terminal to have the relevant proxy AID interpreter(s) 811 installed or downloaded.

In one embodiment, the terminal 110 has just a single application to match. Once this (single) application has been identified at 1347, processing can now proceed to 182, where the terminal instructs the card to launch this applet (for example by providing its full AID), with the card then responding accordingly (179).

The proxy AID interpreter 811 corresponding to the selected applet may be pre-installed on the terminal. This is particularly likely if the terminal 110 only supports a single application, since in this case only one proxy AID interpreter 811 will generally be needed, but may also apply if the terminal supports multiple applications. In alternative embodiments, the terminal downloads the proxy AID interpreter 811 for the matching application either before, during, or after reference numeral 182. (The download of the AID interpreter is not shown in FIG. 13, but can be as illustrated with respect to FIG. 8 or 9, and the subsequent installation and initialization of FIG. 12A).

It will be appreciated that the precise timing of any such download of a proxy AID interpreter 811 to terminal 110 is based at least in part on the particular selected application. For example, the AID string may contain some data value that affects the start-up or operation of the applet on the card at 660. In these circumstances therefore, the proxy AID interpreter 811 should be available on terminal 110 to decode this data value before the terminal can send the appropriate applet launch command to the card at 182.

In the embodiment shown in FIG. 13, multiple applications may be matched at 1347. For example, in one embodiment the terminal tries to identify all those applications that are present on the card that the terminal could potentially interact with (i.e. conduct a commercial transaction with). Accordingly, if there is a first set of applications installed on the card, and a second set of applications supported by the terminal, then at 1347 the terminal identifies the intersection of these two sets (such as by looking for matching parameters, namely RID, Firewall ID, and applet ID).

The terminal now presents a choice or listing of these matching applications to a user, for example as a menu on a touch screen (1348). This enables the holder of a multi-function card 102 who is acting with a multi-function terminal to select the particular application to be used for this session (1349), again perhaps by using a touch-sensitive screen at a kiosk terminal. (More generally, the user would select the desired type of service or operation, and the terminal would then invoke the application corresponding to this form of service). The terminal now informs the card of the application that has been selected by the user (182), allowing the card to launch this application accordingly, as previously described (190).

It is also possible for the procedure of FIG. 12 to be modified in order to provide an opportunity for a user to select a desired application. In this case reference numeral 1249 could represent a determination of those applications mutually supported by both the terminal and the card, with the user then selecting one of these applications. The terminal then informs the card of which application to launch, as described above in relation to FIG. 13 (reference numerals 182 and 190).

However, such a procedure would generally involve the terminal downloading multiple proxy AID interpreters 811 in order to allow parameters (Firewall ID, etc) to be extracted from the various AIDs received from the applications on card 102 (as per reference numeral 1248 of FIG. 12). In contrast, download of the proxy AID interpreters 811 to the terminal 110 can be deferred in the procedure of FIG. 13 until after the user has selected a desired application (1349). At this stage, there is only a single proxy AID interpreter 811 to download. (This download is not shown in FIG. 13, but may occur before, during or after the launch of the selected applet).

In some circumstances, it may be that the presentation of options to a user (1348) is dependent on information encoded into the AID (other than the RID, Firewall ID and Applet ID components received from the smart card itself). For example, an AID may incorporate an expiry date encoded into Other portion 502C, after which the associated application is no longer available to the user. For this type of situation, one possibility is to download the proxy AID interpreter 811 for the application (such as by using the method of FIG. 8) prior to presenting the user with the set of available options (i.e. before reference numeral 1348). This then allows data from the various AIDs to be decoded by the respective proxy AID interpreters, and used to tailor suitably the options presented to the user at 1348. For example, if an application expiry date has passed, the corresponding application can then be omitted from the list of applications presented to the user.

It will be noted that such an approach again requires potentially multiple AID interpreters to be downloaded to terminal 110. This can be avoided by having the additional information (such as an expiry date) accessed and decoded by the card AID interpreter 411. As previously described, the card AID interpreter 411 generally knows how to unpack such additional components of the AID, even if it does not know what the additional components represent or how to process them.

For example, at 1356, the card AID interpreter 411 may obtain not only the RID, Firewall ID and Applet ID, but also an expiry date encoded into the AID. (From the perspective of the card AID interpreter 411, the expiry date is generally simply an additional piece of abstract data encoded into the Other portion 502C of the AID 401). This expiry date can then be supplied by the card to the terminal at 1358, along with the RID, Firewall ID and Applet ID. The terminal can then use this additional parameter as appropriate in further processing (for example, in making a decision as to whether or not the corresponding application is available for the cardholder to use). Note that such processing does not necessarily compromise the generality of the terminal, since the terminal does not need to know how the additional information (e.g. the expiry date) is encoded into the AID itself. (The terminal may already know that the parameter exists, and how to interpret the parameter, in order to be able to interact properly with the application).

Another implication of the provision of multi-function terminals, i.e. terminals supporting a number of applications, is that each application has its own associated proxy 410 and associated back office program 130 (see FIG. 4). Thus if a terminal supports only a single type of card application, then the proxy for this application can automatically be invoked on terminal 110 in response to the insertion or activation of card 102. Indeed, the proxy may only be sleeping or suspended between sessions with different cards.

On the other hand, if the terminal supports multiple applications, there may be a different proxy for each application. In this case, where the cardholder is able user to select the particular application to be used with the inserted card (such as discussed above in relation to FIG. 13), then the terminal needs to ensure that the correct proxy is invoked to handle the user selected application.

In these circumstances, the terminal can be provided with a program (not shown in FIG. 4) analogous to the applet selector program, which is used to determine the appropriate proxy to handle any given card session. In the embodiment of FIG. 13, this selector program is responsible for the interaction with the card through to receipt of the user selection of the desired application (1349). At this point, the selector program can then launch the proxy corresponding to the user selection. The proxy 410 can then download the corresponding proxy AID interpreter (if not already present), as well as launching the selected application on the card (reference numerals 182 and 190).

FIG. 13A presents a flowchart depicting the selection and activation of a proxy program on terminal 110 in accordance with one embodiment of the invention. Note that this procedure can be regarded as following on from the flowchart of FIG. 12, whereby it is assumed that the proxy AID interpreter 811 corresponding to a particular AID (and corresponding applet) on the smart card 102 has already been installed and initialized on the terminal 110. In this case, the procedure of FIG. 13A commences with a determination of the proxy to be used with this application (1330). Such a determination can be made based on material retrieved over the network (see FIGS. 8 and 9 above and associated discussion), or alternatively the terminal may have local knowledge of the proxy to use with this particular application. Another possibility is that a proxy itself contains information (such as the RID, and perhaps other parameters as well) that allow the proxy to be matched to a corresponding card application.

Once the terminal has identified the correct proxy 410 for use with the relevant application, this proxy is installed into the terminal (1332), unless it is already present. Thus the proxy code can be obtained over a network, in the same manner as the proxy AID interpreter code 811 (see FIGS. 10 and 11). The proxy code can now be initialized with the proxy AID interpreter code that has already been downloaded (1334), which in turn can be initialized with the AID received from the application (such as at reference numerals 1246 or 1346). This leads to the general configuration of FIG. 4, whereby substantive processing of the user session can commence.

As already discussed, the approach described herein permits a more flexible and powerful use of an AID 401 on a smart card 102. One further mechanism for exploiting this increased flexibility is to use the AID to store information concerning the initial configuration of an application at load time.

Figure 14:
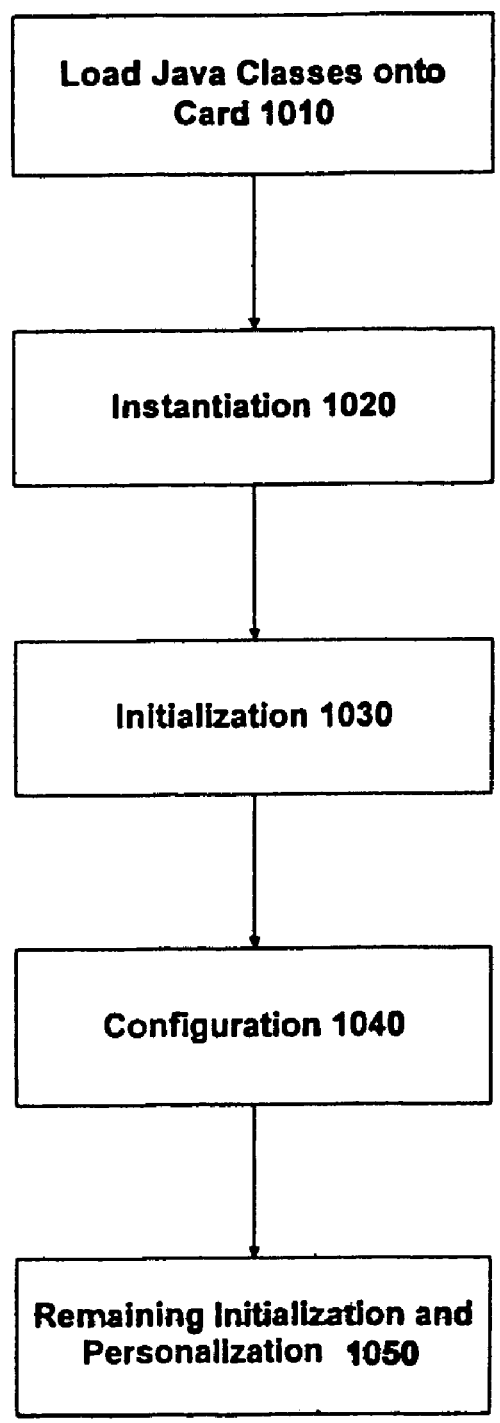
FIG. 14 is a flowchart illustrating the installation of an application comprising an AID onto a smart card in accordance with one embodiment of the invention.

FIG. 14 is a flowchart that depicts such a process in accordance with one embodiment of the invention. The process of FIG. 14 begins with loading the Java classes for an applet 351 onto the smart card 102 (1010). According to one embodiment, these classes are assembled into a package (referred to as a CAP file). Once the classes are present in memory on the smart card 102, then instantiation commences (1020). In other words, objects are created based on the class files. Note that in a smart card environment, this instantiation is a one-off procedure at load time, rather than being performed each time the applet is executed, as in a normal desktop environment. Object instantiation is followed by initialization of variables (1030), and then configuration of the applet occurs (1040). Finally, any other necessary initialization and personalization completes (1050), whereby the card is now ready for use.

Figure 15:
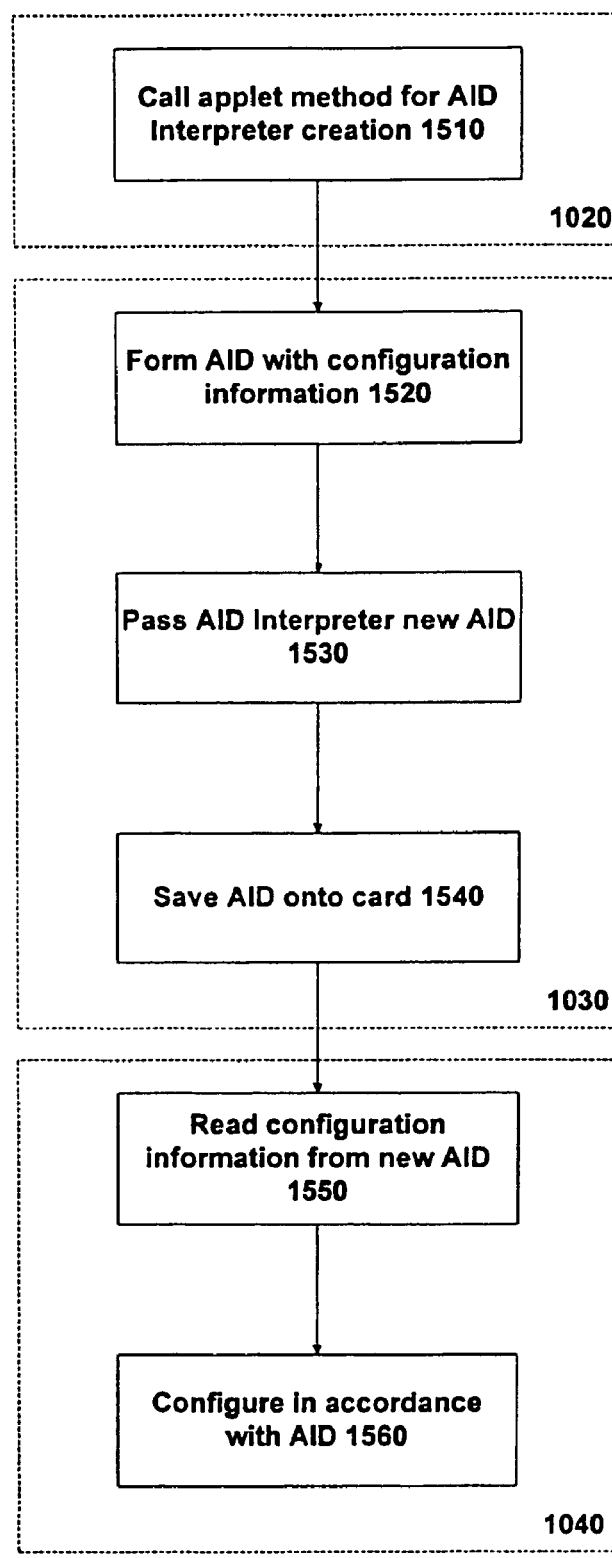
FIG. 15 is a flowchart illustrating the use of the AID to hold configuration data in the flowchart of FIG. 14.

FIG. 15 illustrates certain aspects of the procedure of FIG. 14 in more detail, in particular the role of the AID in the card configuration process, in accordance with one embodiment of the invention. Note that the dotted outline boxes in FIG. 15 correspond to reference numerals from FIG. 14.

Thus as part of the instantiation process of reference numeral 1020, the card AID interpreter 411 is created (including the AID object hierarchy such as shown in FIG. 5A, 5B, 5C or 5D). According to one embodiment, this is achieved by calling appropriate methods (such as a factory method) on the applet being installed in order to instantiate the card AID interpreter 411 (1510).

The configuration program now generates the actual AID value to be stored into the card as part of the initialization (reference numeral 1520 in FIG. 15). (There is some flexibility in the timing of reference numeral 1520, for example, in some embodiments the creation of the AID may precede the creation of the card AID interpreter at 1510). The newly created AID value can be used to encode various configuration data relating to the application that is being installed. Examples of configuration data that may be stored in the AID in this manner include: an indication of the physical and/or software capabilities of the card (e.g. memory capacity, and whether a certain format of digital signatures is supported, the version number of an installed application, etc); general parameters governing card behavior, such as passwords and key lengths; and parameters relating to more application-specific properties, such as the maximum amount of money that may be stored in a purse object, or the maximum payment amount that may be made using the card without requiring a Personal Identification Number (PIN). It will be appreciated that multiple items of various configuration data can be incorporated into a single AID, subject to the available space limitations (in particular the 11 byte limit on the PIX portion of the AID).

Once the AID for the card and the program being installed has been generated by the configuration program, this is now passed to the card AID interpreter 411 (1530). In particular, a store_AID( ) method (or similar) is called on the card AID interpreter, and this is passed the AID string that was generated at 1520. The card AID interpreter then acts to save the newly received AID string onto the card. The manner in which this is accomplished will depend upon the internal implementation of the card AID interpreter and how the AID is to be stored (such as depicted in FIGS. 5A, 5B, 5C and 5D). For example, in one embodiment the AID string is ultimately saved as a single byte array (as in FIG. 5A), or may be distributed into multiple components, each associated with a different AID subobject (as in FIG. 5B).

According to one embodiment, a security procedure associated with storing the AID, to ensure that a duly saved AID is not subsequently corrupted (either deliberately or accidentally) by an inappropriate repeat call of this facility. For example, some form of password can be required to use the store_AID( ) command, or alternatively the store_AID( ) command is perhaps only enabled at applet installation time.

Once the AID has been stored onto the card 102, the AID can then be accessed during subsequent configuration of the applet in order to derive the configuration information encoded into the AID (1550). According to one embodiment, the AID is accessed by making an appropriate call on the card AID interpreter 411. In one embodiment, this involves making a get_AID( ) method call on the AID interpreter, such as previously described, and then extracting the desired configuration information from the AID string. However, this generally requires the applet itself (or other configuration facility) to be able to decode the configuration information encoded into the AD. Thus in another embodiment, the card AID interpreter 411 itself decodes the configuration information stored in the AID string. Accordingly, in this embodiment the card AID interpreter 411 supports one or more method calls that provide specific access to configuration information from the AID string.

For example, the card AID interpreter 411 can support a get_AIDConfiguration( ) method call, which returns the full set of configuration data from the AID string, appropriately organized into a data structure or such-like. Alternatively, the card AID interpreter 411 can include a subobject which provides access to such data. It is also possible that the card AID interpreter 411 supports calls to access individual components of configuration data stored in the AID, e.g. a get_CardMemory( ) to retrieve the memory capacity on the card, although this tends to lead to a rather more complicated method signature for the card AID interpreter.

Once configuration data has been retrieved from the AID in this manner, this configuration data can then be used to control the particular software and data configuration adopted for the applet (1560). Examples of configuration data that can be stored into the AID include parameters that determine the characteristics of cryptographic algorithms used on the card (e.g. number of bits); memory usage (e.g. the number of bytes of card memory allocated to the application); the version number of various software support modules on the card; and so on. Making this information available to an applet via its AID helps to ensure that the installed applet conforms to properties of the smart card in question concerned (for example, the applet does not try to use more memory than is allocated to it on the card).

The above procedure therefore allows information about the card and the applet instance in the card environment to be encoded into the AID. This information can then be used to control the particular configuration of the applet as it is being installed. It will be appreciated that this provides a convenient software mechanism for optimizing the application configuration for the relevant environment, without having to depart from a relatively conventional or standardized loading procedure. In other words, rather than having to customize the installation process itself, any special configuration details can be encoded into the AID. The AID information can be used to control the precise configuration adopted without further external intervention, so that the applet instance is matched to the particular card on which the applet is installed, with different applet code or configurations being installed on different cards.

Attached to the present description is a set of Appendices. These provide documentation relating to one implementation of certain components described herein. Various features are detailed that are not necessarily relevant to the invention itself (although they are typical of a complete implementation). Nevertheless, the Appendices provide the skilled person with a general indication at the code level as to how an implementation may be developed.

Appendix A describes a card AID interpreter (corresponding for example to card AID interpreter 411 in FIG. 4). Note that in this implementation, the Firewall ID 502A (see FIG. 5) is stored in byte 6 of the AID, and the Applet ID 502B is stored in byte 7 of the AID. An Owner ID is then formed as the composite of the RID 501 and the Firewall ID 502A, while the Applet ID is (re)defined as the composite of the Owner ID and the Applet ID 502B. Applet selection can then be performed using the Applet ID (only), since this incorporates the RID 501, the Firewall ID 502A and the Applet ID 502B of FIG. 5. Note that from a logical perspective however, the selection is still utilizing these three parameters, which can be regarded as encoded into the (redefined) Applet ID.

With the particular byte allocations described in Appendix A, the RID, Owner ID and the Applet ID correspond to the first five, six and seven bytes respectively of the AID. However, in other implementations they may be encoded differently into the AID (except of course for the RID, whose location is governed by the ISO standard).

Appendices B, C, D and E describe four classes nested within the AID interpreter that respectively manage the various components of the AID, such as the RID portion, the Owner portion, and so on. This is somewhat analogous to the embodiment illustrated in FIG. 5C.

Appendix F describes a proxy AID interpreter (corresponding for example to proxy AID interpreter 811 in FIG. 4). Note that there is a predefined list of attributes that might potentially be encoded into an AID (and hence need interpreting). Attributes that are not supported by a particular card are set to null. Additional attributes may be supported by suitably extending the class of Appendix F.

Provided below is a summary of selected embodiments of the present invention.

According to one embodiment of the invention, a method for operating a smart card to provide an application identifier (AID) for an application on the smart card is provided. The application incorporates an AID interpreter. The method includes receiving a request at the AID interpreter to provide the AID for the application. In other words, the AID is accessed via the AID interpreter. The AID interpreter responds by retrieving first and second components of the AID. The first component is logically internal to the AID interpreter, while the second component is logically external to the AID interpreter and comprises state information. Note that the first and second components may be retrieved in any order (or simultaneously). The first and second components of the AID are then combined in order to generate the AID for providing in response to the request.

In one embodiment, the first component of the AID comprises at least an RID portion. The first component may also comprise a portion indicative of a firewall in which the application is located on the smart card. Note that these parameters are relatively fixed and also generally specific to the application itself, which renders them suitable for incorporating into the AID at installation time.

The second component may be used to hold a wide range of state information relevant to the application. Note that this state information may be fixed (e.g. it may represent a version number of the application), or it may vary with time (e.g. it may represent a current balance remaining to the application). Note also that the state information may be particular to the application in question, or the state information might describe some property of the card, such as a memory capacity, or potentially of the cardholder, such as a date of birth.

Allowing the second component to be external to the AID interpreter makes it easier to incorporate the same state information in multiple applications (rather than having to separately maintain the same state information in lots of different applications). Consequently, the second component may be stored once on a card, and then shared between the multiple applications, thereby reducing memory requirements for the smart card. Another advantage, as discussed in more detail below, is that the AID interpreter can be more generic.

In one embodiment, the request to the AID interpreter is made by calling a method on the AID interpreter. According to a further embodiment, such a request is made in response to a communication from a terminal, when the card is brought into engagement or communication with the terminal at the start of a session. In such circumstances, the terminal generally supplies at least one identifier for an application to be used in the session. This identifier is then compared with the AIDs for the various applications on the smart card in order to identify the desired application for the session.

According to one embodiment, the identifier matches a portion of the AID of the desired application. This matching portion usually comprises at least part of the first component of the AID, but excludes the second component of the AID. The reason for this is that the second component, being state information, may be liable to change. The terminal is therefore unlikely to know in advance the contents of this second component for matching purposes.

Nevertheless, there may perhaps be occasions when the terminal is interested in trying to match at least part of the second component. This might be the case if the second component is used to hold some configuration information, which may perhaps be important for deciding whether or not the terminal tries to launch a particular application. (One example of this might be if the state information indicates whether or not the application had passed an expiry date).

In one embodiment, the generated AID is returned from the application to a terminal. The terminal may use this AID for various purposes in the session. For example, the terminal may extract state information, such as a balance, in order to determine whether or not a commercial transaction requested by the cardholder should be allowed to proceed. Another possibility is that the terminal performs application matching itself. According to one embodiment, the terminal receives generated AIDs from multiple applications on the card, and then selects an appropriate application on the card to launch. (Note that this application matching may be performed on the smart card instead, either by the AID interpreter itself, or by some other facility).

In one embodiment, the second component is processed prior to combination with the first component. For example, the second component may be stored as an expiry date for the application. This can then be compared with the current date of the session to generate a flag indicating whether or not the application has expired. This flag can then be integrated into the AID.

Note that the processing may involve not only data manipulation (such as the comparison above), but also data formatting. For example, if the second component were stored as an integer representing a current balance on the card, then an appropriate transformation could be performed to convert from the integer format into the byte format of the AID.

According to one embodiment, the processing of the second component is performed externally to the AID interpreter, for example by another part of the application. This then avoids the AID interpreter having to understand details about the contents and format of the second component (prior to processing). Indeed, the AID interpreter may have no facility itself to update or modify the second component. Rather, in one embodiment the AID interpreter can only access the second component via a call to the applet. In this embodiment, responsibility for updating the state information of the second component therefore falls to some routine other than the AID interpreter. This other routine can also be used for manipulating the state information on the card, thus providing a consistent and convenient mechanism for altering the state information if so desired.

Another embodiment of the invention provides a smart card having one or more applications installed thereon. At least one of the applications comprises an application identifier (AID) for the application and an AID interpreter. The AID is accessed via the AID interpreter. The AID comprises a first component logically internal to the AID interpreter and a second component logically external to the AID interpreter. The second component is indicative of a state relevant to the application. The AID interpreter is operable to combine at least the first and second components of the AID in order to generate the AID.

In accordance with another embodiment of the invention, a computer program product comprising instructions on a medium is provided. The instructions when loaded into a machine cause the machine to operate a smart card to provide an application identifier (AID) for an application on the smart card. The application incorporates an AID interpreter, and the AID is provided by receiving a request at the AID interpreter to provide the AID for the application. This causes retrieval of first and second components of the AID. The first component is logically internal to the AID interpreter. In contrast, the second component of the AID is logically external to the AID interpreter. The second component is indicative of a state relevant to the application. The first and second components of the AID are now combined, potentially with other data, in order to generate the AID for providing in response to the initial request.

Note that a computer program product may comprise program instructions stored on a removable storage medium, for example an optical (CD ROM, DVD, etc) or magnetic (floppy disk, tape, etc) device. Such a medium can then be introduced into a computer system in order to transfer the program instructions to the system. Alternatively, the program instructions may be transferred to the computer system by download via a transmission signal medium over a network, for example, a local area network (LAN), the Internet, and so on. According to one embodiment, the transferred program instructions are stored on a hard disk of a computer system, and loaded for use into random access memory (RAM) for execution by a system processor.

It will be appreciated that the apparatus and computer program product embodiments of the invention will generally benefit from the same particular features described above as the method embodiments of the invention.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for operating a smart card to provide an application identifier (AID) for an application on the smart card, wherein the application includes an AID interpreter, the method comprising:

receiving a request at the AID interpreter to provide the AID for the application on the smart card, wherein said AID is accessed via said AID interpreter;

retrieving a first component of the AID, wherein said first component is logically internal to the AID interpreter;

retrieving a second component of the AID, wherein said second component is logically external to the AID interpreter; is on said smart card; and is indicative of a state relevant to the application; and combining at least the first and second components of the AID in order to generate the AID for providing in response to said request.

2. The method of claim 1, wherein said request to the AID interpreter is made by calling a method on the AID interpreter to provide the AID.

3. The method of claim 2, wherein the request to the AID interpreter is made in response to a communication from a terminal.

4. The method of claim 3, wherein the communication from the terminal comprises at least one identifier for an application to be used in a session with the terminal.

5. The method of claim 4, wherein said at least one identifier matches a portion of the AID for the application to be used in a session with the terminal, and wherein said matching portion comprises at least part of said first component of the AID logically internal to the AID interpreter, but none of said second component of the AID logically external to the AID interpreter.

6. The method of claim 1, further comprising providing the generated AID from the application to a terminal.

7. The method of claim 1, wherein the application comprises a set of Java classes and the smart card conforms to the JavaCard API.

8. The method of claim 1, wherein said first component of the AID comprises at least a registered application provider identifier (RID) portion.

9. The method of claim 8, wherein said first component of the AID further comprises a portion indicative of a firewall in which the application is located on the smart card.

10. The method of claim 1, wherein said second component is shared between a plurality of applications on the smart card.

11. The method of claim 1, further comprising processing the second component prior to combination with the first component.

12. The method of claim 11, wherein said processing the second component is performed externally to the AID interpreter.

13. The method of claim 11, wherein said processing involves data manipulation.

14. The method of claim 11, wherein said processing involves data formatting or encoding.

15. The method of claim 1, wherein retrieving the second component comprises making a call from the AID interpreter to the application.

16. The method of claim 1, wherein said AID is generated during a session with a terminal, and said session comprises updating the second component.

17. The method of claim 16, wherein said updating the second component is performed independently of the AID interpreter.

18. The method of claim 1, wherein the AID interpreter has no facility to update the second component of the AID.

19. The method of claim 1, wherein said state reflects a current balance stored on the smart card.

20. A smart card having one or more applications installed thereon, wherein at least one of the applications comprises an application identifier (AID) for the application and an AID interpreter, wherein said AID is accessed via said AID interpreter and comprises a first component logically internal to the AID interpreter and a second component logically external to the AID interpreter and on said smart card, wherein said second component is indicative of a state relevant to the application, and wherein the AID interpreter is operable to combine at least the first and second components of the AID to generate the AID.

21. The smart card of claim 20, wherein the AID interpreter incorporates a method, wherein calling the method causes the AID interpreter to provide the generated AID.

22. The smart card of claim 20, wherein the smart card comprises a communications interface for receiving a request from a terminal, and the AID is generated in response to the request.

23. The smart card of claim 22, wherein the request from the terminal comprises at least one identifier for an application to be used in a session with the terminal.

24. The smart card of claim 23, wherein said at least one identifier matches a portion of the AID for the application to be used in a session with the terminal, and wherein said matching portion comprises at least part of said first component of the AID logically internal to the AID interpreter, but none of said second component of the AID logically external to the AID interpreter.

25. The smart card of claim 20, operable to provide the generated AID from the application to a terminal.

26. The smart card of claim 20, wherein said first component of the AID comprises at least a registered application provider identifier (RID) portion and a portion indicative of a firewall in which the application is located on the smart card.

27. The smart card of claim 20, wherein said second component is shared between a plurality of applications on the smart card.

28. The smart card of claim 20, wherein the second component is processed prior to combination with the first component.

29. The smart card of claim 28, wherein said processing of the second component is performed externally to the AID interpreter.

30. The smart card of claim 20, wherein the second component is retrieved by making a call from the AID interpreter to the application containing the AID interpreter.

31. The smart card of claim 20, wherein said AID is generated during a session with a terminal, and said session comprises updating the second component.

32. The smart card of claim 20, wherein the AID interpreter has no facility to update the second component of the AID.

33. A smart card operable to provide an application identifier (AID) for an application on the smart card, wherein the application includes an AID interpreter, the smart card comprising:

means for receiving a request at the AID interpreter to provide the AID for the application on the smart card, wherein said AID is accessed via said AID interpreter;

means for retrieving a first component of the AID, wherein said first component is logically internal to the AID interpreter;

means for retrieving a second component of the AID, wherein said second component is logically external to the AID interpreter; is on said smart card; and is indicative of a state relevant to the application; and means for combining at least the first and second components of the AID in order to generate the AID for providing in response to said request.

34. A computer program product comprising instructions on a storage medium, wherein said instructions when loaded into a machine cause the machine to operate a smart card to provide an application identifier (AID) for an application on the smart card, wherein the application includes an AID interpreter, wherein the AID is provided by:

receiving a request to the AID interpreter to provide the AID for the application on the smart card, wherein said AID is accessed via said AID interpreter;

retrieving a first component of the AID, wherein said first component is logically internal to the AID interpreter;

retrieving a second component of the AID, wherein said second component is logically external to the AID interpreter; is on said smart card; and is indicative of a state relevant to the application; and combining at least the first and second components of the AID in order to generate the AID for providing in response to said request.

35. The computer program product of claim 34, wherein said request to the AID interpreter is made by calling a method on the AID interpreter to provide the AID.

36. The computer program product of claim 35, wherein the request to the AID interpreter is made in response to a communication from a terminal.

37. The computer program product of claim 36, wherein the communication from the terminal comprises at least one identifier for an application to be used in a session with the terminal.

38. The computer program product of claim 37, wherein said at least one identifier matches a portion of the AID for the application to be used in a session with the terminal, and wherein said matching portion comprises at least part of said first component of the AID logically internal to the AID interpreter, but none of said second component of the AID logically external to the AID interpreter.

39. The computer program product of claim 34, wherein the instructions further cause the generated AID to be provided from the application to a terminal.

40. The computer program product of claim 34, wherein the application comprises a set of Java classes and the smart card conforms to the JavaCard API.

41. The computer program product of claim 34, wherein said first component of the AID comprises at least a registered application provider identifier (RID) portion.

42. The computer program product of claim 41, wherein said first component of the AID further comprises a portion indicative of a firewall in which the application is located on the smart card.

43. The computer program product of claim 34, wherein said second component is shared between a plurality of applications on the smart card.

44. The computer program product of claim 34, wherein the instructions further cause the machine to process the second component prior to combination with the first component.

45. The computer program product of claim 44, wherein processing the second component is performed externally to the AID interpreter.

46. The computer program product of claim 44, wherein processing involves data manipulation.

47. The computer program product of claim 44, wherein processing involves data formatting or encoding.

48. The computer program product of claim 34, wherein retrieving the second component comprises making a call from the AID interpreter to the application.

49. The computer program product of claim 34, wherein said AID is generated during a session with a terminal, and said session comprises updating the second component.

50. The computer program product of claim 49, wherein updating the second component is performed independently of the AID interpreter.

51. The computer program product of claim 34, wherein the AID interpreter has no facility to update the second component of the AID.

52. The computer program product of claim 34, wherein said state reflects a current balance stored on the smart card.

\* \* \* \* \*